(12) United States Patent
Tsukazaki et al.

(10) Patent No.: US 7,890,520 B2
(45) Date of Patent: Feb. 15, 2011

(54) PROCESSING APPARATUS AND ASSOCIATED METHODOLOGY FOR CONTENT TABLE GENERATION AND TRANSFER

(75) Inventors: Hideo Tsukazaki, Tokyo (JP); Kotaro Asaka, Tokyo (JP); Takashi Kinouchi, Tokyo (JP); Takamichi Hayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 1177 days.

(21) Appl. No.: 11/495,694

(22) Filed: Jul. 31, 2006

(65) Prior Publication Data

US 2007/0025704 A1 Feb. 1, 2007

(30) Foreign Application Priority Data

Aug. 1, 2005 (JP) .............................. 2005-223411

(51) Int. Cl.
G06F 17/30 (2006.01)
(52) U.S. Cl. ...................... 707/754; 707/758; 709/203; 709/219
(58) Field of Classification Search ................. 707/754, 707/758; 709/203, 219
See application file for complete search history.

(56) References Cited

U.S. PATENT DOCUMENTS

| 6,956,161 | B2 * | 10/2005 | Kondo ......................... 84/609 |
| 7,672,975 | B2 * | 3/2010 | Plastina et al. ..................... 1/1 |
| 2003/0233929 | A1 | 12/2003 | Agnihotri |
| 2006/0146787 | A1 * | 7/2006 | Wijnands et al. ............ 370/352 |
| 2006/0195789 | A1 * | 8/2006 | Rogers et al. ............... 715/727 |

FOREIGN PATENT DOCUMENTS

| JP | 2001-93226 | 4/2001 |
| WO | WO 01/79964 A2 | 10/2001 |
| WO | WO 01/86652 A1 | 11/2001 |

OTHER PUBLICATIONS

U.S. Appl. No. 11/492,116, filed Jul. 25, 2006, Konno et al.
U.S. Appl. No. 11/493,797, filed Jul. 27, 2006, Kinouchi et al.
U.S. Appl. No. 11/495,573, filed Jul. 31, 2006, Kawasaki et al.

* cited by examiner

*Primary Examiner*—Leslie Wong
(74) *Attorney, Agent, or Firm*—Oblon, Spivak, McClelland, Maier & Neustadt, L.L.P.

(57) ABSTRACT

An information-processing apparatus to connect to a reproduction apparatus, store contents in a host database having attributes of contents stored in a content storage section, identify contents stored in a reproduction apparatus, extract attributes of identified contents of the reproduction apparatus from the host database, create plural tables of different types, and transfer the created tables to the reproduction apparatus.

9 Claims, 46 Drawing Sheets

FIG. 2A
Prior Art

| CONTENTS | ARTIST NAME | ALBUM NAME | TITLE | TRACK NUMBER |
|---|---|---|---|---|
| XXXXX . MP3 | Artist 100 | Album 23 | Track 4 | 4 |
| XXXXX . MP3 | Artist 24 | Album 33 | Track 3 | 3 |
| XXXXX . MP3 | Artist 2 | Album 3 | Track 1 | 1 |
| ....... | | | | |
| XXXXX . MP3 | Artist 21 | Album 19 | Track 3 | 3 |

FIG. 2B
Prior Art

Artist 1   Album 1   Track 1
  ⋮
            Track 8

Album 2   Track 1
  ⋮
            Track 5

Artist 2   Album 3   Track 1
  ⋮
            Track 6

Artist 3   Album 4   Track 1
  ⋮
            Track 8

...

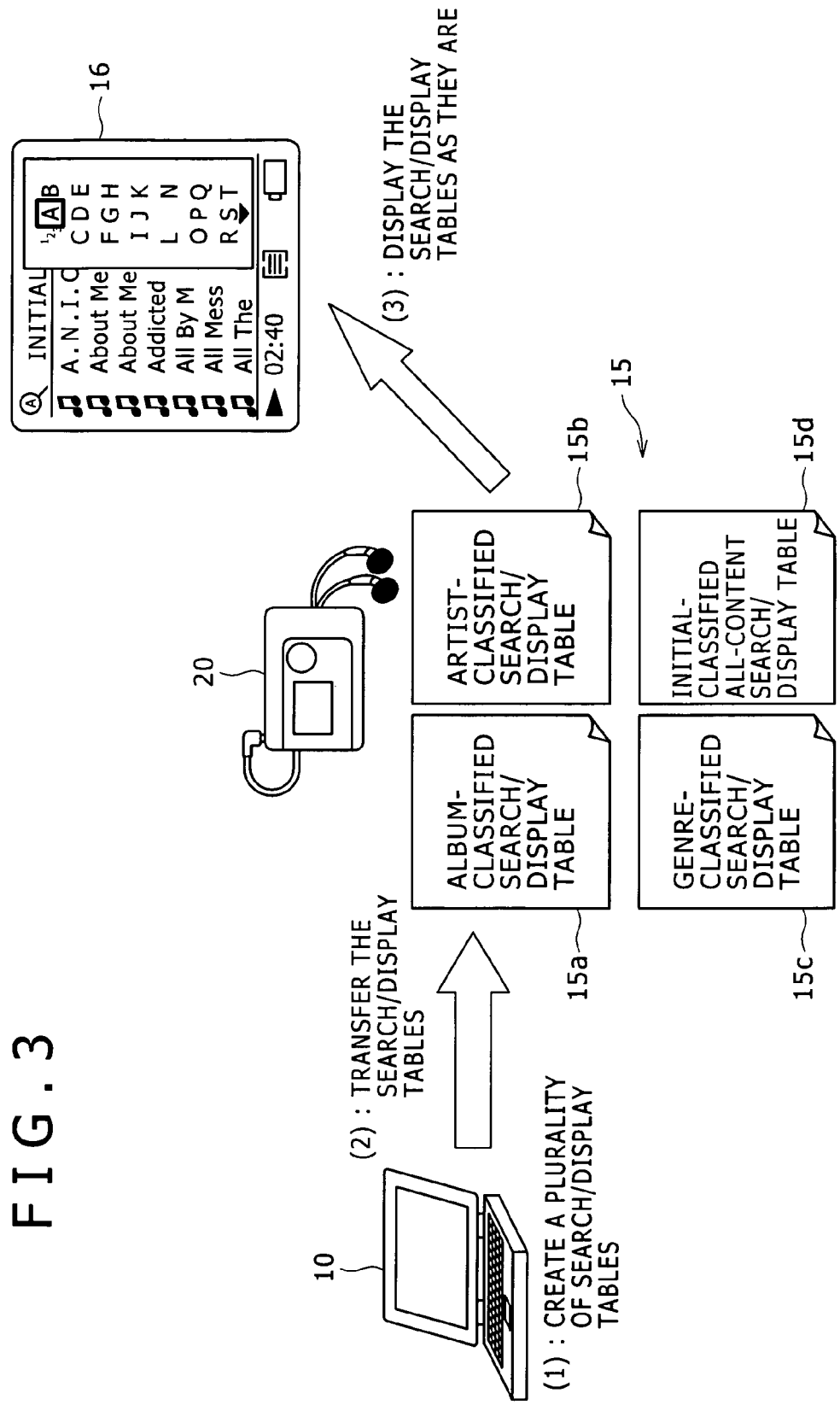

Album 1  Track 1 ⋮ Track 8
Album 2  Track 1 ⋮ Track 5
Album 3  Track 1 ⋮ Track 6
Album 4  Track 1 ⋮ Track 8
...

Artist 1  Album 1  Track 1 ⋮ Track 8
          Album 2  Track 1 ⋮ Track 5
Artist 2  Album 3  Track 1 ⋮ Track 6
Artist 3  Album 4  Track 1 ⋮ Track 8
...       ...      ...

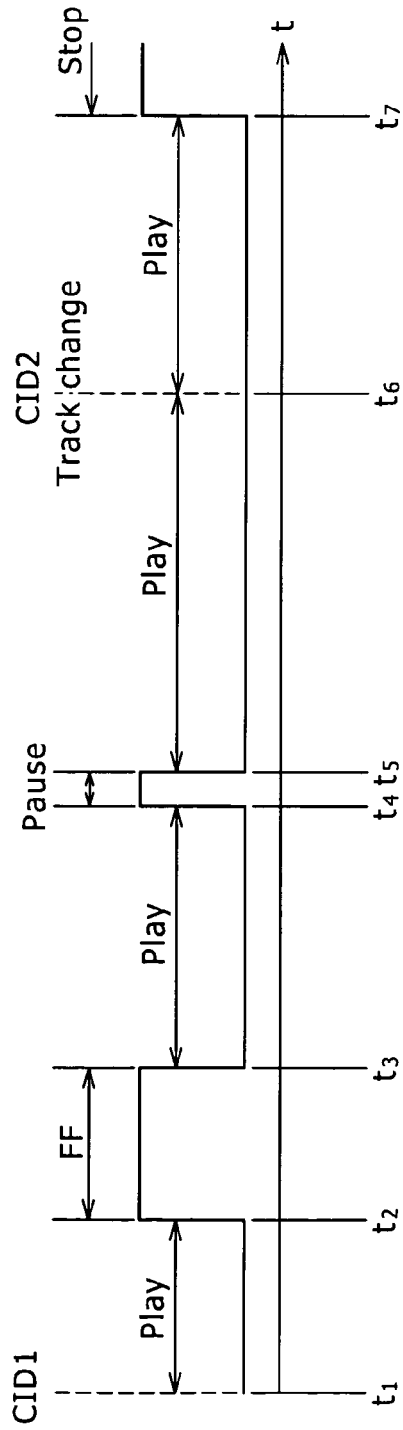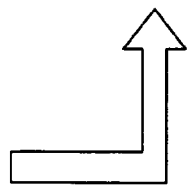

FIG.10

| EVENT ID | PROCESSING SUBSTANCE |
|---|---|
| 00 | REQUEST FOR A START OF A CONTENT |
| 01 | START OF NORMAL REPRODUCTION |
| 02 | START OF STOP OR START OF TEMPORARY STOP |
| 03 | START OF FAST FORWARD |
| 04 | START OF REWIND |

270 · 272

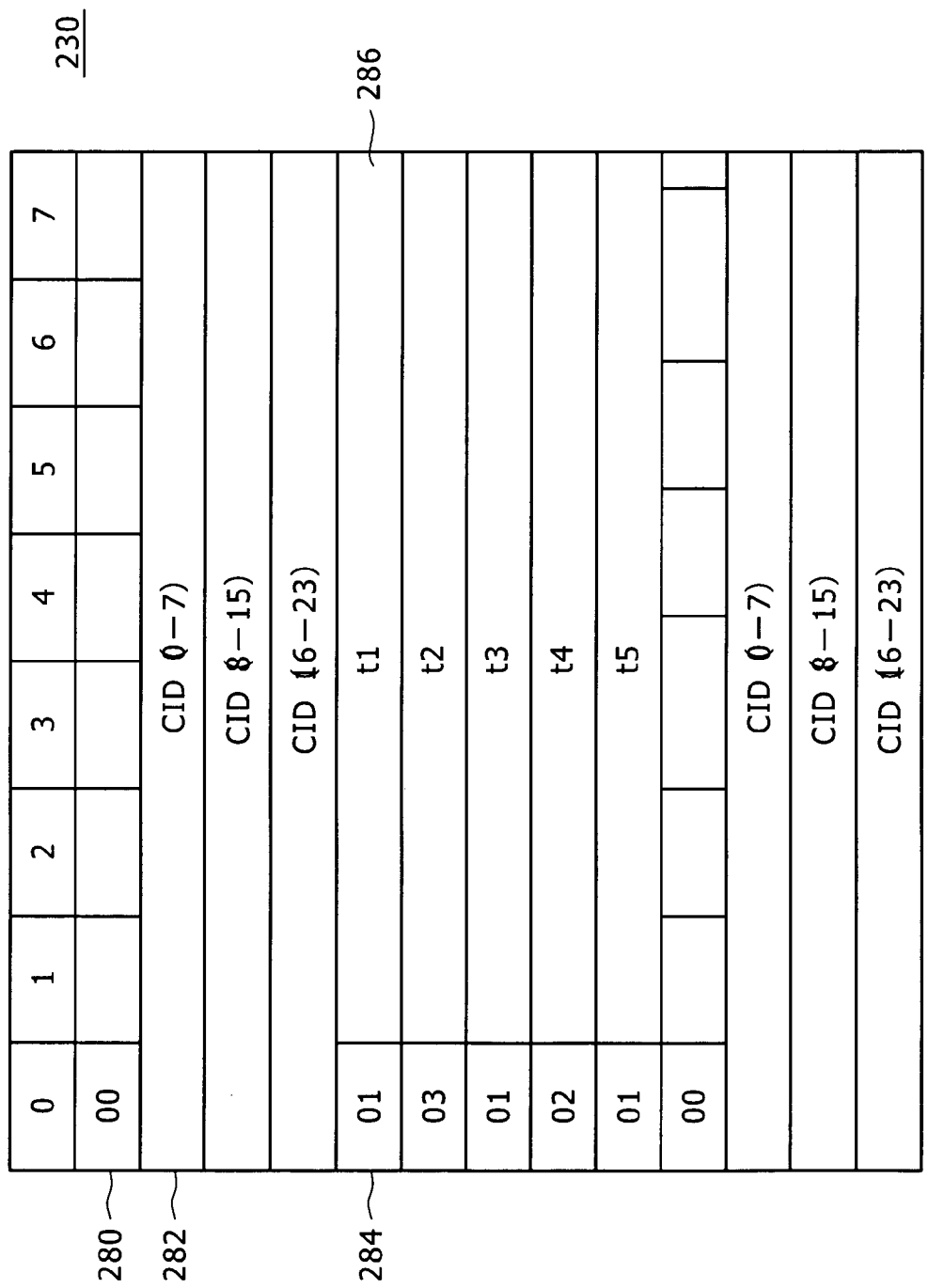

FIG.12

| ● START ANOTHER MUSICAL CONTENT BY USING Next or Search | ● Pause |
|---|---|
| — CID CID1<br>— Play t1<br>— Stop t2 (Next START)<br>— CID CID2<br>— Play t3 (Next COMPLETE) | — CID CID1<br>— Play t1<br>— Stop t2 (Pause START)<br>— Play t3 (Pause END) |
| ● REPRODUCTION FROM THE BEGINNING BY USING Prev | ● Rew (FF) |
| — CID CID1<br>— Play t1<br>— Stop t2 (Prev START)<br>— CID CID2<br>— Play t3 (Prev COMPLETE) | — CID CID1<br>— Play t1<br>— Stop t2 (Rew START)<br>— Play t3 (Rew END) |
| | ● TO THE NEXT MUSICAL CONTENT BY Rew (FF) |
| ● Repeat | — CID CID1<br>— Play t1<br>— Stop t2 (Rew START)<br>— CID CID2<br>— Play t3 (Rew END) |
| — CID CID1<br>— Play t1<br>— Stop t2<br>— CID CID1<br>— Play t3 | |

| | 140a | 140b | 140c | 140d | 140e | 140f |
|---|---|---|---|---|---|---|
| | CONTENT ID | NUMBER OF REPRODUCTIONS | NUMBER OF PAUSES | NUMBER OF SKIPS | NUMBER OF REPETITIONS | TOTAL REPRODUCTION DURATION (SECONDS) |
| | 00001 | 6 | 2 | 1 | 2 | 1789 |
| | 00005 | 2 | 0 | 0 | 0 | 210 |
| | 13501 | 1 | 1 | 2 | 0 | 280 |
| | 70221 | 3 | 0 | 0 | 0 | 564 |
| | 00055 | 4 | 1 | 1 | 1 | 855 |
| | 00301 | 5 | 2 | 0 | 2 | 1270 |
| | 10001 | 3 | 0 | 1 | 1 | 744 |
| | 25091 | 2 | 0 | 0 | 0 | 544 |
| | 50407 | 2 | 0 | 0 | 1 | 500 |
| | ... | ... | ... | ... | ... | ... |

FIG. 15

| CONTENT ID | REPRODUCTION START DATE/TIME | REPRODUCTION END DATE/TIME | CONTINUOUS REPRODUCTION DURATION (SECONDS) |
|---|---|---|---|
| 13501 | 2004/6/6 0:30 | 2004/6/6 2:35 | 225 |
| 13501 | 2004/11/1 20:58 | 2004/11/1 21:06 | 225 |
| 13501 | 2004/11/1 20:57 | 2004/11/1 20:57 | 2 |
| 25091 | 2004/6/9 1:10 | 2004/6/9 1:14 | 234 |
| ... | ... | ... | ... |

<SCREEN DURING REPRODUCTION>

INPUT EVALUATION VALUE (MANUAL RATING)

COMPUTED EVALUATION VALUE : 3.0
INPUT EVALUATION VALUE : 5.0

<SCREEN DURING REPRODUCTION>

COMPUTED EVALUATION VALUE (AUTOMATIC RATING)

COMPUTED EVALUATION VALUE : 3.0
INPUT EVALUATION VALUE : NONE

FIG. 17

⟨DECREASING AND INCREASING THE POINT COUNT REPRESENTING THE COMPUTED EVALUATION VALUE (AUTOMATIC RATING)⟩

| | |
|---|---|
| CONTENT (A PIECE OF MUSIC) REPRODUCED CONTINUOUSLY FOR AT LEAST N SECONDS WITHOUT BEING SKIPPED | INCREASED BY 0.2 POINTS |
| CONTENT (A PIECE OF MUSIC) SKIPPED BEFORE THE LAPSE OF M ( = N ) SECONDS SINCE THE START OF REPRODUCTION | DECREASED BY 0.1 POINTS |
| CONTENT (A PIECE OF MUSIC) PUT ON A LIST AS A CONTENT (A PIECE OF MUSIC) TO BE DELETED | DECREASED BY 1.0 POINT |

FIG. 18

| CONTENT ID 140a | TITLE 170b | ARTIST 170c | ALBUM 170d | GENRE 170e | PERFORMANCE TIME (SECONDS) 170f | COMPUTED EVALUATION VALUE (AUTOMATIC RATING) 170g | INPUT EVALUATION VALUE (MANUAL RATING) 170h | YEAR OF RELEASE 170i |
|---|---|---|---|---|---|---|---|---|
| 00001 | TITLE 9 | ARTIST 5 | ALBUM 6 | GENRE 1 | 225 | 4.2 | 4.0 | 2005 |
| 00005 | TITLE 1 | ARTIST 1 | ALBUM 1 | GENRE 1 | 234 | 1.8 | 2.0 | 2004 |
| 13501 | TITLE 4 | ARTIST 3 | ALBUM 3 | GENRE 2 | 199 | 3.0 | — | 2003 |
| 70221 | TITLE 5 | ARTIST 3 | ALBUM 3 | GENRE 2 | 254 | 5.0 | 5.0 | 2002 |
| 00055 | TITLE 6 | ARTIST 4 | ALBUM 4 | GENRE 1 | 248 | 5.0 | — | 2001 |
| 00301 | TITLE 3 | ARTIST 2 | ALBUM 2 | GENRE 1 | 188 | 1.5 | — | 2000 |
| 10001 | TITLE 2 | ARTIST 2 | ALBUM 2 | GENRE 1 | 269 | 1 | 1.0 | 2000 |
| 25091 | TITLE 8 | ARTIST 5 | ALBUM 5 | GENRE 1 | 201 | 3.0 | 3.0 | 1970 |
| 50407 | TITLE 7 | ARTIST 5 | ALBUM 5 | GENRE 1 | 267 | 3.0 | 4.0 | 1985 |
| ... | ... | ... | ... | ... | ... | ... | ... | ... |

170

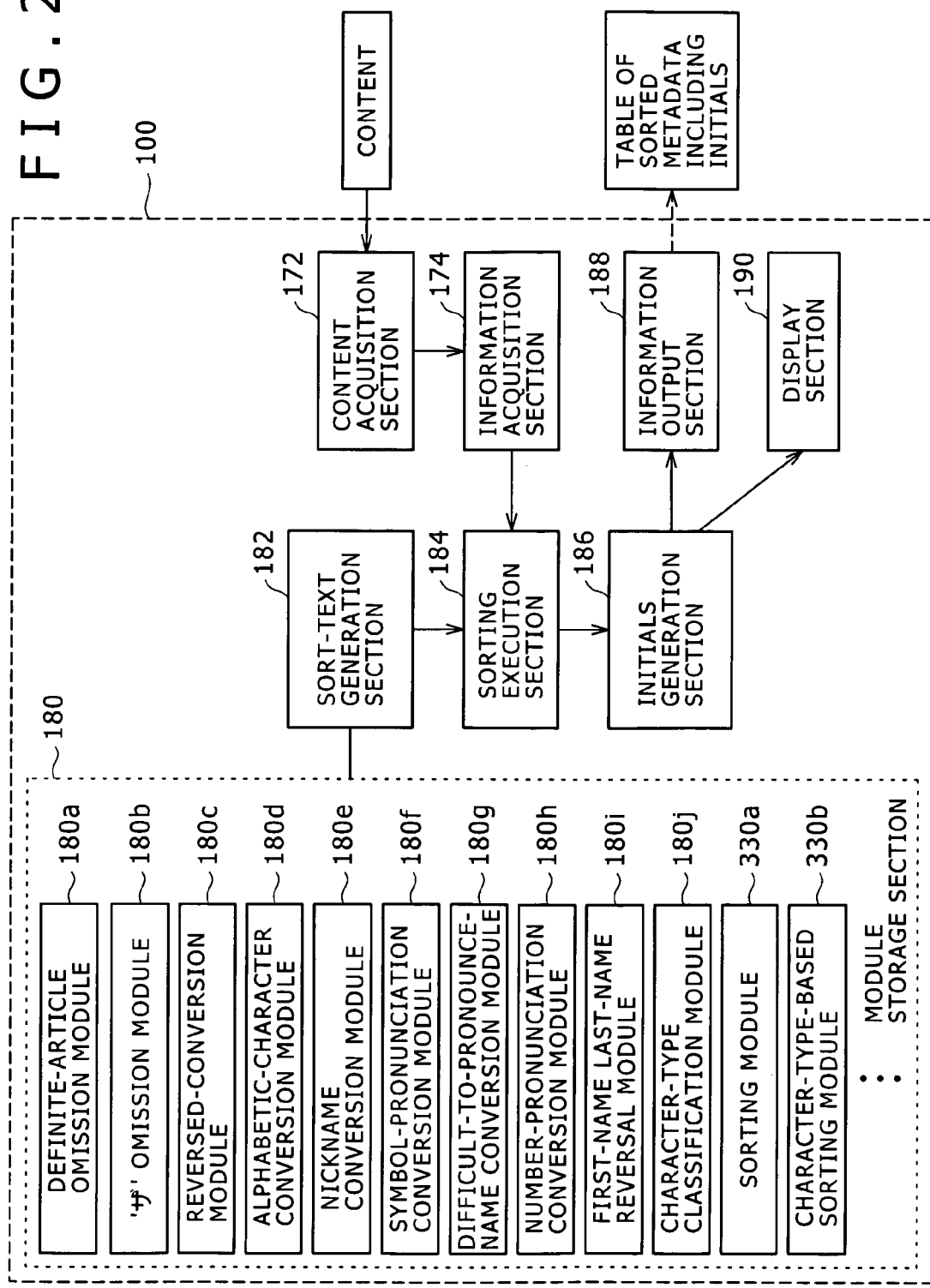

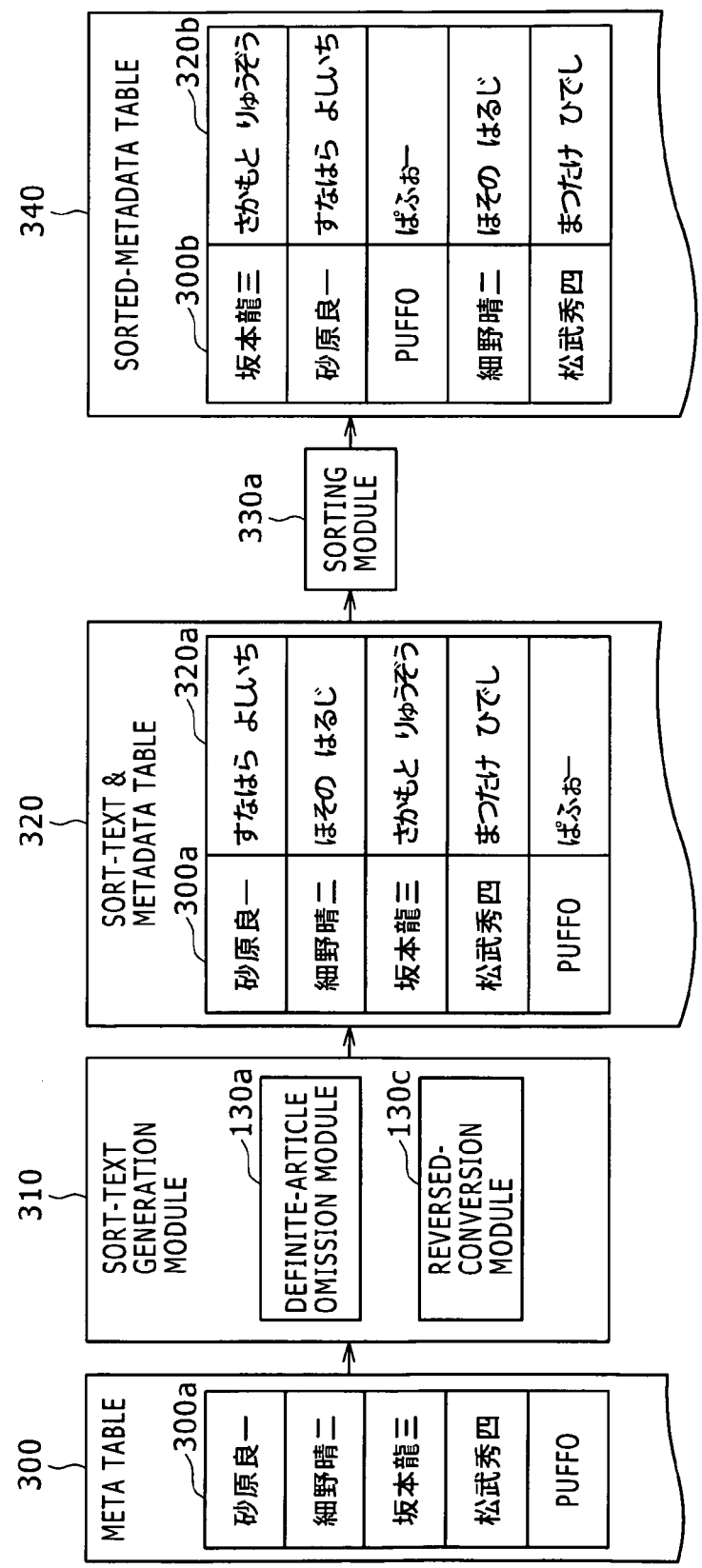

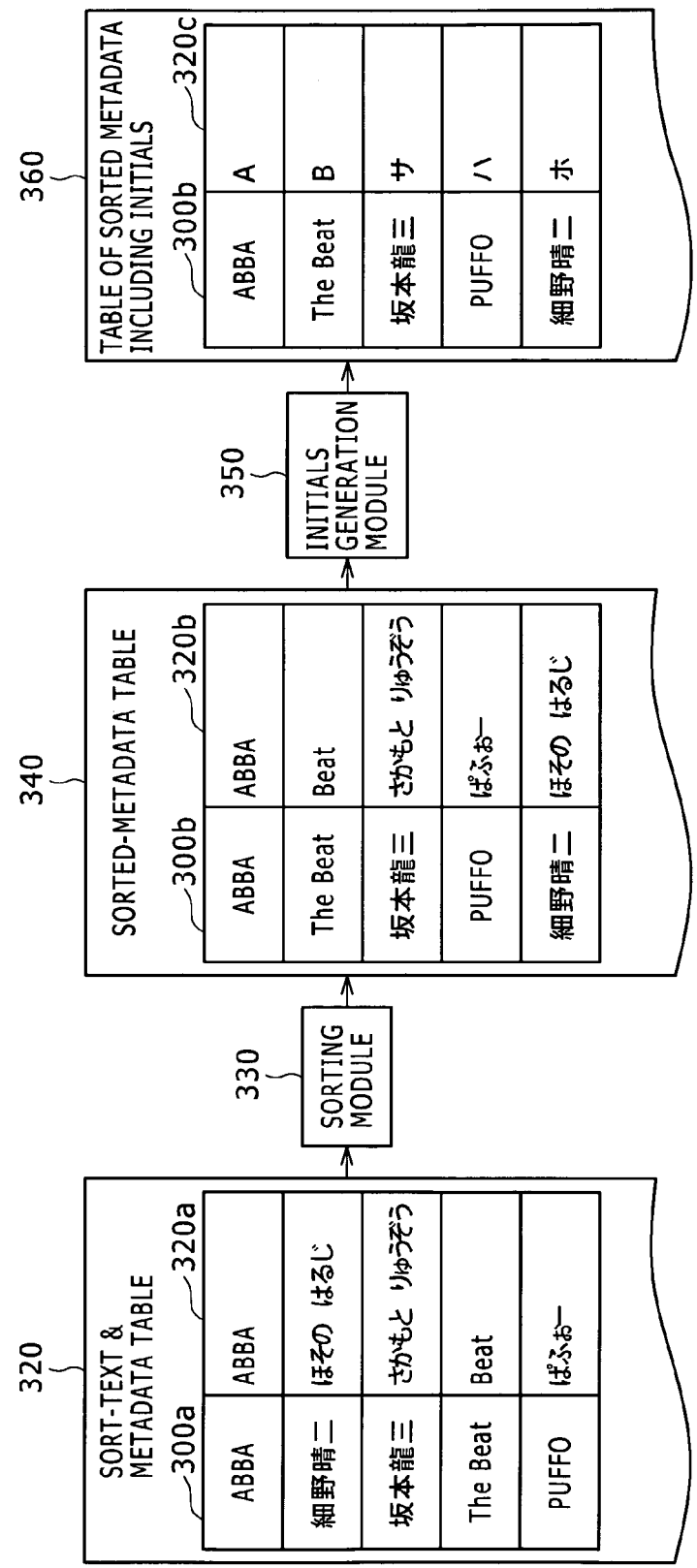

FIG. 23

JAPANESE VERSION

SORTED-INITIALS SETTING

SORT TEXT AUTOMATIC GENERATION AND SETTING

- ■ ATTACH HIRAGANA PRONUNCIATION
- ■ ATTACH PRONUNCIATIONS OF NICKNAMES
- ■ OMIT THE DEFINITE ARTICLES OF ENGLISH
- ■ OMIT THE HIRAGANA DEFINITE ARTICLES (ザ OMISSION)
- ☐ ATTACH PRONUNCIATIONS TO ARTIST NAMES DIFFICULT TO PRONOUNCE
- ☐ ATTACH PRONUNCIATIONS TO NUMBERS

SORTING-ORDER/INITIALS SETTING

- ◉ FOR USERS OF WESTERN MUSIC
  ABC..., NUMBERS, 「あ to ん」 and others

- ○ FOR USERS OF DOMESTIC MUSIC
  あ row, か row..., NUMBERS, [A to Z] and others

[ CANCEL ]  [ OK ]

FIG.25

| FOR PC SPECIFICATIONS | MODE | SORTING-ORDER SETTABLE CHARACTER TYPE |
|---|---|---|
| JAPANESE | JAPANESE MODE | NUMBERS & SYMBOLS/ALPHABETIC CHARACTERS/ JAPANESE (PRONUNCIATION) CHARACTERS/OTHERS |
| KOREAN | KOREAN MODE | HANGUL CHARACTERS & KOREAN KANJI (PRONUNCIATION)/ NUMBERS & SYMBOLS/ALPHABETIC CHARACTERS/OTHERS |
| CHINESE | CHINESE MODE | NUMBERS & SYMBOLS/ALPHABETIC CHARACTERS & KANTAI & HANTAI (PRONUNCIATION)/OTHERS |
| ENGLISH/GERMAN /FRENCH/ITALIAN/SPANISH | ALPHABETIC CHARACTER MODE | NUMBERS & SYMBOLS/ALPHABETIC CHARACTERS/OTHERS |
| RUSSIAN | RUSSIAN MODE | NUMBERS & SYMBOLS/ALPHABETIC CHARACTERS/ KURIL CHARACTERS/OTHERS |

FIG.27

| CHARACTER TYPE | TYPICAL INITIALS | BASIC SORTING RULES |
|---|---|---|
| ALPHABETIC CHARACTERS | A,B,C,...Z | (1) ALPHABETICAL ORDER (2) UPPER-CASE CHARACTER → LOWER-CASE CHARACTER |
| NUMBER & SYMBOLS | 1,2,3,...9 # | NUMBERS (CHARACTER-CODE ORDER) → SYMBOLS (CHARACTER-CODE ORDER) |
| HANGUL | HANGUL CONSONANTS (ㄱ, ㄴ ... ㅍ, ㅎ) AND KOREAN KANJI | DICTIONARY ORDER ( = CHARACTER-CODE ORDER) |
| JAPANESE | あ ROW, か ROW ... KANJI | (1) JAPANESE SYLLABARY ORDER (2) HIRAGANA → KATAKANA (3) NORMAL → SYLLABIC NASAL → VOICED CONSONANT → P-SOUND IN THE SYLLABARY (4) CHARACTER-CODE ORDER |
| ALPHABETIC CHARACTERS & KANTAI & HANTAI (ALPHABETIC-CHARACTER PRONUNCIATION) | A,B,C, ... Z, KANTAI CHARACTERS AND HANTAI CHARACTERS | (1) ALPHABETIC-CHARACTER A, CHINESE A, ALPHABETIC-CHARACTER B, CHINESE B, ... ALPHABETIC-CHARACTER Z, CHINESE Z (2) THE SAME AS THE ALPHABETIC-CHARACTER CHARACTER TYPE (3) CHARACTER-CODE ORDER |
| CYRILLIC CHARACTERS | CYRILLIC CHARACTERS (А, Б, ... Ю, Я) | (1) CYRILLIC-CHARACTER ORDER (2) UPPER-CASE CHARACTER → LOWER-CASE CHARACTER (3) CHARACTER-CODE ORDER |
| OTHERS | OTHERS | CHARACTER-CODE ORDER |

<INITIAL-CLASSIFIED ALL-CONTENT SEARCH/DISPLAY TABLE>
INITIALS (ORDER OF INITIALS) → CONTENT TITLES (PRONUNCIATION ORDER)

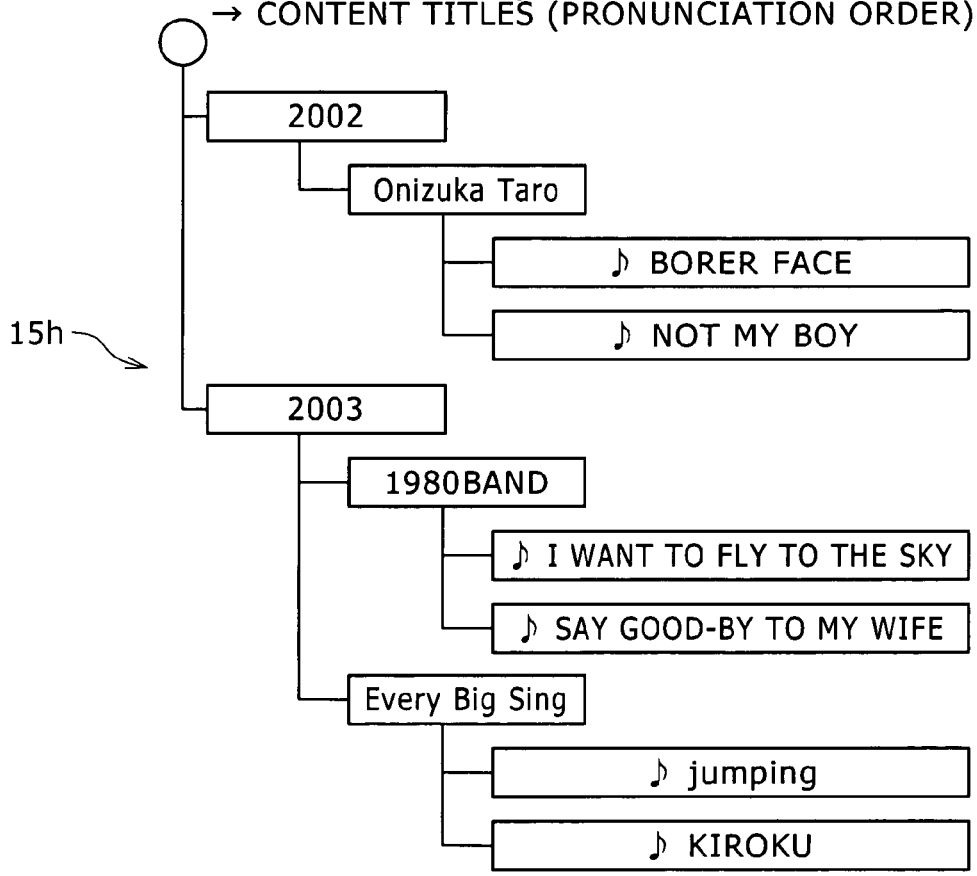

<USER-PLAYLIST-CLASSIFIED SEARCH/DISPLAY TABLE>
PLAYLISTS (CHARACTER-CODE ORDER)
→ CONTENT TITLES (ORDER DEFINED BY THE USER)

ND ASSOCIATED METHODOLOGY FOR
CONTENT TABLE GENERATION AND
TRANSFER

PROCESSING APPARATUS AND ASSOCIATED METHODOLOGY FOR CONTENT TABLE GENERATION AND TRANSFER

CROSS REFERENCES TO RELATED APPLICATIONS

The present invention contains subject matter related to Japanese Patent Application JP 2005-223411, filed in the Japanese Patent Office on Aug. 1, 2005, the entire contents of which being incorporated herein by reference.

BACKGROUND OF THE INVENTION

1. Field of the Invention

The present invention relates to an information-processing apparatus, a reproduction apparatus, a communication method, a reproduction method and computer programs.

2. Description of the Related Art

In recent years, a recording/reproduction apparatus having a large-capacity storage medium such as an HDD (Hard Disk Drive) or a semiconductor memory has been developed as a recording/reproduction apparatus for digital contents such as audio contents. In the following description, the digital content is referred to simply as a content. In general, the recording/reproduction apparatus that have been becoming popular include not only a PC (Personal Computer) functioning as an information-processing apparatus, but also a small-size portable reproduction apparatus (or a PD standing for a Portable Device), which is easy to carry. An example of the information-processing apparatus is a PC employing a storage medium with a large storage capacity. With the storage capacity of the storage medium increasing, the portable reproduction apparatus becomes capable of storing a large number of contents. For example, the contemporary portable reproduction apparatus is capable of storing several thousands or even several tens of thousands of musical contents.

In accordance with an apparatus utilization method, a content is generally transferred from an information-processing apparatus to a portable reproduction apparatus in which the content is reproduced. With regard to this apparatus utilization method, documents such as patent document 1 disclose a technology for easily transferring a large number of musical contents from an audio server to a portable audio player. Taken as patent document 1 in this specification is Japanese Patent Laid-open No. 2001-93226.

In an application where a large number of contents are transferred to a portable reproduction apparatus and reproduced in the device, however, it is necessary to speedily search a storage medium employed in the device as a medium used for storing the numerous contents for a desired one to be reproduced. The conventional portable reproduction apparatus has an RDB (Relational Database) used for storing a list of contents each associated with its attributes such as the title of the content, the name of an album serving as a collection including the content and the names of artists related to the content. A query process based on a search key is carried out to search the RDB for contents to be included in a created data table to serve as a displayed search/display table. Then, a display screen showing the displayed search/display table is generated. For example, by using the name of an artist as a search key, the RDB is searched for the names of albums created for the artist, and a table putting the names of the albums on a list is displayed.

SUMMARY OF THE INVENTION

In general, however, the portable reproduction apparatus has processing performance lower than the information-processing apparatus such as the PC. In addition, the portable reproduction apparatus has power limitation in comparison with the information-processing apparatus. Thus, for the portable reproduction apparatus, a query process carried out on the RDB on the basis of a search key to display a content-title search/display table on the screen is a heavy load. Accordingly, if this process has to be carried out by the portable reproduction apparatus, there is raised a problem that it takes much time to carry out the query process and complicated operations need to be carried out. On top of that, much battery power is also consumed. In order to solve these problems, in the case of the conventional portable reproduction apparatus, pieces of data are stored in the RDB by being sorted in a character-code order in a development process for mainly increasing the speed to search the RDB. As the number of contents stored in the RDB to be searched increases to the order of several thousands or even several tens of thousands, however, the problems of the processing speed and the power consumption are raised by all means.

In order to solve the problems raised by a reproduction apparatus having low processing performance and limited power as described above, inventors of the invention have provided an improved information-processing apparatus, an improved reproduction apparatus, an improved communication method and an improved reproduction method, which are capable of realizing high performance processing, as well as computer programs implementing the improved communication method and the improved reproduction method respectively.

In order to solve the problems described above, in accordance with an embodiment of the present invention, there is provided an information-processing apparatus, which can be connected to a reproduction apparatus. The information-processing apparatus is characterized in that the information-processing apparatus includes: a content storage section; a host storage section; a content identification section; an attribute extraction section; a table creation section; and a transfer section. The content storage section is a section configured to store a plurality of contents. The host storage section is a section configured to store a host database including attributes of each of the contents stored in the content storage section. The content identification section is a section configured to identify a plurality of contents stored in the reproduction apparatus. The attribute extraction section is a section configured to extract attributes of each of the identified contents from the host database. The table creation section is a section configured to create a plurality of tables provided with different types and each put in a layer structure including the titles of the identified contents as a lowest-level layer and the title of a group including the identified contents as a high-level layer on the basis of the extracted attributes. The transfer section is a section configured to transfer at least a first table and a second table to the reproduction apparatus wherein the first table is a table included in the created tables with different types as a table showing titles arranged in accordance with a first rule as the titles of the identified contents whereas the second table is a table included in the created tables with different types as a table showing titles, which are arranged in accordance with a second rule as the titles of the identified contents, for the name of every group including some of the identified contents.

It is possible to provide the information-processing apparatus with a configuration in which the first rule and the second rule are rules conforming to mutually different orders selected from a content-title pronunciation order, a content-title character-string order, an order of increasing content/track numbers, an order of decreasing evaluation values given to contents, an order of dates of adding contents to the reproduction apparatus, an order defined by the user and an order of reproduction dates of contents.

In addition, it is possible to provide the information-processing apparatus with a configuration in which: the attributes include the name of an album for contents as the name of a group including the contents; the first table is a table showing content titles arranged in the content-title pronunciation order or the content-title character-string order as the titles of the identified contents; and the second table is a table showing content titles arranged in the order of increasing content/track numbers as the titles of the identified contents for the name of every album serving as a collection of some of the identified contents.

In addition, it is possible to provide the information-processing apparatus with a configuration in which: the attributes include the name of an artist associated with contents as the name of a group including the contents; and the table creation section creates a third table showing titles arranged in the content-title pronunciation order or the content-title character-string order as the titles of identified contents for the name of every artist associated with some of the identified contents.

In addition, it is possible to provide the information-processing apparatus with a configuration further including a content updating section for adding a content stored in the content storage section employed in the information-processing apparatus to a content storage section employed in the reproduction apparatus and deleting a content from the content storage section employed in the reproduction apparatus. In this configuration, the content identification section identifies a plurality of contents stored in the content storage section employed in the reproduction apparatus on the basis of the substance of processing carried out by the content updating section to add a content stored in the content storage section employed in the information-processing apparatus to the content storage section employed in the reproduction apparatus or delete a content from the content storage section employed in the reproduction apparatus.

In addition, it is possible to provide the information-processing apparatus with a configuration in which the content identification section makes an access to the reproduction apparatus in order to acquire attributes of a plurality of contents stored in the reproduction apparatus and identifies the contents on the basis of the acquired attributes.

In addition, it is possible to provide the information-processing apparatus with a configuration in which the tables are search/display tables each forming a layer structure and corresponding to a plurality of display screens, which are to be displayed sequentially during a process to search for contents in the reproduction apparatus, on a one-to-one basis.

In addition, it is possible to provide the information-processing apparatus with a configuration in which the content-title search/display tables include any of the following tables. The tables are: an initial-classified all-content search/display table; an album-classified search/display table; an artist-classified search/display table; a genre-classified search/display table; a rating-classified search/display table; a release-year-classified search/display table; a transfer-period-classified search/display table; an artist-classified all-content search/display table; a user-playlist-classified search/display table; a reproduction-history-classified search/display table; and an artist-link-classified search/display table. The initial-classified all-content search/display table shows titles arranged in a content-title pronunciation order or a content-title character-string order as the titles of the identified contents for every initial used as a group name. The album-classified search/display table shows titles arranged in an order of increasing content/track numbers as the titles of the identified contents for every album name used as a group name. The artist-classified search/display table shows titles arranged in an order of increasing content/track numbers as the titles of the identified contents for every artist name and every album name, which are each used as a group name. The genre-classified search/display table shows titles arranged in an order of increasing content/track numbers as the titles of the identified contents for every artist name, every album name and every genre name, which are each used as a group name. The rating-classified search/display table shows titles arranged in an order of decreasing evaluation values each given to one of the identified contents as the titles of the identified contents for every evaluation-value level used as a group name. The release-year-classified search/display table shows titles arranged in a content-title pronunciation order or a content-title character-string order as the titles of the identified contents for at least every release date/time used as a group name. The transfer-period-classified search/display table shows titles arranged in an order of dates/times of adding contents to the reproduction apparatus for every transfer period used as a group name. The artist-classified all-content search/display table shows titles arranged in a content-title pronunciation order or a content-title character-string order as the titles of the identified contents for every artist name used as a group name. The user-playlist-classified search/display table shows titles arranged in an order defined by the user as the titles of the identified contents for every playlist used as a group name. The reproduction-history-classified search/display table shows titles arranged in an order of reproduction dates/times of the identified contents as the titles of the identified contents for every reproduction period used as a group name. The artist-link-classified search/display table shows titles arranged in an order of decreasing evaluation values each given to one of the identified contents as the titles of the identified contents for every artist name used as a group name.

In addition, in order to solve the problems described above, in accordance with another embodiment of the present invention, there is provided a reproduction apparatus, which can be connected to an information-processing apparatus. The reproduction apparatus is characterized in that the reproduction apparatus includes: a content storage section; a table acquisition section; a terminal storage section; a display control section; a content-title selection section; and a content reproduction section. The content storage section is a section configured to store a plurality of contents. The table acquisition section is a section configured to acquire a plurality of tables from the information-processing apparatus as tables provided with different types and each put in a layer structure including the titles of contents identified by the information-processing apparatus from the content storage section as a lowest-level layer and the name of a group including the identified contents as a high-level layer on the basis of attributes extracted from a host database including attributes of contents stored in a content storage section employed in the information-processing apparatus as the attributes of the identified contents. The terminal storage section is a section configured to store at least a first table and a second table wherein the first table is a table included in the acquired tables with different types as a table showing titles arranged in accordance with a first rule as the titles of the identified contents whereas the second table is a table included in the acquired tables with different types as a table showing titles, which are arranged in accordance with a second rule as the titles of the identified contents, for the name of every group including some of the identified contents. The display control section is a section configured to read out the first table from the terminal storage section in accordance with a first operation and displaying the titles arranged in the first table in accordance with the first rule as the titles of the identified contents on a display section as well as reading out the second table from the terminal storage section in accordance with a second operation and displaying the titles arranged in the second table in accordance with the second rule as the titles of the identified contents on the display section. The content-title selection section is a section configured to select one of content titles displayed by the display control section. The content reproduction section is a section configured to select a content identified by a content title selected by the content-title selection section from the contents stored in the content storage section employed in the reproduction apparatus and reproducing the selected content.

It is possible to provide the reproduction apparatus with a configuration in which the first rule and the second rule are rules conforming to mutually different orders selected from a content-title pronunciation order, a content-title character-string order, an order of increasing content/track numbers, an order of decreasing evaluation values given to contents, an order of dates of adding contents to the reproduction apparatus, an order defined by the user and an order of reproduction dates of contents.

In addition, it is possible to provide the reproduction apparatus with a configuration in which: the attributes include the name of an album serving as a collection of contents as the name of a group including the contents; the first table is a table showing content titles arranged in the content-title pronunciation order or the content-title character-string order as the titles of the identified contents; and the second table is a table showing content titles arranged in the order of increasing content/track numbers as the titles of the identified contents for the name of every album serving as a collection of some of the identified contents.

In addition, in order to solve the problems described above, in accordance with a further embodiment of the present invention, there is provided a communication method to be adopted by an information-processing apparatus connectable to a reproduction apparatus. The communication method is characterized in that the communication method includes: a content identification step; an attribute extraction step; a table creation step; and a transfer step. The content identification step is a step of identifying a plurality of contents stored in the reproduction apparatus. The attribute extraction step is a step of extracting attributes of each of the identified contents from a host database including attributes of each of the contents stored in a content storage section employed in the information-processing apparatus. The table creation step is a step of creating a plurality of tables provided with different types and each put in a layer structure including the titles of the identified contents as a lowest-level layer and the name of a group including the identified contents as a high-level layer on the basis of the extracted attributes. The transfer step is a step of transferring at least a first table and a second table to the reproduction apparatus wherein the first table is a table included in the created tables with different types as a table showing titles arranged in accordance with a first rule as the titles of the identified contents whereas the second table is a table included in the created tables with different types as a table showing titles, which are arranged in accordance with a second rule as the titles of the identified contents, for the name of every group including some of the identified contents.

In addition, in order to solve the problems described above, in accordance with a still further embodiment of the present invention, there is provided a reproduction method to be adopted by a reproduction apparatus connectable to an information-processing apparatus. The reproduction method is characterized in that the reproduction method includes: a table acquisition step; a terminal storage step; a display control step; a content-title selection step; and a content reproduction step. The table acquisition step is a step of acquiring a plurality of tables from the information-processing apparatus as tables provided with different types and each put in a layer structure including the titles of contents identified by the information-processing apparatus from a content storage section employed in the reproduction apparatus as a lowest-level layer and the name of a group including the identified contents as a highest-level layer on the basis of attributes extracted from a host database including attributes of contents stored in a content storage section employed in the information-processing apparatus as the attributes of the identified contents. The terminal storage step is a step of storing at least a first table and a second table into a terminal storage section employed in the reproduction apparatus wherein the first table is a table included in the acquired tables as a table showing titles arranged in accordance with a first rule as the titles of the identified contents whereas the second table is a table included in the acquired tables with different types as a table showing titles, which are arranged in accordance with a second rule as the titles of the identified contents, for the name of every group including some of the identified contents. The display control step is a step of reading out the first table from the terminal storage section in accordance with a first operation and displaying the titles arranged in the first table in accordance with the first rule as the titles of the identified contents on a display section as well as reading out the second table from the terminal storage section in accordance with a second operation and displaying the titles arranged in the second table in accordance with the second rule as the titles of the identified contents on the display section. The content-title selection step is a step of selecting one of content titles displayed at the display control step. The content reproduction step is a step of selecting a content identified by a content title selected at the content-title selection step from the contents stored in the content storage section employed in the reproduction apparatus and reproducing the selected content.

In addition, in order to solve the problems described above, in accordance with a still further embodiment of the present invention, there is provided a recording medium on or in which a computer-readable program for an information-processing apparatus connectable to a reproduction apparatus is recorded, the program carries out: a content identification process; an attribute extraction process; a table creation process; and a transfer process. The content identification process is a process of identifying a plurality of contents stored in the reproduction apparatus. The attribute extraction process is a process of extracting attributes of each of the identified contents from a host database including attributes of each of the contents stored in a content storage section employed in the information-processing apparatus. The table creation process is a process of creating a plurality of tables provided with different types and each put in a layer structure including the titles of the identified contents as a lowest-level layer and the name of a group including the identified contents as a high-level layer on the basis of the extracted attributes. The transfer process is a process of transferring at least a first table and a second table to the reproduction apparatus wherein the first table is a table included in the created tables with different types as a table showing titles arranged in accordance with a first rule as the titles of the identified contents whereas the second table is a table included in the created tables with different types as a table showing titles, which are arranged in accordance with a second rule as the titles of the identified contents, for the name of every group including some of the identified contents.

In addition, in order to solve the problems described above, in accordance with a still further embodiment of the present invention, there is provided a recording medium on or in which a computer-readable program for a reproduction apparatus connectable to an information-processing apparatus is recorded, the program carries out: a table acquisition process; a terminal storage process; a display control process; a content-title selection process; and a content reproduction process. The table acquisition process is a process of acquiring a plurality of tables from the information-processing apparatus as tables provided with different types and each put in a layer structure including the titles of contents identified by the information-processing apparatus from a content storage section employed in the reproduction apparatus as a lowest-level layer and the name of a group including the identified contents as a high-level layer on the basis of attributes extracted from a host database including attributes of contents stored in a content storage section employed in the information-processing apparatus as the attributes of the identified contents. The terminal storage process is a process of storing at least a first table and a second table into a terminal storage section employed in the reproduction apparatus wherein the first table is a table included in the acquired tables as a table showing titles arranged in accordance with a first rule as the titles of the identified contents whereas the second table is a table included in the acquired tables with different types as a table showing titles, which are arranged in accordance with a second rule as the titles of the identified contents, for the name of every group including some of the identified contents. The display control process is a process of reading out the first table from the terminal storage section in accordance with a first operation and displaying the titles arranged in the first table in accordance with the first rule as the titles of the identified contents on a display section as well as reading out the second table from the terminal storage section in accordance with a second operation and displaying the titles arranged in the second table in accordance with the second rule as the titles of the identified contents on the display section. The content-title selection process is a process of selecting one of content titles displayed at the display control step. The content reproduction process is a process of selecting a content identified by a content title selected at the content-title selection step from the contents stored in the content storage section employed in the reproduction apparatus and reproducing the selected content.

In accordance with the configurations described above, when the information-processing apparatus and the reproduction apparatus are connected to each other, the information-processing apparatus identifies contents stored in the reproduction apparatus, and extracts attributes of the identified contents from the host database employed in the information-processing apparatus. Further, the information-processing apparatus creates a first table having a layer structure including titles sorted in accordance with the first rule (such as content-title pronunciation order or the content-title charac-ter-string order) as the titles of the identified contents associated with the extracted attributes and a second table having a structure including titles, which are sorted in accordance with the second rule (such as the order of increasing content/track numbers) as the titles of the identified contents associated with the extracted attributes, for the name of every group including some of the identified contents. Still further, the information-processing apparatus transmits the first and second tables to the reproduction apparatus.

Thus, on the basis of the first and second tables, the reproduction apparatus is capable of displaying the titles of contents stored in the reproduction apparatus in formats sorting the titles in accordance with at least two different types of rule and allowing the displayed content titles to be searched in an advanced manner. In addition, the reproduction apparatus itself thus no longer needs to carry out processing create a table showing content titles to be displayed and searched. That is to say, the reproduction apparatus needs merely to display the stored tables as they are for every layer. As a result, the processing load borne by the reproduction apparatus can be reduced and the consumption of power generated by the battery employed in the portable reproduction apparatus can also be decreased as well. Accordingly, even a reproduction apparatus having low processing performance and limited battery power is capable of realizing the advanced process to search for a content.

As described above, in accordance with the present invention, even a reproduction apparatus having low processing performance and limited power is capable of realizing the advanced process to search for a content.

BRIEF DESCRIPTION OF THE DRAWINGS

These and other objects and features of the present invention will become clear from the following description of preferred embodiments given with reference to accompanying diagrams, in which:

FIGS. 2A and 2B are explanatory diagrams showing respectively a relational database and an artist-classified search/display table, which are stored in the conventional portable reproduction apparatus;

FIG. 3 is a conceptual diagram referred to in explanation of a technique to display a content-title search screen in a portable reproduction apparatus according to a first embodiment of the present invention;

FIGS. 4A and 4B are explanatory diagrams showing search/display tables stored in the portable reproduction apparatus according to the embodiment as tables of different formats;

FIGS. 9A and 9B are explanatory diagrams showing a relation between a log of events and reproduction operations in the embodiment;

FIG. 10 is an explanatory diagram referred to in explanation of the event log according to the embodiment;

FIG. 11 is an explanatory diagram showing a typical format of the event log according to the embodiment;

FIG. 12 is an explanatory diagram showing reproduction operations each associated with a log of events in the embodiment;

FIG. 14 is an explanatory diagram showing data recorded in an analysis-result recording section according to the embodiment;

FIG. 15 is an explanatory diagram showing data recorded in an analysis-result recording section according to the embodiment;

FIG. 17 is an explanatory diagram referred to in description of a concrete method to process a computed evaluation value in accordance with the embodiment;

FIG. 18 is an explanatory diagram showing data recorded in a host database according to the embodiment;

FIG. 20 is a functional block diagram showing functions of the information-processing apparatus according to the embodiment;

FIG. 21 is an explanatory diagram referred to in description of a process to generate a source text in accordance with the embodiment;

FIG. 22 is an explanatory diagram referred to in description of a process to generate initials in accordance with the embodiment;

FIG. 23 is a diagram showing a user setting screen provided by the embodiment as a screen of a Japanese version;

FIG. 25 is a diagram showing typical sorted set items according to a language environment provided by the embodiment;

FIG. 27 is a diagram showing initials sorting orders that can be set for different character types provided by the embodiment;

FIG. 28H is an explanatory diagram showing the data structure of a release-year-classified search/display table according to the embodiment;

DETAILED DESCRIPTION OF THE PREFERRED EMBODIMENTS

Figure 1:
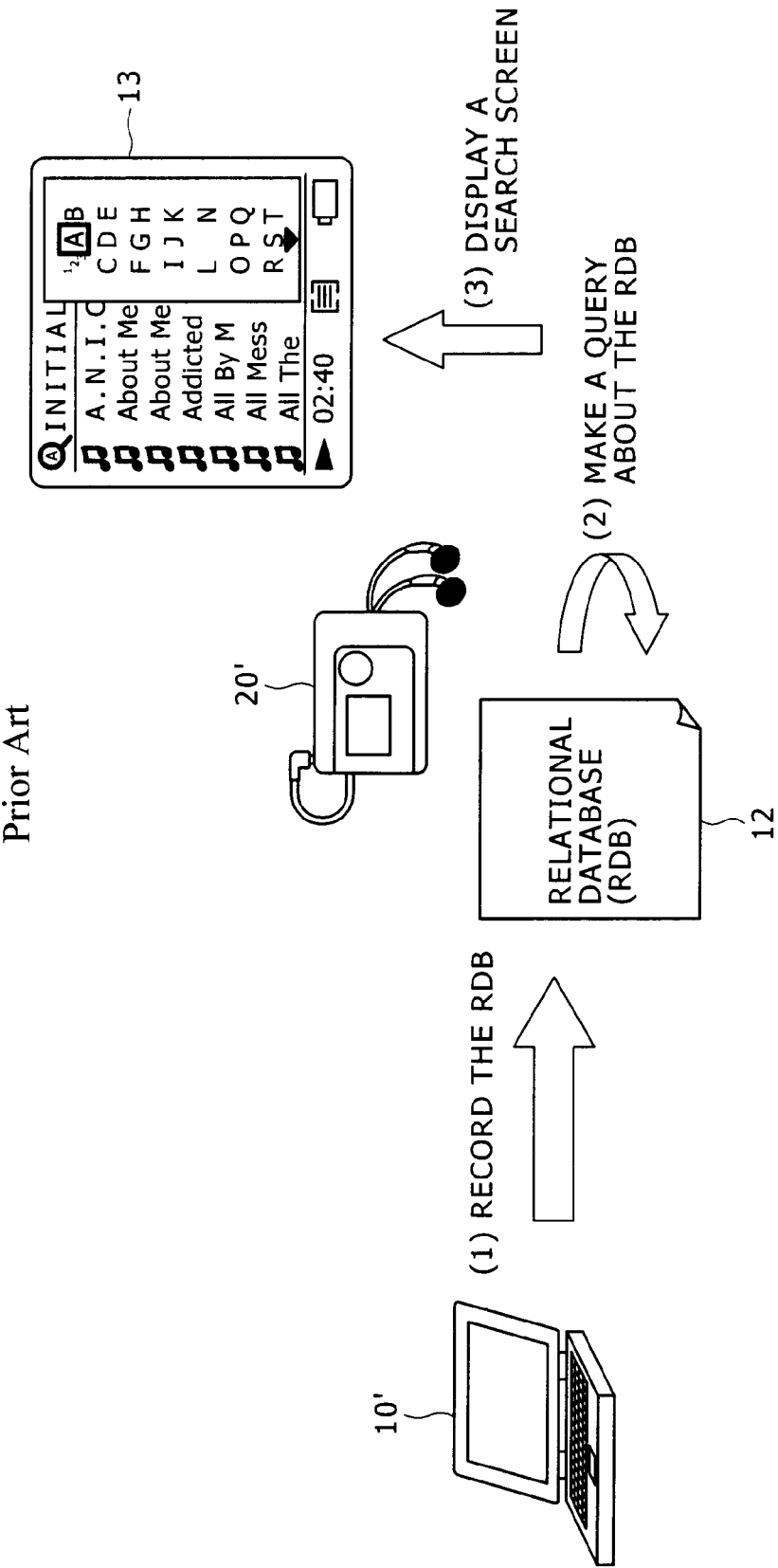
FIG. 1 is a conceptual diagram referred to in explanation of a method to display a content-title search screen in the conventional portable reproduction apparatus.

Preferred embodiments of the present invention are explained in detail by referring to diagrams as follows. Configuration elements essentially having the same functional configuration are denoted by the same reference numeral throughout this patent specification and the diagrams, and such configuration elements are each explained only once to avoid duplications.

First Embodiment

The following description explains an information-processing apparatus, a reproduction apparatus, a communication method, a reproduction method, a communication-method computer program and a reproduction-method computer program, which are provided by a first embodiment of the present invention.

Outline of the Embodiment

The description explains an outline of a relation between an information-processing apparatus 10 and a portable reproduction apparatus 20, which are employed in a communication system according to the first embodiment of the present invention.

Prior to the explanation of such an outline, first of all, the description explains a relation between the information-processing apparatus 10' and the portable reproduction apparatus 20' in the conventional communication system by referring to FIG. 1, FIG. 2A and FIG. 2B.

As shown in FIG. 1, in the conventional communication system, the information-processing apparatus 10' has a relational database 12, which is abbreviated hereafter to an RDB. The information-processing apparatus 10' transfers the RDB 12 to the portable reproduction apparatus 20', which then records the RDB 12 in a memory. As shown in FIG. 2A, the RDB 12 is a database associating each content with attributes of the content. The attributes of a content include the name of an artist related to the content, the name of an album serving as a collection including the content, the title of the content and the track number of the content.

Thus, in order to output a content-title search screen 13 of contents in the conventional portable reproduction apparatus 20', first of all, it is necessary to perform a query on the RDB 12 and create an artist search/display table 14 with a structure like one shown in FIG. 2B for every search key. In a process to display the content-title search screen 13 by utilizing the artist search/display table 14, first of all, on the basis of records stored in the RDB 12 as records of all contents, a table is created and displayed as a table showing album titles sorted (rearranged) by taking the names of artists as a search key. In addition, when the name of an album is further entered as a search key, a table is further created and displayed as a table showing titles sorted in an order of increasing content/track numbers as the titles of tracks (contents) included in the album.

As described above, in the conventional communication system, in order to display a content-title search screen 13, the portable reproduction apparatus 20' had to perform a query on the RDB 12 each time a search key is entered. However, this query processing is a heavy computation load. Thus, for a portable reproduction apparatus 20' with low processing performance, it takes time to carry out the query processing. In addition, since the power consumption is also large, the portable reproduction apparatus 20' also raises a problem that the query processing also has a bad effect on the life of the battery employed in the portable reproduction apparatus 20' while the portable reproduction apparatus 20' is being carried by the user. In order to solve the problems, the power consumption of the conventional portable reproduction apparatus 20' is reduced by devising a method to store data in the RDB 12. A typical method to store data in the RDB 12 is adoption of a hash table. By devising a method to store data in the RDB 12 in this way, however, the processing load naturally increases when the number of contents stored in the portable reproduction apparatus 20' rises to an extremely large value such as several thousands or several tens of thousands. In this case, the processing speed unavoidably decreases and the battery power consumption increases inevitably.

Next, by referring to FIGS. 3 and 4, the following description roughly explains a relation between an information-processing apparatus 10 and a portable reproduction apparatus 20, which are provided in accordance with the first embodiment of the present invention. FIG. 3 is a conceptual diagram referred to in explanation of a technique to display a content-title search screen 16 in the portable reproduction apparatus 20 according to the first embodiment of the present invention whereas FIGS. 4A and 4B are explanatory diagrams showing respectively content-title search/display tables 15a and 15b stored in the portable reproduction apparatus 20 according to the embodiment as tables of different formats.

As shown in FIG. 3, in accordance with the embodiment, the information-processing apparatus 10 creates a plurality of content-title search/display tables 15 with different formats in advance as tables usable in the portable reproduction apparatus 20. Then, the information-processing apparatus 10 transfers the content-title search/display tables 15 to the portable reproduction apparatus 20 to be stored in the portable reproduction apparatus 20.

The content-title search/display tables 15 with different formats include an album-classified search/display table 15a, an artist-classified search/display table 15b, a genre-classified search/display table 15c and an initial-classified all-content search/display table 15d. As shown in FIG. 4A, the album-classified search/display table 15a has a two-layer structure consisting of a layer of album names and a layer of tracks (or content titles). As shown in FIG. 4B, on the other hand, the artist-classified search/display table 15b has a three-layer structure consisting of a layer of artist names, a layer of album names and a layer of tracks (or content titles). The content-title search/display tables 15 with different formats have data structures corresponding to display screens, which are sequentially displayed during a process to search for a content (a piece of music) in the portable reproduction apparatus 20, on a one-to-one basis.

Since the portable reproduction apparatus 20 holds such search/display tables 15, the portable reproduction apparatus 20 is characterized in that the portable reproduction apparatus 20 is capable of displaying the album-classified search/display table 15a, the artist-classified search/display table 15b, the genre-classified search/display table 15c and the initial-classified all-content search/display table 15d as they are each as a content-table search screen 16 without making queries about the RDB 12 as is the case with the conventional communication system. Thus, since the portable reproduction apparatus 20 bears a query-processing computation load of zero, the portable reproduction apparatus 20 offers merits that the operation to search a content-title search screen for a content can be carried out at a high speed and the consumption of power supplied by the battery can be reduced.

The following description explains details of a configuration for implementing a technique to display content-title search screens in the portable reproduction apparatus 20 according to the embodiment.

<System Configuration>

Figure 5:
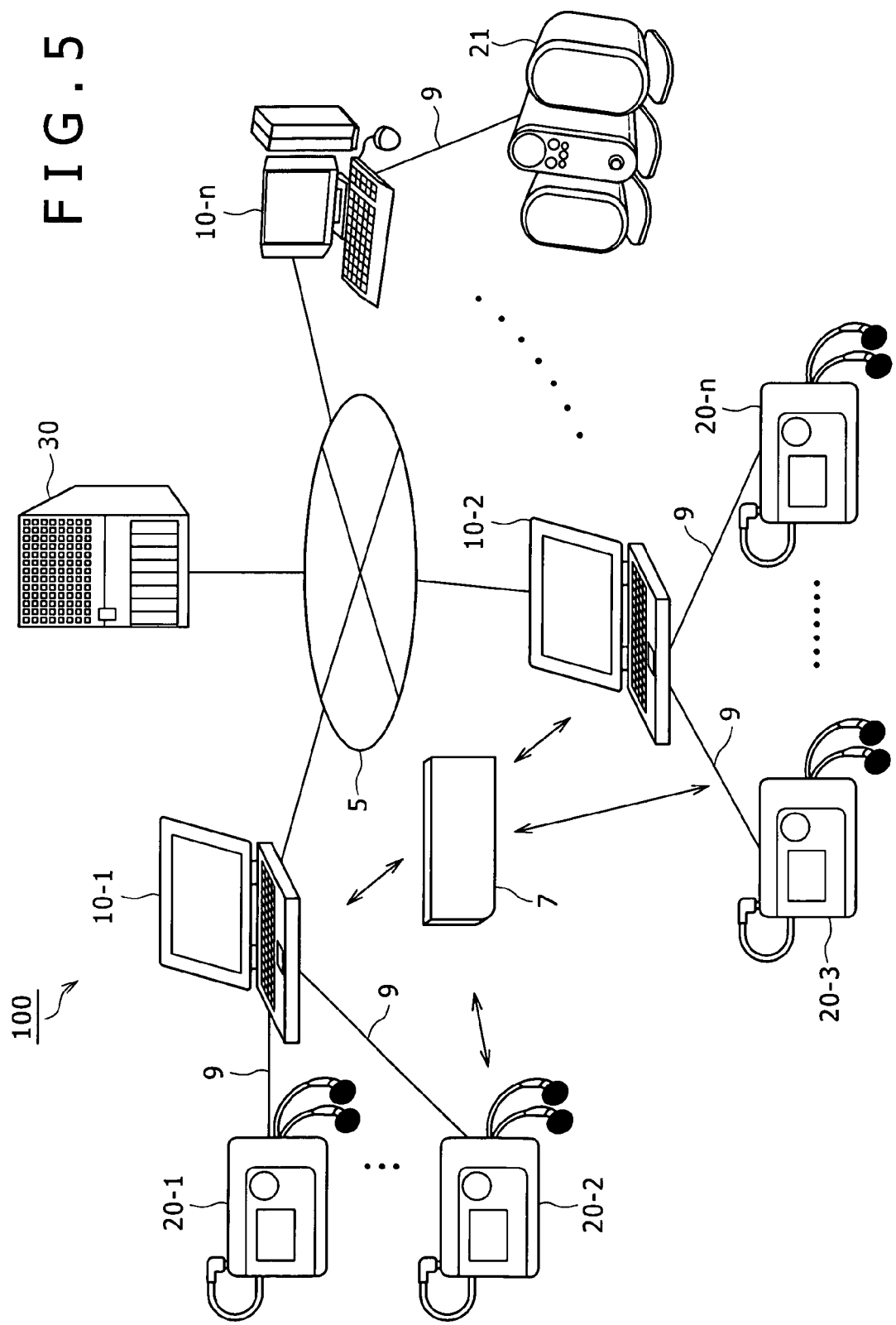
FIG. 5 is a block diagram roughly showing the entire configuration of a communication system according to the embodiment.

To begin with, the entire configuration of the communication system 100 according to the embodiment is explained by referring to FIG. 5. FIG. 5 is a block diagram roughly showing the entire configuration of the communication system 100 according to the embodiment.

As shown in FIG. 5, the communication system 100 according to the embodiment typically includes a plurality of information-processing apparatus 10-1, 10-2, - - - and 10-n, a plurality of portable reproduction apparatus 20-1, 20-2, - - - and 20-n, a stationary reproduction apparatus 21, a content distribution server 30, a network 5 and a local line 9 for communicating the foregoing equipments, and a removable storage medium 7. In the following description, each of the information-processing apparatus (PCs) 10-1, 10-2, - - - and 10-n may also be referred to as an information-processing apparatus 10 or simply a PC 10 if there is no need to distinguish each apparatus. By the same token, each of the portable reproduction apparatus (PDs) 20-1, 20-2, - - - and 20-n may also be referred to as a portable reproduction apparatus 20 or simply a PD 20 if there is no need to distinguish each apparatus.

In this embodiment, a content can be an audio content, a video content or a content of any other type. Examples of the audio content are a piece of music, a lecture and a radio program. The video content can be a static-picture content such as a photo, a drawing or a table or a moving-picture content such as a movie, a television program or a video program. Examples of the content of any other type are an electronic book (E-book), a game and computer software. In particular, in the following description, a content typically means an audio content or, to be more specific, a musical content distributed by a content providing server or a musical content ripped from a musical CD. However, the scope of the present invention is by no means limited to such typical contents. In addition, a content according to the embodiment can be a content controlled or uncontrolled in accordance with a copyright management method such as a check-in/check-out method or a group management method.

The information-processing apparatus 10 is a recording/reproduction apparatus for recording contents into a memory and reproducing contents from the memory. To put it more concretely, the information-processing apparatus 10 is typically configured to function as a computer such as a personal computer referred to hereafter as a PC, which can be a PC of the note type or the desktop type. However, the scope of the present invention is by no means limited to such a computer configuration. The information-processing apparatus 10 can be configured to serve as any apparatus having a function to carry out communications through the network 5. For example, the information-processing apparatus 10 can also have the configuration of an apparatus such as a PDA (Personal Digital Assistant), a home game machine or an information home appliance.

The information-processing apparatus 10 is connected to the content distribution server 30 through the network 5 in a state of being communicatable with the content distribution server 30. The information-processing apparatus 10 typically includes software installed therein to function as a program for rendering a content distribution service or software installed therein to function as a program for rendering a ripping-content sharing service. The information-processing apparatus 10 is capable of receiving a content distributed from the content distribution server 30 and storing the distributed content in a content storage section or recording means such as the removable storage medium 7. In the following description, a content distributed from the content distribution server 30 is referred to as a distributed content.

In addition, the information-processing apparatus 10 is also capable of newly creating a content and storing the newly created content in the content storage section or the removable storage medium 7. Typically, the information-processing apparatus 10 newly creates a content by carrying out processing such as a self-audio-recording/self-video-recording process or a rippling process. It is to be noted that the self-recording process is a process carried out by the information-processing apparatus 10 to record an image and sound respectively taken and picked up by photographing and sound-picking sections employed in the information-processing apparatus 10 itself into a memory as video and audio digital data. The ripping process is a process to extract digital content recorded on a storage medium such as a musical CD, a video DVD or a software CD-ROM, convert the content into a content having the format of a file that can be processed by a computer and record the file onto the content storage section or the removable storage medium 7. Examples of the digital content are audio data and video data.

The information-processing apparatus 10 typically carries out a compression-encoding process on a distributed content or a ripped content, encrypts the content obtained as a result of the compression-encoding process, and records the encrypted content in the content storage section or the removable storage medium 7. In the compression-encoding process, a content is compressed by adoption of a predetermined compression-encoding method such as an ATRAC3 (Advanced Transform Acoustic Coding 3) method or an MP3 (MPEG Audio Layer-3) method. As for the encryption, the information-processing apparatus 10 adopts an encryption method such as a DES (Data Encryption Standard).

In addition, the information-processing apparatus 10 is capable of exchanging a distribution or ripped content with another information-processing apparatus 10 through the network 5 and exchanging a distribution or ripped content with the portable reproduction apparatus 20 through a local line 9. As an alternative, the information-processing apparatus 10 exchanges a distribution or ripped content with another information-processing apparatus 10 and the portable reproduction apparatus 20 by using a removable storage medium 7. In this way, a content can be exchanged and shared among a plurality of information-processing apparatus 10 and a plurality of portable reproduction apparatus 20.

The portable reproduction apparatus 20 is an apparatus configured to function as a portable reproduction apparatus, which may be abbreviated hereafter to a PD. The PD is a portable apparatus for reproducing contents. To put it more concretely, the portable reproduction apparatus 20 is configured to function as a portable audio player provided with an HDD (Hard Disk Drive) having a typical storage capacity of several tens of GB. However, the portable reproduction apparatus 20 is by no means limited to such a configuration. That is to say, the portable reproduction apparatus 20 can also be configured to function as any of a variety of portable apparatus such as a portable video/audio player, a PDA, a hand phone and a PHS. In addition, the storage medium embedded in the portable reproduction apparatus 20 or the mountable and removable storage medium 7 does not have to be an HDD. Instead, these storage mediums can each be any random-access recording medium such as an optical disk, a magneto-optical disk, a flash memory, a FeRAM or a magnetic disk. It is to be noted that the portable reproduction apparatus 20 can also be an apparatus designed specially for only reproducing contents.

The portable reproduction apparatus 20 can be connected locally to an information-processing apparatus 10 by using a local line 9 or the like in a configuration allowing various kinds of data to be exchanged between the portable reproduction apparatus 20 and the information-processing apparatus 10. The local line 9 is a wire cable such as a USB (Universal Serial Bus) cable or an SCSI (Small Computer System Interface) cable. It is to be noted that the portable reproduction apparatus 20 can be connected locally to the information-processing apparatus 10 in a configuration allowing radio communications to be carried out between the information-processing apparatus 10 and the portable reproduction apparatus 20.

The portable reproduction apparatus 20 is capable of reproducing a content transferred from the information-processing apparatus 10 by way of the local line 9 and a content provided to the portable reproduction apparatus 20 by using a removable storage medium 7.

The stationary reproduction apparatus 21 is typically configured to function as, for example, a music recording/reproduction apparatus of the stationary type. The stationary reproduction apparatus 21 has about the same functions as the portable reproduction apparatus 20. In the following description, mainly, a typical portable reproduction apparatus 20 is explained in detail as a reproduction apparatus. However, the explanation also holds true of the stationary reproduction apparatus 21.

The content distribution server 30 is configured typically as a computer having functions of a server. The content distribution server 30 is a server for rendering a service to provide contents. At a request made by the information-processing apparatus 10 as a request for transmission of a content to the information-processing apparatus 10, the content distribution server 30 transmits the content to the information-processing apparatus 10 by way of the network 5.

The content distribution server 30 is typically an EMD (Electronic Music Distribution) server for rendering an EMD service. The content distribution server 30 carries out a compression/encoding process on a musical content, which is to be transmitted to an information-processing apparatus 10, typically by adoption of the ATTRAC3 or MP3 method, encrypts a content obtained as a result of the compression/encoding process typically by adoption of the DES encryption method and transmits the encrypted content to the information-processing apparatus 10. In addition, the content distribution server 30 also encrypts a content key to be used for decrypting the encrypted content and transmits the encrypted content key to the information-processing apparatus 10 along with the encrypted content. With the transmission of the content to the information-processing apparatus 10, the content distribution server 30 carries out processing to charge a price to the user purchasing the content.

The network 5 is a communication-line network for connecting the information-processing apparatus 10 to the content distribution server 30 in a state allowing communications to be carried out in both directions. The network 5 is configured to function as a public line network or a leased line network. The public line network or the leased line network can be a radio or wire communication network. Examples of the public line network are the Internet, the telephone line network and the satellite communication network. On the other hand, the leased line network can be a WAN (Wide Area Network), a LAN (Local Area Network) or an IP-VPN (Internet Protocol Virtual Private Network).

In addition, the network 5 includes a private network. The private network is a network for connecting a plurality of information-processing apparatus 10 to each other to share contents within a range, which is private from the copyright-management point of view. Examples of the private network are a network for connecting a plurality of information-processing apparatus 10 used by the same user, a home network for connecting a plurality of information-processing apparatus 10 used at the same home and a LAN for connecting a plurality of information-processing apparatus 10 used in a limited small group such as a company or a group of friends.

The removable storage medium 7 is a storage medium used for storing contents and attributes of each content. The removable storage medium 7 can be mounted on an information-processing apparatus 10 or a portable reproduction apparatus 20 and removed from an information-processing apparatus 10 or a portable reproduction apparatus 20. Examples of the removable storage medium 7 are a variety of optical disks, a magnetic disk and a variety of semiconductor memories. The optical disks include a DVD-R, a DVD-RW, a DVD-RAM, a CD-R, a CD-RW, a magneto-optical disk, and so on. Examples of the magnetic disk are a flexible disk and a hard disk. It is to be noted that the removable storage medium 7 can also be a storage medium having a copyright management function for restricting operations to copy and reproduce a content stored thereon by using an encryption key or the like as operation-limiting means.

The removable storage medium 7 functions as a medium for exchanging contents among information-processing apparatus 10. For example, the information-processing apparatus 10-1 writes a content onto a removable storage medium 7, which is then mounted onto the information-processing apparatus 10-2. By letting the information-processing apparatus 10-2 read out the content from the removable storage medium 7, the content can be provided from the information-processing apparatus. 10-1 to the information-processing apparatus 10-2. In addition, the removable storage medium 7 can also be used for exchanging a content between an information-processing apparatus 10 and a portable reproduction apparatus 20 that cannot be connected to the network 5 and the local line 9. On top of that, the removable storage medium 7 also functions as a medium for exchanging attributes of contents among information-processing apparatus 10. Furthermore, the removable storage medium 7 can also be inserted into a content sales terminal provided typically in front of a store to store a purchased content in accordance with an operation carried out by the user. Then, the purchased content can be presented to an information-processing apparatus 10 by letting the information-processing apparatus 10 read out the content from the removable storage medium 7. It is to be noted that the content sales terminal itself is not shown in the figure.

<Hardware Configuration of the Information-Processing Apparatus (PC)>

Figure 6:
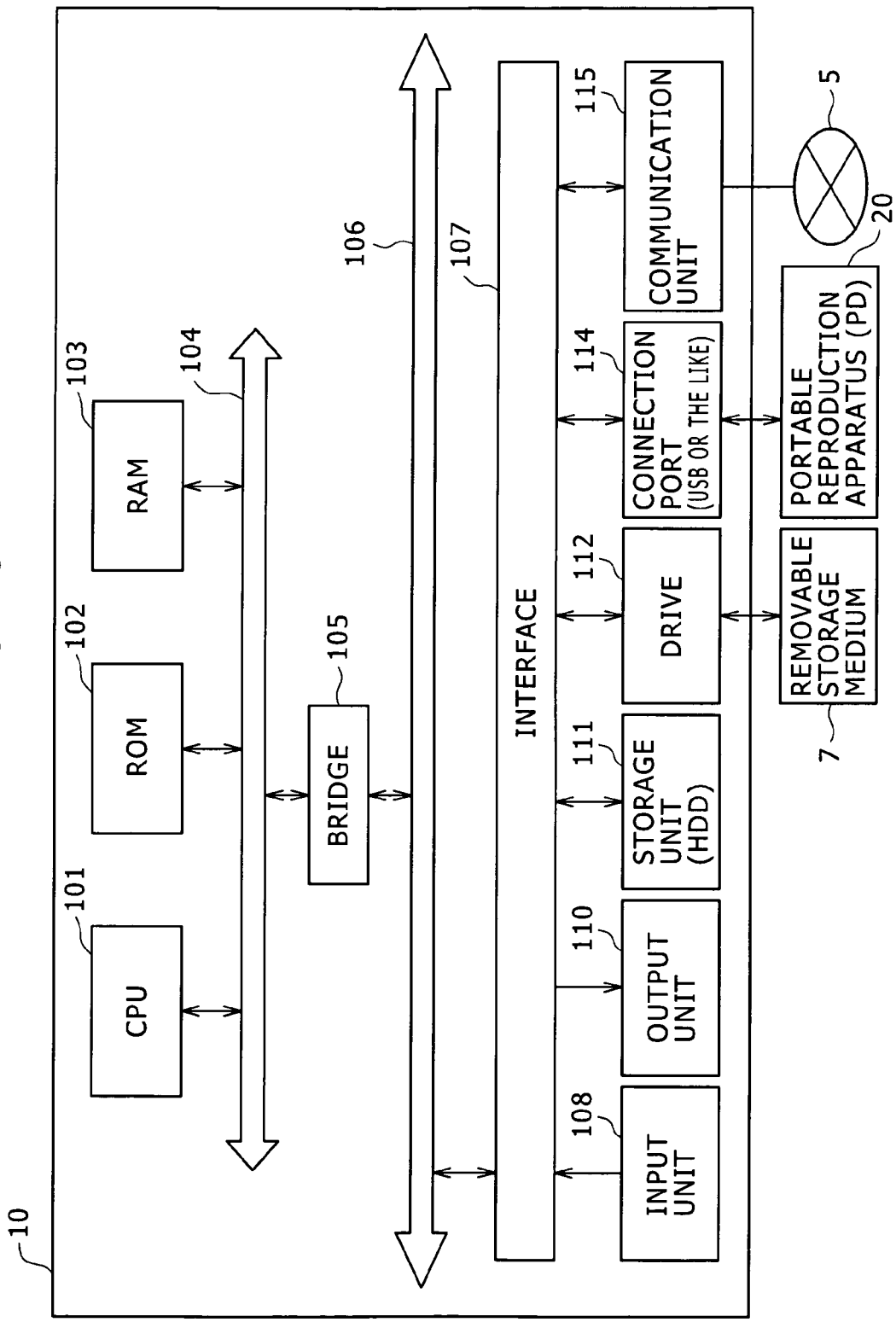
FIG. 6 is a block diagram roughly showing a typical hardware configuration of an information-processing apparatus according to the embodiment.

Next, the hardware configuration of the information-processing apparatus 10 according to the embodiment is explained by referring to FIG. 6. FIG. 6 is a block diagram roughly showing a typical hardware configuration of the information-processing apparatus 10 according to the embodiment.

As shown in FIG. 6, the information-processing apparatus 10 typically includes a CPU (Central Processing Unit) 101, a ROM (Read Only Memory) 102, a RAM (Random Access Memory) 103, a host bus 104, a bridge 105, an external bus 106, an interface 107, an input unit 108, an output unit 110, an HDD (Hard Disk Drive) serving as a storage unit 111, a drive 112, a connection port 114 and a communication unit 115.

The CPU 101 is a unit functioning as a processing section as well as a control section. By executing a variety of programs, the CPU 101 controls the other components employed in the information-processing apparatus 10. The ROM 102 is a memory used for storing the programs to be executed by the CPU 101 and data such as processing parameters. The RAM 103 is a memory used for temporarily storing a program being executed by the CPU 101 and data such as processing parameters varying from time to time during execution of a program. The CPU 101, the ROM 102 and the RAM 103 are connected to each other by the host bus 104, which includes a CPU bus.

The host bus 104 is connected by the bridge 105 to the external bus 106 such as a PCI (Peripheral Component Interconnect/Interface) bus.

The input unit 108 includes operation means and an input control circuit for generating an input signal and supplying the input signal to the CPU 101. The operation means typically includes a mouse, a keyboard, a touch panel, buttons, switches and a lever. By operating the input unit 108, the user of the information-processing apparatus 10 is capable of entering various kinds of data to the information-processing apparatus 10 and commands requesting the information-processing apparatus 10 to carry out processing operations.

The output unit 110 includes a display unit and a sound outputting unit such as a speaker. The display unit can be a CRT (Cathode Ray Tube) display unit, an LCD (Liquid Crystal Display) unit and/or display lamps. The output unit 110 is a section for outputting a reproduced content and other information. To put it concretely, the display unit displays various kinds of information such as a reproduced movie in the form of a text or an image. On the other hand, the sound outputting unit generates reproduced sounds or the like.

The storage unit 111 is a unit for storing data. The storage unit 111 is a typical storage section employed in the information-processing apparatus 10 according to the embodiment. For example, the storage unit 111 is configured as an HDD (Hard Disk Drive). The storage unit 111 thus drives a hard disk serving as a storage medium to store programs to be executed by the CPU 101 and various kinds of data.

The drive 112 is a reader/writer of the removable storage medium 7. The drive 112 can be embedded in the information-processing apparatus 10 or installed externally to the information-processing apparatus 10. To be more specific, the drive 112 records various kinds of data onto the removable storage medium 7 mounted on the information-processing apparatus 10 and reads out the data from the removable storage medium 7. The data recorded and read out by the drive 112 includes contents and attributes of each content. The removable storage medium 7 can be a magnetic disk, an optical disk, a magneto-optical disk or a semiconductor memory.

To put it concretely, the drive 112 reads out data recorded on the removable storage medium 7, supplying the data to the RAM 103 by way of the interface 107, the external bus 106, the bridge 105 and the host bus 104. If necessary, the CPU 101 stores the data into the ROM 102, the storage unit 111 or another memory. On the other hand, the drive 112 receives data stored in the ROM 102, the storage unit 111 or another memory, newly generated data and data acquired from an external apparatus via the CPU 101. Then, the drive 112 writes the data onto the removable storage medium 7.

The connection port 114 is a port for connecting the information-processing apparatus 10 to an external peripheral apparatus such as the portable reproduction apparatus 20. The connection port 114 typically has a connection terminal such as a USB or IEEE1394 terminal. The connection port 114 is connected to the CPU 101 through components such as the interface 107, the external bus 106, the bridge 105 and the host bus 104. The connection port 114 allows the information-processing apparatus 10 to exchange various kinds of data with the portable reproduction apparatus 20 through a local line 9. The exchanged data includes contents, attributes of the contents and control signals. The connection port 114 does not have to be a port for carrying out wire communications with the portable reproduction apparatus 20, but it can also be a port for carrying out radio communications with the portable reproduction apparatus 20. When functioning as a port for carrying radio communications with the portable reproduction apparatus 20, the connection port 114 typically conforms to standards such as Bluetooth or 802.11a/b/g.

The communication unit 115 is a communication interface configured to function as a communication device for connecting the information-processing apparatus 10 to the network 5. The communication unit 115 exchanges various kinds of data with the content distribution server 30, another information-processing apparatus (PC) 10 or another apparatus through the network 5. The exchanged data includes contents, attributes of the contents and control signals. The communication unit 115 conforms to the Ethernet and the Giga Ethernet. In an environment allowing direct communications with a radio access point to be carried out, the communication unit 115 needs merely to conform to standards such as Bluetooth or 802.11a/b/g.

It is to be noted that, since the hardware configuration of the content distribution server 30 is similar to the hardware configuration of the information-processing apparatus 10, the hardware configuration of the content distribution server 30 is not explained.

<Hardware Configuration of the Portable Reproduction Apparatus (PD)>

Figure 7:
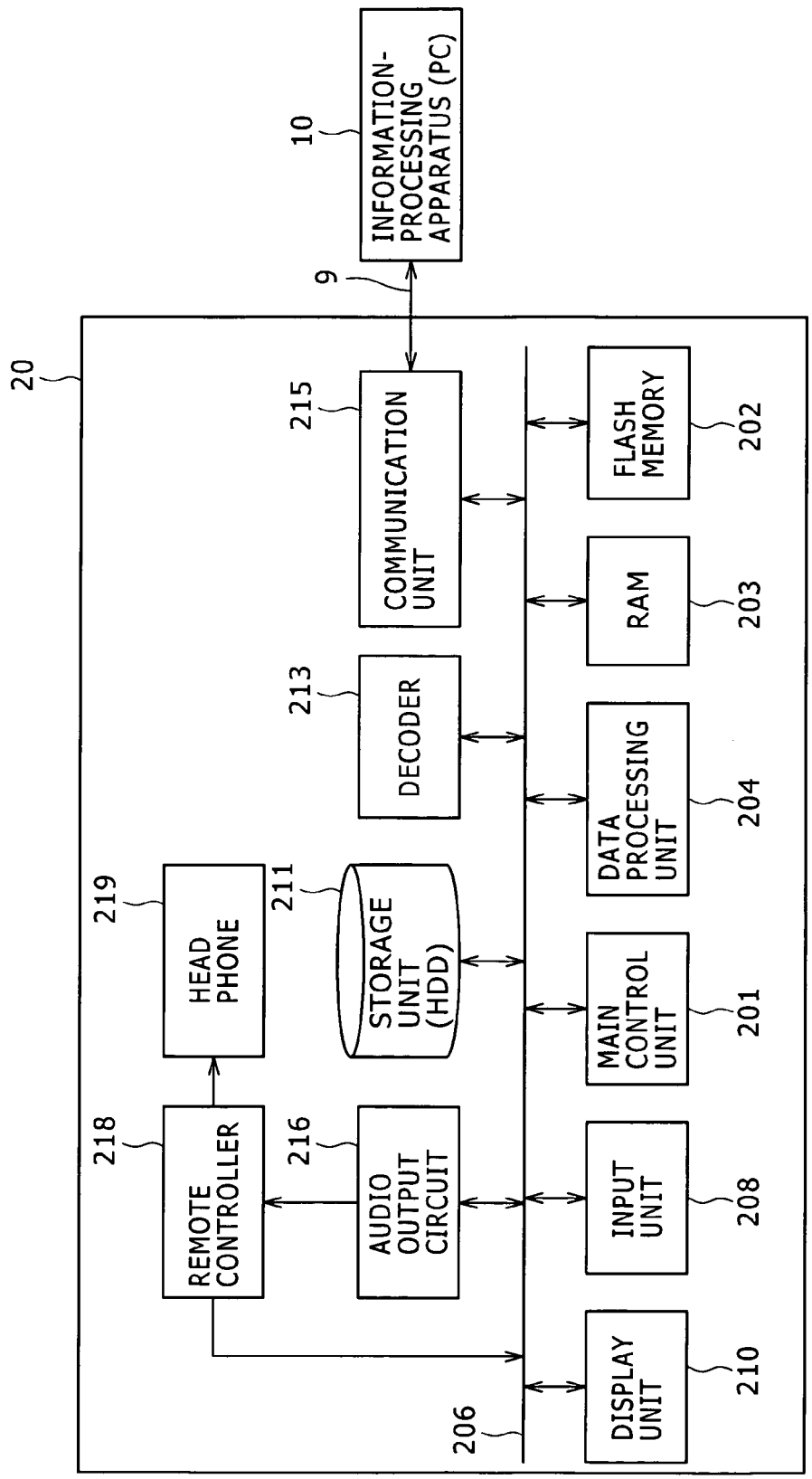
FIG. 7 is a block diagram roughly showing a typical hardware configuration of the portable reproduction apparatus according to the embodiment.

Next, the hardware configuration of the portable reproduction apparatus 20 according to the embodiment is explained by referring to FIG. 7. FIG. 7 is a block diagram roughly showing a typical hardware configuration of the portable reproduction apparatus 20 according to the embodiment.

As shown in FIG. 7, the portable reproduction apparatus 20 includes a main control unit 201, a flash memory 202, a RAM 203, a data-processing unit 204, a bus 206, an input unit 208, a display unit 210, an HDD serving as a storage unit 211, a decoder 213, a communication unit 215, an audio output circuit 216, a remote controller 218, a headphone 219 and a battery for supplying power to the components employed in the portable reproduction apparatus 20. It is to be noted that the battery itself is not shown in the figure.

The main control unit 201 is a unit functioning as a controller for controlling the components employed in the portable reproduction apparatus 20. The flash memory 202 is a memory used for storing typically a program prescribing the operation of the main control unit 201 and various kinds of data. The RAM 203 is typically an SDRAM (Synchronous DRAM) used for storing various kinds of data relevant to processing carried out by the main control unit 201.

The data-processing unit 204 is implemented by a system LSI or the like. The data-processing unit 204 is a section for processing data transferred between components within the portable reproduction apparatus 20. The bus 206 is a data line for connecting the main control unit 201, the flash memory 202, the RAM 203, the data-processing unit 204, the input unit 208, the display unit 210, the HDD serving as the storage unit 211, the decoder 213, the communication unit 215 and the audio output circuit 216 to each other.

The input unit 208 and the remote controller 218 are each configured to include operation means and an input control circuit for generating an input signal according to an operation carried out by the user and supplying the input signal to the main control unit 201. The operation means typically includes a touch panel, button keys, a lever and a dial. By operating the input unit 208 and/or the remote controller 218, the user of the portable reproduction apparatus 20 is capable of entering various kinds of data to the portable reproduction apparatus 20 and commands requesting the portable reproduction apparatus 20 to carry out processing operations.

The display unit 210 has a configuration typically including an LCD panel and an LCD control circuit or, as an alternative, an organic EL panel and an organic EL control circuit. The display unit 210 is a unit for showing various kinds of information in the form of a text or an image in accordance with control executed by the main control unit 201. For example, the display unit 210 displays attributes of a content held in the portable reproduction apparatus 20. The attributes of a content include the title of the content, the name of an album serving as a collection including the content, the name of an artist relevant to the content and an evaluation value of the content.

The storage unit 211 is a typical storage section employed in the portable reproduction apparatus 20 according to the embodiment. For example, the storage unit 211 is configured as an HDD (Hard Disk Drive) having a typical storage capacity of tens of GB. The storage unit 111 thus drives a hard disk serving as a storage medium to store compressed contents, programs to be executed by the main control unit 201 and various kinds of data such as processing data. It is to be noted that, as storage mediums besides the storage unit 211, the portable reproduction apparatus 20 is also capable of employing a semiconductor memory such as the flash memory 202 and the removable storage medium 7 cited earlier.

The decoder 213 is a section for carrying out processing such as a process to decrypt an encrypted content, a decoding process, a surround process and a process to convert input data into PCM data.

The communication unit 215 is a unit configured to include a USB controller and a USB terminal. The communication unit 215 exchanges various kinds of data with the information-processing apparatus 10 connected to the portable reproduction apparatus 20 by a local line 9 such as a USB cable. The exchanged data includes contents, attributes of the contents and control signals. The communication unit 215 does not have to be a unit for carrying out wire communications with the information-processing apparatus 10, but it can also be a unit for carrying out radio communications with the information-processing apparatus 10. When functioning as a unit for carrying radio communications with the information-processing apparatus 10, the communication unit 215 typically conforms to standards such as Bluetooth or 802.11a/b/g.

The audio output circuit 216 is a section for amplifying analog audio data obtained as a result of the decoding process carried out by the decoder 213 as well as a DA conversion process carried out by the CPU and supplying the amplified data to the remote controller 218. The remote controller 218 supplies the amplified analog audio data to the headphone 219 to be output from the speaker embedded in the headphone 219.

Main data flows in the portable reproduction apparatus 20 having the hardware configuration described above are explained as follows.

First of all, the following description explains a data flow, which occurs when the portable reproduction apparatus (PD) 20 receives a content from the information-processing apparatus (PC) 10. When the portable reproduction apparatus 20 and the information-processing apparatus 10 are connected to each other by a local line 9 such as a USB cable, the information-processing apparatus 10 recognizes the portable reproduction apparatus 20 as an HDD functioning as an external storage medium. When the information-processing apparatus 10 transmits a content and control information to the portable reproduction apparatus 20 in this state, the communication unit 215 employed in the portable reproduction apparatus 20 receives them. Then, the communication unit 215 directly stores the content in the storage unit 211. On the other hand, the communication unit 215 supplies the control information to the main control unit 201 by way of the data-processing unit 204 to be stored in a predetermined storage area of the main control unit 201.

Next, a data flow in a process carried out by the portable reproduction apparatus (PD) 20 to reproduce a content is explained as follows. First of all, a request for reproduction of a content is entered by the user to the main control unit 201. If the main control unit 201 approves the request for reproduction of a content, the data-processing unit 204 reads out the content, which is to be reproduced in accordance with the request, from the storage unit 211 and transfers the content to the RAM 203 and the decoder 213 at the same time. Then, the decoder 213 carries out processing such as a process to decrypt the encrypted content, a process to decode the content, a surround process and a process to convert the content into PCM data, outputting the PCM data obtained as a result of the processing to the main control unit 201. Subsequently, the main control unit 201 adjusts the volume of the PCM data and converts the PCM data into analog audio data by using a DA converter not shown in the figure, supplying the analog audio data to an amplifier employed in the audio output circuit 216. Finally, the audio output circuit 216 supplies the amplified analog audio data to the headphone 219 by way of the remote controller 218.

<Functional Configuration of the Portable Reproduction Apparatus (PD)>

Figure 8:
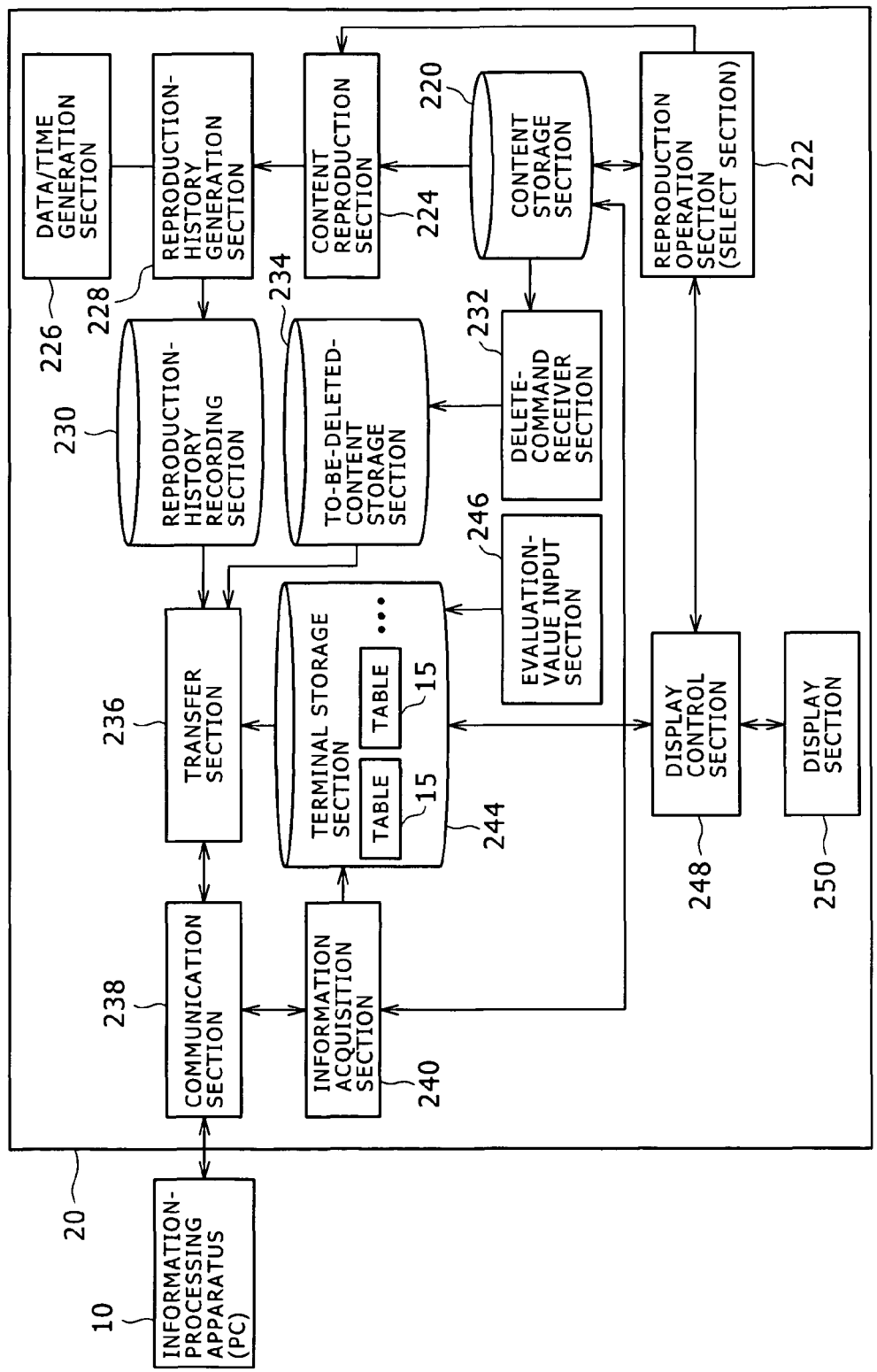
FIG. 8 is a block diagram roughly showing functions of the portable reproduction apparatus according to the embodiment.

Next, main functions of the portable reproduction apparatus 20 according to the embodiment are explained by referring to FIG. 8. FIG. 8 is a block diagram roughly showing functions of the portable reproduction apparatus 20 according to the embodiment.

As shown in FIG. 8, the portable reproduction apparatus 20 typically includes a content storage section 220, a reproduction operation section 222, a content reproduction section 224, a date/time generation section 226, a reproduction-history generation section 228, a reproduction-history storage section 230, a delete-command acceptance section 232, a to-be-deleted-content storage section 234, a transfer section 236, a communication section 238, an information acquisition section 240, a terminal storage section 244, an evaluation-value input section 246, a display control section 248 and a display section 250.

The content storage section 220 has a configuration including a storage medium such as an HDD serving as the storage unit 211, the flash memory 202 and the removable storage medium 7. The content storage section 220 has a function to store a plurality of contents. A content ID is assigned to each of the contents stored in the content storage section 220 as an ID used for uniquely identifying the content to which the ID is assigned. Each of the contents stored in the content storage section 220 is typically a content received by the portable reproduction apparatus 20 from the information-processing apparatus 10 or a content read out from the removable storage medium 7. In addition, each of the contents stored in the content storage section 220 can also be a content received by the portable reproduction apparatus 20 from the content distribution server 30 or an external apparatus such as another portable reproduction apparatus 20.

The reproduction operation section 222 is a unit for accepting an operation entered by the user via the input unit 208 employed in the portable reproduction apparatus 20 as an operation to reproduce a content and supplying information on the accepted operation to the content reproduction section 224. Typical reproduction operations executed by the portable reproduction apparatus 20, which can be entered by the user, are an operation to select a content to be reproduced, an operation to reproduce a selected content, an operation to put a content being reproduced in a fast-forward mode, an operation to put a content being reproduced in a rewind mode, an operation to put a content being reproduced in a reproduction-stop mode (including a temporary pause) and an operation to skip reproduction of a content being reproduced. The operation to skip reproduction of a specific content being reproduced is an operation to switch the object of reproduction from the specific content to another content by carrying out an operation to set a fast-forward or rewind mode in the course of the reproduction of the specific content.

The reproduction operation section 222 is a unit functioning as a select section according to the embodiment. To be more specific, the reproduction operation section 222 is capable of requesting the content reproduction section 224 to reproduce a content, the title of which is selected by an input entered by the user from a content-title list displayed by the display control section 248 to be described later on the display section 250 as a list of content titles. It is to be noted that the reproduction operation section 222 can also be configured as a unit capable of automatically selecting a content to be reproduced on the basis of a predetermined reference such as a playlist.

The content reproduction section 224 is a unit having a function to reproduce a content stored in the content storage section 220. To put it in more detail, the content reproduction section 224 receives information on reproduction operation from the reproduction operation section 222 and, on the basis of the received information on reproduction operation, carries out processing to process a content specified in the information. The processing carried out by the content reproduction section 224 to process a content may be, among other processes, a process to reproduce the content, a process to put a content being reproduced in a fast-forward mode, a process to put a content being reproduced in a rewind mode or a process to put a content being reproduced in a reproduction-stop mode.

When the content reproduction section 224 starts the processing to process a content, the content reproduction section 224 notifies the reproduction-history generation section 228 of the processing start. In the following description, the start of processing carried out by the content reproduction section 224 to process a content is referred to as occurrence of an event. The processing start reported by the content reproduction section 224 to the reproduction-history generation section 228 as occurrence of an event includes the type of the started processing and information used for identifying the content to be processed. The type of the started processing indicates that the processing is a process to reproduce the content, a process to put a content being reproduced in a fast-forward mode, a process to put a content being reproduced in a rewind mode, a process to put a content being reproduced in a reproduction-stop mode or another process. In the following description, the type of the started processing is referred to as an event type. An example of the information used for identifying the content to be processed is a content ID.

The date/time generation section 226 is a unit for generating information on a date/time. To put it in detail, the date/time generation section 226 acquires a date and a time from a clock embedded in the portable reproduction apparatus 20 and generates date/time information including the date and the time. The date/time generation section 226 generates date/time information at a request received from the reproduction-history generation section 228 and outputs the generated date/time information to the reproduction-history generation section 228.

The reproduction-history generation section 228 is a unit having a function of generating a reproduction history representing data of processing carried out by the content reproduction section 224 for a content reproduced by the content reproduction section 224 and storing the reproduction history in the reproduction-history storage section 230. To put it concretely, the reproduction-history generation section 228 has a function to generate an event log showing a sequence of events of processing carried out by the content reproduction section 224 for contents reproduced by the content reproduction section 224 and stores the generated log of events into the reproduction-history storage section 230. It is to be noted that the log of events for contents corresponds to the aforementioned reproduction history, which is a history of reproduction for the contents.

To put it in detail, the content reproduction section 224 notifies the reproduction-history generation section 228 that an event has occurred. Notified that an event has occurred, the reproduction-history generation section 228 acquires a date/time from the date/time generation section 226, putting the date/time on a log of events by associating the date/time with an event type and a reproduced-content ID, which are included in the notice informing the reproduction-history generation section 228 of the event occurrence. Then, the reproduction-history generation section 228 stores the generated log of events in the reproduction-history storage section 230 side-by-side with a time axis.

The reproduction-history storage section 230 has a configuration typically including an HDD serving as the storage unit 211 and the flash memory 202. The reproduction-history storage section 230 is used for storing an event log generated by the reproduction-history generation section 228.

Next, a log of events is explained in detail by referring to FIGS. 9A to 12 as follows. FIGS. 9A and 9B are explanatory diagrams showing a relation between a log of events and reproduction operations. Reference notations CID1 and CID2 in FIGS. 9A and 9B each denote the ID of a content. Reference notation Play denotes reproduction of a content and reference notation FF denotes a fast-forward state of a content being reproduced. Reference notation Pause denotes a temporary stop of a content being reproduced and reference notation Stop denotes a stop state of a content being reproduced. Reference notation t in the reproduction operations shown in FIG. 9A represents the lapse of time. Reference notations t1 to t7 each denote a date/time at which an event occurs in the reproduction operations.

To begin with, by referring to FIG. 9A, the following description explains reproduction operations carried out by the user and processes carried out by the content reproduction section 224 in accordance with the reproduction operations. As is obvious from an example shown in FIG. 9A, first of all, the user gives a command to the portable reproduction apparatus 20 as a command to reproduce a content identified by the content ID CID1. In accordance with the command, the content reproduction section 224 starts reproduction of the content identified by the content ID CID1 at a time t1. Then, while the content identified by the content ID CID1 is being reproduced, the user gives a command to the portable reproduction apparatus 20 as a command to put the content being reproduced in a fast-forward state. In accordance with the command, the content reproduction section 224 starts the fast-forward state of the content identified by the content ID CID1 at a time t2. Subsequently, as the user discontinues the fast-forward command, the content reproduction section 224 again starts reproduction of the content identified by the content ID CID1 at a time t3, which is the time at which the user discontinues the fast-forward command.

Then, while the content identified by the content ID CID1 is being reproduced, the user gives a command to the portable reproduction apparatus 20 as a command to put the content being reproduced in a pause state. In accordance with the command, the content reproduction section 224 starts the pause state of the content identified by the content ID CID1 at a time t4. Subsequently, as the user discontinues the pause command, the content reproduction section 224 again starts reproduction of the content identified by the content ID CID1 at a time t5, which is the time at which the user discontinues the pause command. Then, at a time t6, the content reproduction section 224 starts reproduction of a content identified by the content ID CID2 without receiving a command from the user. The start of the reproduction of the content identified by the content ID CID2 without receiving a command implies that the content identified by the content ID1 has been reproduced till the end of the data of the content and, thereafter, the content reproduction section 224 automatically starts the reproduction of the content identified by the content ID CID2, which is a content ID following the content ID CID1 in the reproduction order. Then, while the content identified by the content ID CID2 is being reproduced, the user gives a command to the portable reproduction apparatus 20 as a command to stop the reproduction of the content being reproduced. In accordance with the command, the content reproduction section 224 stops the reproduction of the content identified by the content ID CID2 at a time t7.

As described above, the content reproduction section 224 starts a variety of processes for a content in accordance with reproduction operations carried out on the content. After starting a certain process referred to as a first process in accordance with a command entered by the user as a command for the first process, the content reproduction section 224 continuously carries out the first process till a next process referred to as a second process is started in accordance with a command entered by the user as a command for the second process. In the example shown in FIG. 9A, the content reproduction section 224 carries out a reproduction process in the period between the times t1 and t2, a fast-forward process in the period between the times t2 and t3, a reproduction process in the period between the times t3 and t4, a pause process in the period between the times t4 and t5 and reproduction processes in the period between the times t5 and t7.

The start of each process carried out by the content reproduction section 224 is reported to the reproduction-history generation section 228 as the occurrence of an event. Every time an event occurs, the reproduction-history generation section 228 writes a record for the event on an event log stored in the reproduction-history storage section 230 in order to update the event log. The log of events shows a record written for each event. The records are written on the log of events in a chronological order of the events occurring with the lapse of time. The log of events also shows the ID of each content processed upon the occurrences of events. The log of events each occurring at the beginning of one of the reproduction operations shown in FIG. 9A is shown in FIG. 9B. As indicated in FIG. 9B, the log of events shows records #1 to #9 each associated with the occurrence of an event except that records #1 and #7 each identify the content ID of a content to be reproduced. Thus, in the reproduction-history storage section 230, after a record identifying the content ID of a content to be reproduced, records are stored in the chronological order of events related to the content to show date/times t1 to t7 of the occurrences of the events as well as event types such as PLAY, FF and STOP.

FIG. 11 is an explanatory diagram showing a typical data format of the event log stored in the reproduction-history storage section 230. To be more specific, the figure shows typical records stored in the reproduction-history storage section 230 in the data format as the records of the event log shown in FIG. 9B. As shown in FIG. 11, the log of events is stored in the reproduction-history storage section 230 in 8-byte units. The first byte denoted by reference numeral 280 or 284 in the figure is used for storing an event ID. The event ID stored in the first byte 280 is followed by a content ID 282. On the other hand, the event ID stored in the first byte 284 is followed by a date/time 286.

The event ID also referred to as an event type is explained by referring to FIG. 10 as follows. The event ID 270 shown in the figure is an ID used for identifying the type of an event. Each of the event IDs 270 is associated with the substance of a process as follows. An event ID of 00 indicates that the event is a request for the start of a content. An event ID of 01 indicates that the event is the start of a normal reproduction process. An event ID of 02 indicates that the event is the start of a stop process or the start of a pause process. An event ID of 03 indicates that the event is the start of a fast-forward process. An event ID of 04 indicates that the event is the start of a rewind process. Each record on the event log shown in FIG. 9B corresponds to pieces of data shown in FIG. 11 as follows.

Record #1 on the event log shown in FIG. 9B corresponds to the event ID 00 stored in the first byte 280 and a content ID 282 following the first byte 280 as shown in FIG. 11. To put it in detail, in this embodiment, a content ID has a length of 24 bytes. Thus, seven bytes included in the second to eighth bytes immediately following the first byte 280 used for storing the event ID of 00 are not used. Instead, the content ID is stored in the three records having a total length of 24 bytes (=3×8 bytes) immediately following the unused seven bytes.

Record #2 on the event log shown in FIG. 9B corresponds to the event ID 01 stored in the first byte 284 in a record and a date/time t1 stored in the seven bytes 286 of the same record as shown in FIG. 11. To be more specific, the date/time is stored in the second to eighth bytes of the same record as the event ID.

By the same token, record #3 on the event log shown in FIG. 9B corresponds to the event ID 03 stored in the first byte in a record and a date/time t2 stored in the seven bytes of the same record as shown in FIG. 11. Thereafter, in the same way, records #4 to #9 on the event log shown in FIG. 9B are stored in the reproduction-history storage section 230 in the data format shown in FIG. 11.

FIG. 12 is an explanatory diagram showing operation categories each representing reproduction operations carried out by the user by associating each of the categories with an event log generated for the reproduction operations represented by the category. The portable reproduction apparatus 20 employs typically buttons serving as a command input section. By operating one of the buttons, the user is capable of giving a Next, Search, Prev, Repeat, Pause, Rew or FF command to the portable reproduction apparatus 20. The Next command given in the course of reproduction of a content is a command to reproduce the next content included in a reproduction order as a content immediately following the content currently being reproduced. The Search command is a command to reproduce a content found in a search process. The Prev command given in the course of reproduction of a content is a command to reproduce the immediately preceding content included in a reproduction order as a content immediately preceding the content currently being reproduced. The Repeat command given in the course of reproduction of no content is a command to reproduce a content most recently reproduced. On the other hand, the Repeat command given in the course of reproduction of a content is a command to again reproduce the content currently being reproduced. The Pause command is a command to temporarily stop reproduction of a content being reproduced currently. The Rew command is a command to rewind a content being reproduced currently. The FF command is a command to fast forward a content being reproduced currently.

A Rew command to the immediately preceding content is a Rew command to rewind a content being reproduced currently and then switch the object of reproduction from the content being reproduced to another content immediately preceding the content being reproduced. By the same token, an FF command to the immediately following content is an FF command to fast forward a content being reproduced currently and then switch the object of reproduction from the content being reproduced to another content immediately following the content being reproduced. In other words, the Rew command to the immediately preceding content and the FF command to the immediately following content each correspond to a command issued by the user to skip a content currently being reproduced.

If the user carries out a reproduction operation to enter a Next or Search command, as shown in the figure, after a Stop (stopping reproduction) event of a reproduced content identified by a content ID CID1 is recorded on the log of events, the content ID CID2 of a content specified in the Next or Search command is recorded to be followed by a Play (starting reproduction) event.

If the user carries out a reproduction operation to enter a Prev command, as shown in the figure, after a Stop (stopping reproduction) event of a reproduced content identified by a content ID CID1 is recorded on the log of events, the content ID CID1 of a content specified in the Prev command is recorded to be followed by a Play (starting reproduction) event.

If the user carries out a reproduction operation to enter a Repeat command, as shown in the figure, after a Stop (stopping reproduction) event of a reproduced content identified by a content ID CID1 is recorded on the log of events, the content ID CID1 of a content specified in the Repeat command as a content to be reproduced again is recorded to be followed by a Play (starting reproduction) event.

If the user carries out a reproduction operation to enter a Pause command, as shown in the figure, after a Stop (stopping reproduction) event of a reproduced content identified by a content ID CID1 is recorded on the log of events, a Play (starting reproduction) event is recorded to indicate the start of reproduction of a content to be again reproduced at the end of a Pause state.

If the user carries out a reproduction operation to enter a Rew command, as shown in the figure, after a Stop (stopping reproduction) event of a reproduced content identified by a content ID CID1 is recorded on the log of events at the start of a Rew state, a Play (starting reproduction) event is recorded to indicate the start of reproduction of a content to be again reproduced at the end of the Rew state. An FF command is handled in the same way as the Rew command.

If the user carries out a reproduction operation to enter a Rew command to the immediately preceding content, as shown in the figure, after a Stop (stopping reproduction) event of a reproduced content identified by a content ID CID1 is recorded on the log of events at the start of a Rew state, the content ID CID2 of a content to be again reproduced at the end of the Rew state is recorded to be followed by a Play (starting reproduction) event. An FF command to the immediately following content is handled in the same way as the Rew command to the immediately preceding content.

The log of events has been described above in detail. By including the substance of each process carried out on an involved content and the start time of the process in a record on the log of events as described above, the portable reproduction apparatus 20 is capable of reflecting the state of a reproduction operation carried out by the user on a content on the log of events. The state of a reproduction operation carried out by the user on a content includes timings of reproduction processes requested by the user as reproductions of the content, the number of reproduction processes requested by the user, the number of Rewind processes carried out in the course of reproduction of the content, the number of fast-forward processes carried out in the course of reproduction of the content and the number of processes to skip the content.

Let us refer back to FIG. 8 and continue the explanation of the functional configuration of the portable reproduction apparatus 20.

The delete-command acceptance section 232 is a unit for recording content IDs into the to-be-deleted-content storage section 234 as the IDs of a plurality of contents to be deleted in accordance with a content delete command entered by the user to delete the contents from the content storage section 220. To put it concretely, the delete-command acceptance section 232 creates a list of IDs assigned to contents to be deleted and records the list into the to-be-deleted-content storage section 234. The contents to be deleted are contents specified in the content delete command entered by the user on the portable reproduction apparatus 20. It is to be noted that, in addition to content IDs, the delete-command acceptance section 232 may also record attributes usable for identifying each content to be deleted in the to-be-deleted-content storage section 234. The attributes include the title of the content, the name of an album serving as a collection including the content and the name of an artist associated with the content.

The to-be-deleted-content storage section 234 is a unit for storing the list of IDs assigned to contents to be deleted. The to-be-deleted-content storage section 234 has a configuration typically including an HDD functioning as the storage unit 211 and the flash memory 202.

The transfer section 236 is a unit having a function to transmit an event log (reproduction-history) stored in the reproduction-history storage section 230 as a reproduction history to an external apparatus such as the information-processing apparatus 10 or the content distribution server 30 by way of the communication section 238 at a log transfer request made by the external apparatus. To put in detail, receiving a log transfer request from the information-processing apparatus 10 connected to the portable reproduction apparatus 20, for example, the transfer section 236 reads out a log of events from the reproduction-history storage section 230 and transmits the log of events to the information-processing apparatus 10.

In addition, at a request made by the information-processing apparatus 10, the transfer section 236 reads out performance evaluation values for one, two or more contents stored in the content storage section 220 from the terminal storage section 244 and transmits the performance evaluation values with or without the reproduction history to the information-processing apparatus 10. Thus, the information-processing apparatus 10 is capable of computing typically the average of a performance evaluation value received from the portable reproduction apparatus 20 and a performance evaluation value stored in the information-processing apparatus 10 and transmitting the average value to the portable reproduction apparatus 20 as a new performance evaluation value.

If input evaluation values for one, two or more contents stored in the content storage section 220 have been stored in the terminal storage section 244, at a request made by the information-processing apparatus 10, the transfer section 236 reads out the input evaluation values from the terminal storage section 244 and transmits the input evaluation values with or without the reproduction history to the information-processing apparatus 10. Thus, the information-processing apparatus 10 is capable of computing typically the average of an input evaluation value received from the portable reproduction apparatus 20 and an input evaluation value stored in the information-processing apparatus 10 and transmitting the average value to the portable reproduction apparatus 20 as a new input evaluation value.

In addition, at a request made by the information-processing apparatus 10, the transfer section 236 transmits a device ID assigned to the portable reproduction apparatus 20 to the information-processing apparatus 10 along with a log of events. The device ID is an identifier used for identifying the portable reproduction apparatus 20. The transmitted device ID is registered in the information-processing apparatus 10. In this way, the portable reproduction apparatus 20 identified by the device ID can be registered in the information-processing apparatus 10. For example, a condition for registering a portable reproduction apparatus 20 in the information-processing apparatus 10 requires that the portable reproduction apparatus 20 be a portable reproduction apparatus allowed to exchange information with the information-processing apparatus 10. Such a condition prevents the information from being shared among an unlimited number of apparatus. The exchanged information typically includes a content, attributes of a content, a reproduction history, a computed evaluation value, an input evaluation value, a list of IDs each assigned to a content to be deleted and a playlist. In this way, contents are prevented from being shared between unspecified number of devices.

In addition, at a request made by the information-processing apparatus 10 connected to the portable reproduction apparatus 20, the transfer section 236 is also capable of transmitting a list of IDs each assigned to one of contents to be deleted to the information-processing apparatus 10 along with the reproduction history of each of the contents. Thus, the portable reproduction apparatus 20 is capable of requesting the information-processing apparatus 10 connected to the portable reproduction apparatus 20 to delete contents stored in the content storage section 220 employed in the portable reproduction apparatus 20. As requested by the portable reproduction apparatus 20, the information-processing apparatus 10 is capable of deleting the contents.

Due to limitations imposed on the processing power and the power supplied by the battery, it is not desirable to let the portable reproduction apparatus 20 delete contents by itself. Thus, when the user requests that contents be deleted, the portable reproduction apparatus 20 puts the IDs of the contents to be deleted on a list of IDs and saves the list. Then, as the portable reproduction apparatus 20 is connected to the information-processing apparatus 10, the portable reproduction apparatus 20 transmits a list of IDs each assigned to a content to be deleted to the information-processing apparatus 10. Receiving the list, a content updating section employed in the information-processing apparatus 10 connected to the portable reproduction apparatus 20 deletes one, two or more contents each identified by an ID on the list from the content storage section 220 employed in the portable reproduction apparatus 20.

The information acquisition section 240 is a unit having a function to acquire various kinds of information from the information-processing apparatus 10. To put it concretely, the information acquisition section 240 acquires a plurality of search/display tables 15 shown in FIGS. 3 and 4 with different types as tables, which include attributes of contents stored in the content storage section 220 employed in the portable reproduction apparatus 20, from the portable reproduction apparatus 20 and stores the acquired tables in the terminal storage section 244. In addition, the information acquisition section 240 also acquires contents, playlists, transfer histories and rating information, which is evaluation values added to contents, from the information-processing apparatus 10. The information acquisition section 240 stores the various kinds of information such as the contents and the playlists in storage mediums such as the content storage section 220, the terminal storage section 244 and a playlist storage section, which is not shown in the figure.

The terminal storage section 244 is a unit having a configuration typically including an HDD serving as the storage unit 211 and the flash memory 202. The terminal storage section 244 is a memory used for storing attributes of each content by associating the attributes with the ID of the content. The attributes of a content include the title of the content, the name of an album serving as a collection including the content, the name of an artist associated with the content, the genre of the content, the release year of the content, the evaluation value for the content, initials of the content, a reproduction history of the content and a transfer history of the content. The terminal storage section 244 is also used for storing a plurality tables transferred from the information-processing apparatus 10 as the aforementioned search/display tables 15 having different types. The content-title search/display tables 15 are data tables including attributes of contents, which have been stored in the content storage section 220 employed in the portable reproduction apparatus 20, in a layer structure. The content-title search/display tables 15 also each have a layer structure and correspond on a one-to-one basis to a plurality of display screens, which are sequentially displayed by the display control section 248 in a process to search for a content in the portable reproduction apparatus 20. The content-title search/display tables 15 are a characteristic configuration of the embodiment and will be described in detail later.

The evaluation-value input section 246 is a unit for setting an input evaluation value for a content stored in the content storage section 220 in accordance with an input entered by the user. To put it concretely, for example, the user carries out a predetermined operation in the course of reproduction of a specific content to request the display control section 248 to display an input evaluation value setting display screen on the display section 250 employed in the portable reproduction apparatus 20. The user then carries out an operation to enter an input evaluation value for the specific content through the input evaluation value setting display screen displayed on the display section 250. Subsequently, the evaluation-value input section 246 sets an input evaluation value for the specific content in accordance with the operation to enter the input evaluation value at one of five typical grades, i.e., 1, 2, 3, 4 and 5 points.

The evaluation-value input section 246 then stores the input evaluation value set in this way in the terminal storage section 244 by associating the input evaluation value with the ID of the specific content. Thus, the portable reproduction apparatus 20 is also capable of setting an input evaluation value for a content and immediately displaying the input evaluation value by associating the input evaluation value with the content.

The display control section 248 is a unit for controlling processes to display various kinds of information on the display section 250. To put it in detail, the display control section 248 sequentially displays a variety of content-title search screens on the display section 250 in accordance with substances of select operations carried out by the user during typically a process carried out by the reproduction operation section 222 to search for a content. As explained before by referring to FIG. 3, at that time, the display control section 248 displays the content-title search/display tables 15 stored in the terminal storage section 244 as they are without the need to carry a query process.

In a process to display content-title search screens, the display control section 248 is capable of displaying a variety of display screens with different variations according to the different types of the content-title search/display tables 15 used in the process to search for a content. For example, when the user carries out a first operation, the display control section 248 selects a content-title search/display table 15 for a search/display purpose according to the first operation and displays content titles arranged in the content-title search/display table in accordance with a first rule (that is, arranged typically in the order of pronunciations of the content titles). When the user carries out a second operation, on the other hand, the display control section 248 selects a content-title search/display table 15 for a search/display purpose according to the second operation and displays content titles arranged in the content-title search/display table 15 in accordance with a second rule (that is, arranged typically in the order of track numbers each assigned to a content). It is to be noted that the content-title search screen will be described in detail later.

In addition, the display control section 248 reads out the computed evaluation value or input evaluation value of the same content from the terminal storage section 244 and displays the input evaluation value on the display section 250 by letting the input evaluation value take precedence of the computed evaluation value. On top of that, if the evaluation-value input section 246 sets an input evaluation value of a specific content with the computed evaluation value already displayed for the specific content, the display control section 248 displays the set input evaluation value on the display section 250 to replace the computed evaluation value displayed so far. It is to be noted that the input evaluation value and the computed evaluation value will be described later. In addition, the display control section 248 is also capable of displaying a playlist stored in a playlist storage section not shown in the figure on the display section 250.

The functional configuration of each of the elements employed in the portable reproduction apparatus 20 according to the embodiment have been described above. Let us keep in mind that it is possible to provide the portable reproduction apparatus 20 with a typical configuration in which some specific ones of the elements are implemented by hardware having the functions of the specific elements. As an alternative, it is also possible to provide the portable reproduction apparatus 20 with another configuration in which the functions of the specific elements are implemented by programs installed in the portable reproduction apparatus 20 to be executed by a computer. The specific elements include the reproduction operation section 222, the content reproduction section 224, the date/time generation section 226, the delete-command acceptance section 232, the transfer section 236, the information acquisition section 240, the evaluation-value input section 246 and the display control section 248.

<Functional Configuration of the Information-Processing Apparatus (PC)>

Figure 13:
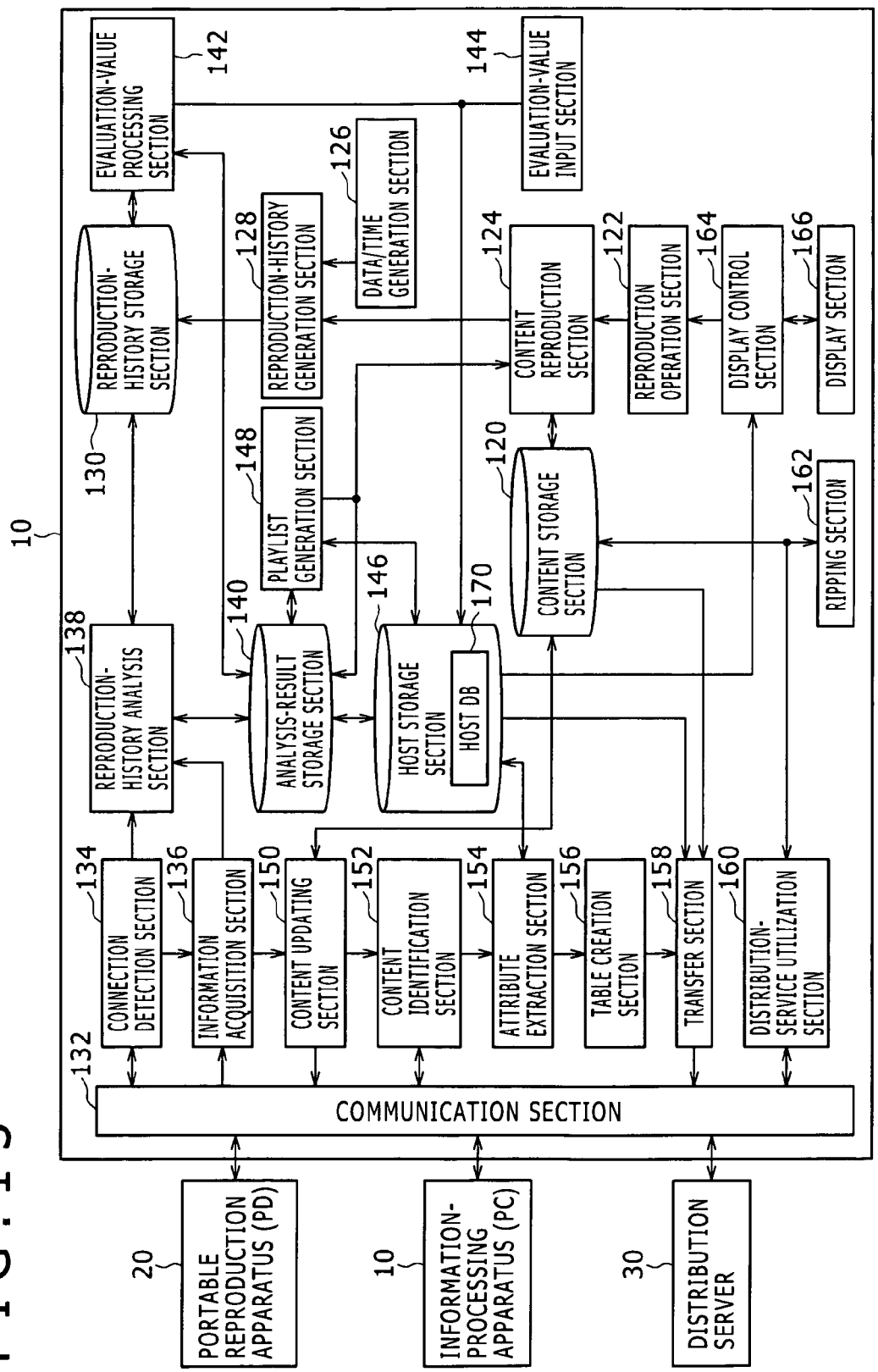
FIG. 13 is a block diagram roughly showing functions of the information-processing apparatus according to the embodiment.

As shown in FIG. 13, the information-processing apparatus 10 has main elements including a content storage section 120, a reproduction operation section 122, a content reproduction section 124, a date/time generation section 126, a reproduction-history generation section 128, a reproduction-history storage section 130, a communication unit 132, a connection detection section 134, an information acquisition section 136, a reproduction-history analysis section 138, an analysis-result storage section 140, an evaluation-value computation section 142, an evaluation-value input section 144, a host storage section 146, a playlist generation section 148, a content-updating section 150, a content identification section 152, an attribute extraction section 154, a table creation section 156, a transfer section 158, a distribution-service utilization section 160, a ripping section 162, a display control section 164 and a display section 166.

Since the content storage section 120, the reproduction operation section 122, the content reproduction section 124, the date/time generation section 126, the reproduction-history generation section 128 and the reproduction-history storage section 130 have functions identical respectively with those of the content storage section 220, the reproduction section 224, the reproduction operation section 222, the date/time generation section 226, the reproduction-history generation section 228 and the reproduction-history storage section 230, which are employed in the portable reproduction apparatus 20 described earlier, the reproduction operation section 122, the content reproduction section 124, the date/time generation section 126, the reproduction-history generation section 128 and the reproduction-history storage section 130 are not explained. Much like the portable reproduction apparatus 20, the information-processing apparatus 10 carries out various kinds of processing on a content and records events on a log on the basis of reproduction operations carried out by the user. Then, the information-processing apparatus 10 stores the log of events in a memory.

It is to be noted that the content storage section 120 has a configuration typically including an HDD serving as the storage unit 111, a semiconductor memory and a storage medium such as the removable storage medium 7. The content storage section 120 is a unit for executing a function to store a plurality of contents in the HDD, the semiconductor memory or the storage medium.

The communication unit 132 has a configuration typically including the connection port 114 mentioned before and the communication unit 115 cited earlier. The communication unit 132 is a section for exchanging various kinds of information with the portable reproduction apparatus 20 through the local line 9 and the content distribution server 30 through the network 5.

The connection detection section 134 is a unit for detecting a connection established by the communication unit 132 as a connection between the information-processing apparatus 10 and another external apparatus. To put it concretely, the connection detection section 134 detects a local connection established by the connection port 114 through the local line 9 as a connection between the information-processing apparatus 10 and the portable reproduction apparatus 20, notifying the information acquisition section 136 of the connection. In addition, the connection detection section 134 is capable of detecting the length of a continuous period of a connection between the information-processing apparatus 10 and the portable reproduction apparatus 20 and producing a result of determination as to whether or not the length of the continuous period of a connection has reached a predetermined value such as one hour. When the length of a continuous period of the connection reaches the predetermined value, the connection detection section 134 notifies the information acquisition section 136 that the length of the continuous period of a connection has reached the predetermined value.

The information acquisition section 136 has a function to acquire various kinds of information from the portable reproduction apparatus 20 through the communication unit 132. The information includes a content, attributes of a content, a log of events, a computed evaluation value, an input evaluation value and a playlist. To put it concretely, when notified by the connection detection section 134 that the information-processing apparatus 10 has been connected to the portable reproduction apparatus 20 connected to the information-processing apparatus 10, the information acquisition section 136 acquires an event log, which is stored in the portable reproduction apparatus 20, from the portable reproduction apparatus 20. Then, the information acquisition section 136 passes on the acquired log of events to the reproduction-history analysis section 138. By the same token, the information acquisition section 136 also acquires a computed evaluation value and input evaluation value of each content, which are stored in the portable reproduction apparatus 20, from the portable reproduction apparatus 20. Then, the information acquisition section 136 passes on the acquired evaluation values to the evaluation-value computation section 142.

In addition, the information acquisition section 136 is also capable of acquiring other information such as a content stored in the content storage section 220 employed in the portable reproduction apparatus 20, attributes of a content and a content-title search/display table 15 from the portable reproduction apparatus 20. The information acquisition section 136 stores the acquired content in the content storage section 120 but the acquired attributes of a content and the acquired content-title search/display table 15 in the host database 170 stored in a host storage section 146. The information acquisition section 136 may supply the acquired attributes of a content and the acquired content-title search/display table 15 to the content-updating section 150. The information acquisition section 136 also acquires a list of one, two or more IDs each identifying a content to be deleted from the portable reproduction apparatus 20 and supplies the list to the content-updating section 150. In addition, the information acquisition section 136 supplies the list of IDs each identifying a content to be deleted to the evaluation-value computation section 142 to be used as information for computing evaluation values.

The reproduction-history analysis section 138 is a unit for analyzing event logs stored in the reproduction-history storage section 130 and event logs acquired by the information acquisition section 136 from the portable reproduction apparatus 20. In the following description, an event log stored in the reproduction-history storage section 130 is referred to as an event log of the information-processing apparatus 10 whereas an event log acquired by the information acquisition section 136 from the portable reproduction apparatus 20 is referred to as an event log of the portable reproduction apparatus 20. A generic technical term 'event log' or 'log of events' is used in the following description to denote an event log of the information-processing apparatus 10, an event log of the portable reproduction apparatus 20 or both the event logs in case it is not necessary to distinguish the event log of the information-processing apparatus 10 and the event log of the portable reproduction apparatus 20 from each other.

To put it concretely, from a log of events, the reproduction-history analysis section 138 finds the reproduction start date/time of each content, the reproduction end date/time of each content, the number of reproductions of each content, the number of pauses of each content, the number of skips of each content, the number of repetitions of each content and the total reproduction duration of each content. The reproduction start date/time of a content can be found by extracting a date/time of a record included in an event log analyzed by the reproduction-history analysis section 138 as a record immediately following the record of a content ID identifying the content.

From the log of events, the reproduction-history analysis section 138 finds the reproduction end date/time of a content by extracting a date/time from a record including information on a reproduction stop of the content or a record including a reproduction start date/time of the immediately following content. To put it in detail, a content reproduction stop record immediately preceding a record of a content ID on the log of events is a record put on the log of events to indicate the end of the reproduction of the content stopped due to occurrence of a reproduction stop event. Thus, the date/time of a content reproduction stop record immediately preceding a record of a content ID on the log of events is the reproduction end date/time of a content stopped due to occurrence of a reproduction stop event.

If a record including information on a reproduction stop of a content does not exist at a location immediately preceding a record of a content ID on the log of events, a record provided at a location immediately succeeding a record of a content ID as a record including a reproduction start of a content is a record showing the reproduction start of a new content or the reproduction end of a content immediately preceding the new content. Thus, if a record including information on a reproduction stop of a content does not exist at a location immediately preceding a record of a content ID on the log of events, the reproduction-history analysis section 138 extracts the date/time included in a specific record provided at a location immediately succeeding a record of a content ID as a specific record including a reproduction start of a new content and takes the extracted date/time, which is the reproduction start date/time of the new content, as the reproduction end date/time of a content immediately preceding the new content.

In addition, on the basis of records each provided at a location immediately succeeding a record of a content ID on the log of events as a record including a reproduction start of a content, the reproduction-history analysis section 138 is capable of finding the number of reproductions. In addition, on the basis of the information indicating relations between content IDs and processing substances as shown in FIG. 10, from the log of events, the reproduction-history analysis section 138 is capable of finding the number of pauses of each content, the number of skips of each contents and the number of repetitions of each content. On top of that, the reproduction-history analysis section 138 is also capable of finding the total reproduction duration of each content by extracting records relevant to the content from the log of events and summing up periods each sandwiched between a reproduction start time and a reproduction end time.

After completing analyses, the reproduction-history analysis section 138 supplies results of the analyses to the analysis-result storage section 140. The analysis-result storage section 140 has a configuration including an HDD serving as the storage unit 211 or the flash memory 202. The analysis-result storage section 140 is a memory used for storing results of a process carried out by the reproduction-history analysis section 138 to analyze a log of events. To put it in detail, the analysis results supplied to the analysis-result storage section 140 typically include various kinds of information such as the number of reproductions of each content, the number of pauses of each content, the number of skips of each contents, the number of repetitions of each content and the total reproduction duration of each content. In addition, the analysis results supplied to the analysis-result storage section 140 may also include information such as the reproduction start date/time of each content, the reproduction end date/time of each content and each of continuous reproduction durations for every content. The analysis results stored in the analysis-result storage section 140 are explained by referring to FIGS. 14 and 15 as follows.

FIGS. 14 and 15 are each an explanatory diagram showing typical analysis results recorded in the analysis-result recording section 140. To be more specific, FIG. 14 shows data stored in the analysis-result storage section 140 as results of a process carried out by the reproduction-history analysis section 138 to analyze reproduction states recorded on a log of events for contents. The data stored in the analysis-result storage section 140 is referred to hereafter as a reproduction state table. As shown in FIG. 14, each row of the reproduction state table stored in the analysis-result storage section 140 includes a content ID (CID) 140*a*, a reproduction count 140*b*, a pause count 140*c*, a skip count 140*d*, a repetition count 140*e* and a total reproduction duration 140*f*.

If the event log analyzed by the analysis-result storage section 140 is an event log of an information-processing apparatus 10, the reproduction state table includes a content ID, the number of reproductions, the number of pauses, the number of skips, the number of repeats and a total reproduction duration, which are provided for every content reproduced in the information-processing apparatus 10. If the event log analyzed by the analysis-result storage section 140 is an event log of a portable reproduction apparatus 20, on the other hand, the reproduction state table includes a content ID, the number of reproductions, the number of pauses, the number of skips, the number of repeats and a total reproduction duration, which are provided for every content reproduced in the portable reproduction apparatus 20. If the event logs analyzed by the analysis-result storage section 140 are event logs of an information-processing apparatus 10 and a portable reproduction apparatus 20, the reproduction state table includes a content ID, the number of reproductions, the number of pauses, the number of skips, the number of repeats and a total reproduction duration, which are for every content reproduced in at least the information-processing apparatus 10 or the portable reproduction apparatus 20. For a content reproduced in both an information-processing apparatus 10 and a portable reproduction apparatus 20, the reproduction state table of the analysis-result storage section 140 includes sums each obtained by adding a value representing the reproductions in the information-processing apparatus 10 to a value representing the reproductions in the portable reproduction apparatus 20. For example, the reproduction state table of the analysis-result storage section 140 includes a sum obtained by adding a reproduction count for the information-processing apparatus 10 to a reproduction count for the portable reproduction apparatus 20.

A content ID 140*a* of a content is an identifier used for uniquely identifying the content. A reproduction count 140*b* on the same row as the content ID 140*a* is the number of times the content identified by the content ID 140*a* has been reproduced. A pause count 140*c* on the same row as the content ID 140*a* is the number of times the content identified by the content ID 140*a* has been put in a pause state in the course of the reproduction of the content. A skip count 140*d* on the same row as the content ID 140*a* is the number of times the content identified by the content ID 140*a* has been skipped in the course of the reproduction of the content. A repetition count 140*e* on the same row as the content ID 140*a* is the number of times the content identified by the content ID 140*a* has been reproduced repeatedly. A total reproduction duration 140*f* on the same row as the content ID 140*a* is the total of reproduction periods of the content identified by the content ID 140*a*. Let us keep in mind that it is desirable to have a total reproduction duration 140*f* representing the total of actual reproduction periods of a content. That is to say, it is desirable to have a total reproduction duration 140*f* that does not include a fast-forward period, a rewind period and a period during which the reproduction is stopped.

FIG. 15 shows data stored in the analysis-result storage section 140 as results of a process carried out by the reproduction-history analysis section 138 to analyze reproduction-history data recorded on a log of events for contents. In this case, the data stored in the analysis-result storage section 140 is referred to hereafter as a reproduction history table. The life of a content from a reproduction-start event to a reproduction-end event associated with the reproduction-start event forms a reproduction history. A reproduction-start event is a record put on a log of events as a record immediately following a content-ID record. As shown in FIG. 15, the reproduction history table stored in the analysis-result storage section 140 includes a content ID 140*a*, a reproduction start date/time 140*g*, a reproduction end date/time 140*h* and a continuous reproduction duration 140*i*.

If the event log analyzed by the analysis-result storage section 140 is an event log of an information-processing apparatus 10, the reproduction history table includes a reproduction start date/time, a reproduction end date/time and a total reproduction duration for each content reproduced in the information-processing apparatus 10. If the event log analyzed by the analysis-result storage section 140 is an event log of a portable reproduction apparatus 20, on the other hand, the reproduction history table includes a reproduction start date/time, a reproduction end date/time and a total reproduction duration for each content reproduced in the portable reproduction apparatus 20. If the event logs analyzed by the analysis-result storage section 140 are event logs of an information-processing apparatus 10 and a portable reproduction apparatus 20, the reproduction history table includes a reproduction start date/time, a reproduction end date/time and a total reproduction duration for each content reproduced in either the information-processing apparatus 10 or the portable reproduction apparatus 20.

The content ID 140*a* of a content is an identifier used for uniquely identifying the content. The reproduction start date/time 140*g* on the same row as the content ID 140*a* is a date/time at which a reproduction of the content identified by the content ID 140*a* has been started. To put in detail, the reproduction start date/time 140*g* is a date/time included in a reproduction start record immediately following the record of a content ID identifying the content on the log of events. The reproduction end date/time 140*h* on the same row as the content ID 140*a* is a date/time at which a reproduction of the content identified by the content ID 140*a* has been ended after a reproduction start date/time specified by the reproduction start date/time 140*g* on the same row. A reproduction end date/time can be found as described above. The continuous reproduction duration 140*i* on the same row as the content ID 140*a* is a continuous reproduction period since a reproduction start date/time specified by the reproduction start date/time 140*g* on the same row. It is possible to provide a configuration in which the continuous reproduction duration 140*i* does not include a fast-forward period, a rewind period and a period during which the reproduction is stopped. To put it in detail, the continuous reproduction duration 140*i* can be found by subtracting the reproduction start date/time 140*g* from the reproduction end date/time 140*h* found by adoption of the method described earlier to give a difference and further subtracting a fast-forward period, a rewind period and a period during which the reproduction is stopped from the difference. The continuous reproduction duration 140*i* found in this way is a period during which the content has been actually reproduced in a continuous manner.

Analysis results stored in the analysis-result storage section 140 have been described above. Let us refer back to FIG. 13 to explain the evaluation-value computation section 142.

The evaluation-value computation section 142 is a unit having a function to find a computed evaluation value on the basis of results of analyzing the event log of the portable reproduction apparatus 20 and the event log of the information-processing apparatus 10.

First of all, the computed and input evaluation values according to the embodiment are explained in detail as follows. In the communication system 100 according to the embodiment, a computed evaluation value of each content can be found automatically on the basis of reproduction histories (or event logs) in the information-processing apparatus 10 and the portable reproduction apparatus 20. A computed evaluation value is defined as an evaluation value automatically computed on the basis of the reproduction histories in this way. A process to automatically generate a computed evaluation value of a content and associate the automatically generated computed evaluation value with the content is referred to as an auto-rating process. On the other hand, an input evaluation value is defined as an evaluation value set on the basis of an input entered by the user. A process to manually set an input evaluation value of a content and associate the manually set evaluation value with the content is referred to as an manual-rating process. An evaluation value is a generic technical term used to denote the computed and input evaluation values in case there is no need to distinguish the computed and input evaluation values from each other.

Typical applications of the computed and input evaluation values include those listed as follow:

(1): The evaluation values are each used by the user as a reference parameter in a process to search for a content.

(2): The evaluation values are each used by the user as an indicator to compute a profile used for grasping a favorite content of the user.

(3): The evaluation values are each used by the user as a criterion as to which contents stored in the portable reproduction apparatus 20 are to be selected as contents to be deleted due to a limited storage capacity of the portable reproduction apparatus 20 in a situation where a large number of contents are transferred from the information-processing apparatus 10 to the portable reproduction apparatus 20.

Figure 16B:
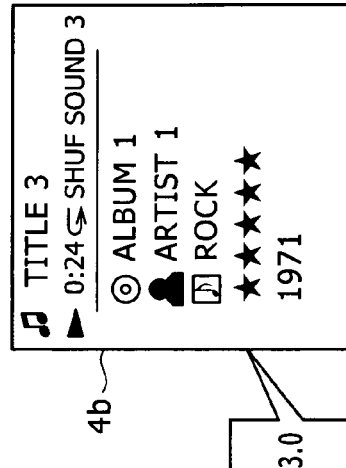
FIGS. 16A and 16B are explanatory diagrams each showing a display screen displaying a computed evaluation value and an input evaluation value in accordance with the embodiment.
Figure 16A:
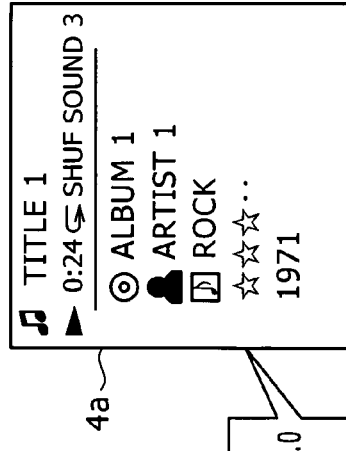

The computed and input evaluation values are explained concretely by referring to FIGS. 16A and 16B as follows. FIG. 16A is an explanatory diagram showing a display screen displaying a computed evaluation value in a process to reproduce a content in the portable reproduction apparatus 20 according to the embodiment whereas FIG. 16B is an explanatory diagram showing a display screen displaying an input evaluation value in a process to reproduce a content in the portable reproduction apparatus 20 according to the embodiment.

As shown in FIG. 16A, the computed evaluation value shown on a display screen 4*a* in an auto-rating process is represented typically by the number of star marks (☆) each having a pale color. As shown in FIG. 16B, on the other hand, the input evaluation value shown on a display screen 4*b* in a manual-rating process is represented typically by the number of star marks (★) each having a deep color. Thus, the user is capable of distinguishing the computed and input evaluation values from each other. The computed evaluation value produced in an auto-rating process and the input evaluation value produced in a manual-rating process are each given as a value at one of five typical grades, i.e., 1, 2, 3, 4 and 5 points. In the example shown in FIG. 16A, the computed evaluation value of a content identified by title 1 is 3 points and, in the example shown in FIG. 16B, the input evaluation value of a content identified by title 3 is 5 points.

As described above, the computed evaluation value produced in an auto-rating process is given as a value at one of the five typical grades. However, the actual numerical value of the computed evaluation value may have a one-digit fraction portion expressed in terms of 0.1 units following a decimal point. Thus, the actual numerical value can be rounded into an integer representing one of the five typical grades, i.e., 1, 2, 3, 4 and 5 points. In the case of a computed evaluation value of 3.2 points, for example, the computed evaluation value is rounded into a final value of 3 points.

In addition, an initial value of a computed evaluation value can be set with a high degree of freedom in a service to distribute contents. If an initial value of a computed evaluation value is not set particularly in a service to distribute contents, for example, the initial value can be set typically at 3.0. For example, it is possible to set an initial value of the computed evaluation value at 3.0 points for a content downloaded from the content distribution server, a content obtained as a result of a ripping process, a content of imported software or another content. It is to be noted that, for a content (or a piece of music) regarded as a content having a high level of favoritism or a content recommended by the service to distribute contents, an initial value of the computed evaluation value can be set at 3.0 points or even higher.

By referring to FIG. 17, the following description explains an actual technique for finding a computed evaluation value (or a technique adopted in the auto-rating process as a technique to change a computed evaluation value). In the auto-rating process, it is necessary to reflect the degree favoritism of the user for each content. Thus, such an auto-rating process is carried out that a favorite content of the user is given a high computed evaluation value but, a content other than favorite ones of the user is given a low computed evaluation value. An example of the favorite content of the user is a content reproduced frequently by the user and an example of the content other than favorite ones of the user is a content reproduced rarely by the user.

First of all, the following description explains a technique to increase the computed evaluation value of a favorite content (or a favorite piece of music) of the user. If a content is reproduced for a sufficiently long period of time and the user is listening to the content, the content is determined to be a favorite content of the user. In this case, it is desirable to adopt a technique of increasing the computed evaluation value of the user every time the content is reproduced continuously for at least a predetermined period of time to reflect better evaluation of the content.

In accordance with the technique described above, for example, the computed evaluation value is raised in this embodiment by a predetermined increase such as 0.2 points for a content (or a piece of music) reproduced continuously for at least a predetermined value-increasing criterion of N seconds without being skipped as shown in FIG. 17. That is to say, if the continuous reproduction duration of a content is at least equal to the predetermined value-increasing criterion of N seconds, a predetermined number of points is added to the computed evaluation value of the content. In this way, if a content is being reproduced continuously for a sufficiently long period of time since the start of the reproduction process, the computed evaluation value of the content is increased to reflect better evaluation of the content.

For example, the predetermined value-increasing criterion N can be set at any arbitrary value not greater than the reproduction period (for example, five minutes) of an ordinary content, depending on factors such as the reproduction period of an ordinary content and the content-listening trend of the user. In addition, the predetermined increase can be set with a high degree of freedom depending on factors such as the content-listening trend of the user. In this embodiment, the predetermined value-increasing criterion N is set at a typical value of 60 seconds (or one minute) whereas the predetermined increase is set at 0.2 points.

In this case, every time a content is reproduced continuously for a period at least equal to 60 seconds, the computed evaluation value of the content is incremented by 0.2 points. If the upper limit of the computed evaluation value is set at a typical maximum of 5.0 points, however, the computed evaluation value cannot be incremented to a value greater than the upper limit.

Next, the following description explains a technique to decrease the computed evaluation value of a content other than a favorite with the user (that is, a piece of music disliked by the user). For a content (or a piece of music) other than a favorite with the user, the user may carry out one of operations such as following operations 1 and 2. In operation 1, the user skips the content being reproduced because the user does not like the content. In operation 2, the user puts the content ID of the content on a list of content IDs each identifying a content to be deleted from the portable reproduction apparatus 20.

In this embodiment, with operation 1 carried out, for a content (or a piece of music) skipped before the lapse a predetermined value-decreasing criterion of M seconds since the start of reproduction of the content, the computed evaluation value of the content is decreased by a first predetermined decrease such as 0.1 points as shown in FIG. 17. That is to say, if the continuous reproduction duration of a content is shorter than the predetermined value-decreasing criterion of M seconds, the predetermined decrease is subtracted from the computed evaluation value of the content. In this way, if a content is skipped at an early time after the start of the reproduction process, the computed evaluation value of the content is decreased to reflect worse evaluation of the content.

The predetermined value-decreasing criterion M can be set at any arbitrary value, depending on factors such as the reproduction period of an ordinary content and the content-listening trend of the user. For example, the predetermined value-decreasing criterion M can be set at the value of the predetermined value-increasing criterion N, that is, N=M, or the predetermined value-decreasing criterion M can be set at a value smaller than the predetermined value-increasing criterion N, that is, N>M. In the case of a content being reproduced with N=M, the computed evaluation value of the content is certainly decreased or increased, depending on whether or not the reproduction is skipped during the period of M (=N) seconds. In the case of a content being reproduced with N>M, on the other hand, the computed evaluation value of the content is certainly neither decreased nor increased during a period longer than M seconds but shorter than N seconds.

The first predetermined decrease can be set with a high degree of freedom depending on factors such as the content-listening trend of the user. In order to prevent the computed evaluation value from being decreased to an excessively small value, however, it is desirable to set the first predetermined decrease at a value smaller than the predetermined increase of 0.2 points. In this embodiment, for example, the predetermined value-decreasing criterion M is set at the value of the predetermined value-increasing criterion N, that is, M=N=60 seconds, and the first predetermined decrease is set at 0.1 points.

In this case, every time reproduction of a content is skipped prior to the lapse of a period of 60 seconds, the computed evaluation value of the content is decremented by 0.1 points. If the lower limit of the computed evaluation value is set at a typical minimum of 1.0 point, however, the computed evaluation value cannot be decremented to a value smaller than the lower limit.

With operation 2 carried out, for a content (a piece of music) put on a list as a content to be deleted, the computed evaluation value of the content is decreased by a second predetermined decrease such as 1.0 point as shown in FIG. 17. The second predetermined decrease can also be set with a high degree of freedom depending on factors such as the content-listening trend of the user. In order to reflect the intention revealed by the user entering a command to delete the content, however, the second predetermined decrease is set at a large value several times the predetermined increase of 0.2 seconds and the first predetermined decrease of 0.1 seconds.

The evaluation-value computation section 142 according to the embodiment analyzes an event log of a content to produce determinations as to: whether or not the content has been reproduced continuously; whether or not the content has been skipped; whether or not the ID of the content has been registered on a list of content IDs each identifying a content to be deleted. Then, on the basis of the results of the determinations, the evaluation-value computation section 142 automatically updates the computed evaluation value of the content.

In the case of the manual rating process, the user is capable of setting an input evaluation value at the five grades of 1 to 5 points in both an information-processing apparatus (PC) 10 and a portable reproduction apparatus (PD) 20. Right after a content is acquired by a method such as content distribution or a technique of carrying out a ripping process, the content does not have an input evaluation value assigned thereto. As the user carries out an operation to set an input evaluation value thereafter, the input evaluation value remains unchanged afterwards till the user enters a new input evaluation value.

If an input evaluation value is entered and set for a content in a manual rating process, the input evaluation value is displayed on a display screen, preventing a computed evaluation value of the same content from appearing on the display screen. That is to say, for the same content, the input evaluation value is displayed on the display screen, taking precedence of the computed evaluation value. Thus, the user is capable of recognizing only a computed evaluation value appearing on the display screen 4a or an input evaluation value appearing on the display screen 4b. In other words, in the case of a content with an input evaluation value set for it, only the input value is displayed on the display screen 4b shown in FIG. 16B. In the case of a content with no input evaluation value set for it, on the other hand, only the computed value is displayed on the display screen 4a shown in FIG. 16A.

By letting the display of the input evaluation value take precedence of the display of the computed evaluation value in this way, it is possible to avoid a complicated display of a plurality of evaluation values pertaining to the same content and confusion caused by such a complicated display as confusion of the user. In addition, an evaluation value can be displayed as a value taking the intention of the user into consideration. However, the scope of the present invention is by no means limited to this embodiment. For example, the display of a computed evaluation value may take precedence of the display of an input evaluation value. As an alternative, both the input evaluation value and the computed evaluation value can be displayed on the same screen at the same time.

It is to be noted that, even after an input evaluation value is entered and set for a content, a computed evaluation value found in an auto-rating process is stored and kept for the content in a memory. Thereafter, the processing to update the computed evaluation value stored and kept in the memory is carried out continuously in order to keep up with operations accompanying processes to reproduce the content. In addition, when the user carries out a special operation to deliberately display a computed evaluation value, the computed evaluation value of the auto-rating process is again displayed on the display screen to replace the input evaluation value of the manual rating process. In this way, the user is capable of verifying a computed evaluation value even after the user enters and sets an input evaluation value.

In addition, in the auto-rating process of a configuration according to the embodiment, a log of events is transferred from a portable reproduction apparatus 20 to an information-processing apparatus 10 and, after the information-processing apparatus 10 finds a computed evaluation value on the basis of the log of events, the information-processing apparatus 10 transmits the computed evaluation value to the portable reproduction apparatus 20. Thus, even if a content is reproduced and an event log for the content is updated in the portable reproduction apparatus 20, the updated log of events is not reflected immediately in the present computed evaluation value stored in the portable reproduction apparatus 20. In the case of a manual-rating process, on the other hand, a newly entered and set input evaluation value is immediately displayed on a display screen of the information-processing apparatus 10 or the portable reproduction apparatus 20.

As described above, in this embodiment, each content can be displayed on the basis of a computed evaluation value provided by an auto-rating process and an input evaluation value set in a manual rating process.

In general, a reproduction apparatus or, particularly, the portable reproduction apparatus (PD) 20 includes a processor with a low processing performance and has limitations imposed on power generated by a battery employed in the portable reproduction apparatus 20 in comparison with the information-processing apparatus (PC) 10. Thus, if the portable reproduction apparatus 20 is designated as an apparatus for automatically finding a computed evaluation value on the basis of a reproduction history, the portable reproduction apparatus 20 will generate a problem that not only does it take long time to carry out the processing of finding a computed evaluation value, but the battery is also inevitably exhausted fast.

In the configuration of the auto-rating process according to the embodiment, however, the evaluation-value computation section 142 employed in the information-processing apparatus 10 carries out the processing to find a computed evaluation value in place of the portable reproduction apparatus 20 and transmits the computed evaluation value obtained as a result of the processing to the portable reproduction apparatus 20. Thus, the computed evaluation value can be found faster and the battery employed in the portable reproduction apparatus 20 can be retrenched in expenditure.

In addition, the evaluation-value computation section 142 is also capable of finding a computed evaluation value for a content reproduced in the information-processing apparatus 10 on the basis of a reproduction history (or a result of analyzing a log of events) according to processes to reproduce the content typically every time the content reproduction section 124 employed in the information-processing apparatus 10 carries out a process to reproduce the content or every time a reproduction event of the process occurs without regard to whether the information-processing apparatus 10 is connected to the portable reproduction apparatus 20. Thus, a computed evaluation value stored in the host storage section 146 as the computed evaluation value for a content reproduced in the information-processing apparatus 10 can be updated dynamically each time a process to reproduce the content is carried out.

In addition, the evaluation-value computation section 142 has a function to find a new computed evaluation value by calculating the average of a computed evaluation value acquired by the information acquisition section 136 from the portable reproduction apparatus 20 and a computed evaluation value stored in the host storage section 146 as a computed evaluation value found in the information-processing apparatus 10. On top of that, the evaluation-value computation section 142 also has a function to find a new input evaluation value by calculating the average of an input evaluation value acquired by the information acquisition section 136 from the portable reproduction apparatus 20 and an input evaluation value stored in the host storage section 146 as an input evaluation value entered to the information-processing apparatus 10.

As described above, the evaluation-value computation section 142 also functions as an evaluation-value synchronization section for establishing synchronization between a computed evaluation value received from the portable reproduction apparatus 20 and a computed evaluation value stored in the information-processing apparatus 10 by calculating their average as well as establishing synchronization between an input evaluation value received from the portable reproduction apparatus 20 and an input evaluation value stored in the information-processing apparatus 10 by calculating their average.

A concrete technique adopted by the evaluation-value computation section 142 to find a computed evaluation value has been described above. As explained above, the evaluation-value computation section 142 automatically increases or decreases the computed evaluation value of a content in accordance with reproduction states of the content, that is, in accordance with information such as continuous reproduction periods and whether or not a skip exists during each reproduction period. In this way, the computed evaluation value can be used as an indicator at to how much the user likes the content. Thus, it is possible to implement a rating system providing much convenience to the user.

The evaluation-value computation section 142 stores the computed evaluation value found for a content as described above and the average input evaluation value found for the same content also as explained above in the host storage section 146 by associating the computed evaluation and the average input evaluation value with the content. Let us refer back to FIG. 13 to continue the explanation of the functional configuration of the information-processing apparatus 10.

Much like the evaluation-value input section 246 described earlier, the evaluation-value input section 144 sets an input evaluation value for a content stored in the content storage section 120 in accordance with an input entered by the user. In addition, the evaluation-value input section 144 stores the input evaluation value set in this way in the host storage section 146 along with the content ID of the content. Thus, the information-processing apparatus 10 is capable of setting an input evaluation value for a content and immediately displaying the most recent input evaluation value.

The host storage section 146 is a storage medium having a configuration including an HDD serving as the storage unit 111, a semiconductor memory such as a flash memory and a removable storage medium 7. The host storage section 146 is used for storing various kinds of information such as attributes of contents. To put it in detail, the host storage section 146 is used for storing the host database 170. The host database 170 is typically an RDB (Relational Database) including attributes of contents stored in the content storage section 120. A plurality of content-title search/display tables 15 having different types as described before are created on the basis of data stored in the host database 170.

Data stored in the host storage section 146 is explained by referring to FIG. 18.

As shown in FIG. 18, the host database 170 stored in the host storage section 146 includes pieces of information such as a content ID 140a, a content title 170b, an artist name 170c, an album name 170d, a genre 170e, a performance duration 170f, a computed evaluation value 170g, an input evaluation value 170h and a release year 170i on every row associated with a content identified by the content ID 170a. The content ID 170a is an identifier used for uniquely identifying the content. The content title 170b is the title of a piece of music performed by reproduction of the content. The content title 170b is also referred to as the title of the content. The artist name 170c is the name of an artist related with the content, which is generally a piece of music. The artist represents the singer of the piece of music, the performer of the piece of music, the song creator of the piece of music, the libretto writer of the piece of music and the producer of the content. The album name 170d is the name of a musical album serving as a collection including the piece of music. The genre 170e is the genre to which the piece of music pertains. The genre may be jazz, pops, rocks or another. The performance duration 170f is the length of the performance period of the piece of music. The computed evaluation value 170g is an evaluation value expressed in terms of points to represent an evaluation value added automatically to the piece of music in the auto-rating process. The input evaluation value 170h is an evaluation value expressed in terms of points to represent an evaluation value added manually to the piece of music in the manual rating process. The release year 170i is the year in which the piece of music was released or sold for the first time.

The playlist generation section 148 is a unit for creating a playlist, which is a set of attributes of contents satisfying a predetermined condition, on the basis of information such as a result stored in the analysis-result storage section 140 as a result of analyzing a log of events, a variety of content attributes stored in the host storage section 146 and an input entered by the user.

A playlist is a list showing a set of content identifiers each associated with attributes of a content identified by the identifier. The content identifier used for identifying a content is typically the ID of the content. The information-processing apparatus 10 and the portable reproduction apparatus 20 are each capable of reproducing contents identified by the content identifiers on a playlist in accordance with the playlist. Thus, if the information-processing apparatus 10 or the portable reproduction apparatus 20 has a playlist used as a set of attributes of contents each serving as a favorite with the user, for example, the information-processing apparatus 10 or the portable reproduction apparatus 20 is capable of reproducing the contents identified by the content identifiers on a playlist in accordance with the playlist. In this way, the information-processing apparatus 10 or the portable reproduction apparatus 20 is capable of reproducing contents, which each serve as a favorite with the user.

The attributes of a content include information such as the title of a piece of music performed by reproduction of the content, the name of an album serving as a collection including the piece of music and the name of an artist related to the content. The playlist generation section 148 is capable of acquiring the attributes of a content from the host database 170 stored in the host storage section 146. To put it in detail, the playlist generation section 148 extracts the ID of a content satisfying a predetermined condition from the analysis-result storage section 140 and searches the host database 170 for a content ID matching the extracted ID. Then, the playlist generation section 148 acquires attributes of a content identified by the content ID found in the search process from the host database 170.

To put it concretely, the playlist generation section 148 searches the host database 170 stored in the host storage section 146 for a content ID 170a matching the extracted ID of the content. Then, the playlist generation section 148 acquires information including a content title 170b, an artist name 170c, an album name 170d, a genre 170e, a performance duration 170f, a computed evaluation value 170g, an input evaluation value 170h and a release year 170i, which are associated with the content ID 170a as shown in FIG. 18, from the host database 170, and includes the acquired information on a playlist as attributes of the content.

In this way, the playlist generation section 148 generates a playlist for contents each satisfying a predetermined condition. The predetermined condition is typically a condition about, among other things, a specific reproduction period, a total reproduction duration, the number of reproductions, the number of skips, the number of pauses, the number of repetitions, a computed evaluation value, an input evaluation value or a year of release. These conditions are described in detail as follows.

First of all, the predetermined condition about a specific reproduction period is explained as follows. The playlist generation section 148 is capable of creating a playlist serving as a set of attributes of contents each reproduced only during a specific period of time on the basis of reproduction start and end dates/times stored in a reproduction-history table of the analysis-result storage section 140 as the reproduction start and end dates/times of each of the contents. Examples of the specific period of time are the month of April 2005 and a period from Dec. 23, 2004 to Dec. 25, 2004. The user may determine and enter the specific period of time to the information-processing apparatus 10. To put it more concretely, the playlist generation section 148 extracts attributes from the analysis-result storage section 140 as attributes of contents each having at least a reproduction start date/time or a reproduction end date/time falling within the entered specific period of time. Then, the playlist generation section 148 creates a playlist serving as a set of attributes extracted from the analysis-result storage section 140.

Next, the predetermined condition about a total reproduction duration is explained as follows. The playlist generation section 148 is capable of creating a playlist serving as a set of attributes of contents each having a total reproduction duration exceeding a predetermined length on the basis of total reproduction durations stored in a reproduction-state table of the analysis-result storage section 140 as the total reproduction durations of the contents. The user may determine and enter the predetermined length, or the predetermined length may be determined in advance by the playlist generation section 148 or another section. It is to be noted that the playlist generation section 148 is also capable of creating a playlist serving as a set of attributes of a predetermined number of contents arranged in an order of increasing or decreasing total reproduction durations on the basis of the total reproduction durations of the contents.

Next, the predetermined condition about a reproduction count representing the number of reproductions is explained. The playlist generation section 148 is capable of creating a playlist serving as a set of attributes of contents each having a reproduction count exceeding a predetermined reproduction count on the basis of reproduction counts stored in a reproduction-state table of the analysis-result storage section 140 as the reproduction counts of the contents. The user may determine and enter the predetermined reproduction count, or the predetermined reproduction count may be determined in advance by the playlist generation section 148 or another section. It is to be noted that the playlist generation section 148 is also capable of creating a playlist serving as a set of attributes of a predetermined number of contents arranged in an order of increasing or decreasing reproduction counts on the basis of the reproduction counts of the contents.

Next, the predetermined condition about a skip count representing the number of skips is explained. The playlist generation section 148 is capable of creating a playlist serving as a set of attributes of contents each having a skip count within a predetermined skip count on the basis of skip counts stored in a skip-state table of the analysis-result storage section 140 as the skip counts of the contents. The user may determine and enter the predetermined skip count, or the predetermined skip count may be determined in advance by the playlist generation section 148 or another section. It is to be noted that the playlist generation section 148 is also capable of creating a playlist serving as a set of attributes of a predetermined number of contents arranged in an order of increasing or decreasing skip counts on the basis of the skip counts of the contents.

Next, the predetermined condition about a pause count representing the number of pauses is explained. The playlist generation section 148 is capable of creating a playlist serving as a set of attributes of contents each having a pause count within a predetermined pause count on the basis of pause counts stored in a pause-state table of the analysis-result storage section 140 as the pause counts of the contents. The user may determine and enter the predetermined pause count, or the predetermined pause count may be determined in advance by the playlist generation section 148 or another section. It is to be noted that the playlist generation section 148 is also capable of creating a playlist serving as a set of attributes of a predetermined number of contents arranged in an order of increasing or decreasing pause counts on the basis of the pause counts of the contents.

Next, the predetermined condition about a repetition count representing the number of repetitions is explained. The playlist generation section 148 is capable of creating a playlist serving as a set of attributes of contents each having a repetition count exceeding a predetermined repetition count on the basis of repetition counts stored in a repetition-state table of the analysis-result storage section 140 as the repetition counts of the contents. The user may determine and enter the predetermined repetition count, or the predetermined repetition count may be determined in advance by the playlist generation section 148 or another section. It is to be noted that the playlist generation section 148 is also capable of creating a playlist serving as a set of attributes of a predetermined number of contents arranged in an order of increasing or decreasing repetition counts on the basis of the repetition counts of the contents.

Next, the predetermined condition about a computed evaluation value is explained. The playlist generation section 148 is capable of creating a playlist serving as a set of attributes of contents having the same computed evaluation value or each having a computed evaluation value falling within a predetermined range on the basis of computed evaluation values stored in the host database 170 as the computed evaluation values of the contents. The user may determine and enter a computed evaluation value to be used as a criterion of a playlist, or the criterion may be determined in advance by the playlist generation section 148 or another section. It is to be noted that the playlist generation section 148 is also capable of creating a playlist serving as a set of attributes of a predetermined number of contents arranged in an order of increasing or decreasing computed evaluation values on the basis of the computed evaluation values of the contents.

Next, the predetermined condition about an input evaluation is explained. The playlist generation section 148 is capable of creating a playlist serving as a set of attributes of contents having the same input evaluation value or each having an input evaluation value falling within a predetermined range on the basis of input evaluation values stored in the host database 170 as the input evaluation values of the contents. The user may determine and enter an input evaluation value to be used as a criterion of a playlist, or the criterion may be determined in advance by the playlist generation section 148 or another section. It is to be noted that the playlist generation section 148 is also capable of creating a playlist serving as a set of attributes of a predetermined number of contents arranged in an order of increasing or decreasing input evaluation values on the basis of the input evaluation values of the contents.

Next, the predetermined condition about a year of release is explained. The playlist generation section 148 is capable of creating a playlist serving as a set of attributes of contents having the same year of release or each having a release year falling within a predetermined range on the basis of release years stored in the host database 170 as the release years of the contents. The user may determine and enter a year of release to be used as a criterion of a playlist, or the criterion may be determined in advance by the playlist generation section 148 or another section. It is to be noted that the playlist generation section 148 is also capable of creating a playlist serving as a set of attributes of a predetermined number of contents arranged in an order of progressing or regressing years of release on the basis of the release years of the contents.

In addition, the playlist generation section 148 may also create a playlist serving as a set of attributes of contents each inferred as a content serving as a favorite with the user on the basis of all or some of the total reproduction duration, the number of reproductions, the number of skips, the number of pauses, the number of repetitions, the computed evaluation value, the input evaluation value and the year of release, which are described above. To put it concretely, the playlist generation section 148 is capable of creating a playlist serving as a set of attributes of contents each inferred as a content serving as a favorite with the user by, for example, selecting contents that each have a relatively long total reproduction duration, a relatively large reproduction count, a relatively large repetition count, a relatively small skip count, a relatively small pause count, a large computed evaluation value and/or a large input evaluation value.

As described above, by generating a number of playlists each based on results of analyzing event logs each reflecting states of reproduction operations carried out by the user on contents, the playlist generation section 148 is capable of reflecting the reproduction operations carried out by the user on the playlists.

It is to be noted that, if the analysis result stored in the analysis-result storage section 140 is a result of analyzing a log of events in an information-processing apparatus 10, a playlist generated by the playlist generation section 148 is a playlist reflecting reproduction operations carried out by the user on the information-processing apparatus 10. If the analysis result stored in the analysis-result storage section 140 is a result of analyzing a log of events in a portable reproduction apparatus 20, on the other hand, a playlist generated by the playlist generation section 148 is a playlist reflecting reproduction operations carried out by the user on the portable reproduction apparatus 20. If the analysis result stored in the analysis-result storage section 140 is a result of analyzing a log of events in both an information-processing apparatus 10 and a portable reproduction apparatus 20, a playlist generated by the playlist generation section 148 is a playlist reflecting reproduction operations carried out by the user on both the information-processing apparatus 10 and the portable reproduction apparatus 20.

In addition, the playlist generation section 148 is also capable of creating a playlist serving as a set of attributes of contents each selected as a content serving as a favorite with the user on the basis of inputs entered by the user.

A playlist generated by the playlist generation section 148 like the one described above is stored in a storage medium such as the host storage section 146 or a playlist storage section provided separately. This playlist storage section provided separately is not shown in the figure though.

The content-updating section 150 is a unit for adding one, two or more contents stored in the content storage section 120 to the content storage section 220 employed in the portable reproduction apparatus 20 and deleting contents from the content storage section 220 employed in the portable reproduction apparatus 20.

To put it concretely, when the information-processing apparatus 10 receives a command to add a content to the portable reproduction apparatus 20, the content-updating section 150 reads out the content to be added to the portable reproduction apparatus 20 from the content storage section 120, makes an access to the portable reproduction apparatus 20 and controls the portable reproduction apparatus 20 to record the content into the content storage section 220 employed in the portable reproduction apparatus 20.

In addition, when the information-processing apparatus 10 receives a command to delete a content from the portable reproduction apparatus 20, the content-updating section 150 makes an access to the portable reproduction apparatus 20 and controls the portable reproduction apparatus 20 to delete the content from the content storage section 220 employed in the portable reproduction apparatus 20.

On top of that, when the information-processing apparatus 10 receives a command to synchronize contents stored in the information-processing apparatus 10 and the portable reproduction apparatus 20 with each other after the information-processing apparatus 10 has been connected to the portable reproduction apparatus 20, the content-updating section 150 controls the information-processing apparatus 10 to transmit contents stored in the content storage section 120 employed in the information-processing apparatus 10 but not stored in the content storage section 220 employed in the portable reproduction apparatus 20 to the portable reproduction apparatus 20. Further, the content-updating section 150 controls the portable reproduction apparatus 20 to transmit contents stored in the content storage section 220 employed in the portable reproduction apparatus 20 but not stored in the content storage section 120 employed in the information-processing apparatus 10 to the information-processing apparatus 10. In this way, the content-updating section 150 matches (synchronizes) the contents stored in the content storage section 120 with those stored in the content storage section 220. It is to be noted that this synchronization processing can also be carried out automatically when the information-processing apparatus 10 and the portable reproduction apparatus 20 are connected to each other by the local line 9.

As described above, with the information-processing apparatus 10 and the portable reproduction apparatus 20 connected to each other, the content-updating section 150 executes functions to update contents stored in the portable reproduction apparatus 20 with contents stored in the information-processing apparatus 10 by deleting contents from the portable reproduction apparatus 20, adding contents to the portable reproduction apparatus 20 or synchronizing contents stored in the information-processing apparatus 10 and the portable reproduction apparatus 20 with each other. These functions can be executed because the information-processing apparatus 10 and the portable reproduction apparatus 20 are so designed that, with the information-processing apparatus 10 and the portable reproduction apparatus 20 connected to each other by the local line 9, the portable reproduction apparatus 20 appears to the information-processing apparatus 10 as an external storage medium such as an HDD, allowing the information-processing apparatus 10 to add data to the portable reproduction apparatus 20 and delete data from the portable reproduction apparatus 20.

In addition, when the information-processing apparatus 10 receives a list from the portable reproduction apparatus 20 as a list of IDs each identifying a content to be deleted from the portable reproduction apparatus 20, the content-updating section 150 executes control to delete contents identified by the IDs shown on the list from the content storage section 220 employed in the portable reproduction apparatus 20. By letting the information-processing apparatus 10 control the processing to delete contents identified by the IDs shown on such a deletion list from the content storage section 220 employed in the portable reproduction apparatus 20, the processing load borne by the portable reproduction apparatus 20 can be reduced. Thus, the amount of processing to exhaust power of the battery employed in the portable reproduction apparatus 20 can be suppressed.

The content identification section 152 is a unit for identifying a plurality of contents stored in the portable reproduction apparatus 20. The contents stored in the portable reproduction apparatus 20 to be identified by the content identification section 152 are not necessarily the same as contents already stored in the portable reproduction apparatus 20 at the point of time the content identification section 152 identifies the contents. In the following description, the point of time the content identification section 152 identifies contents is referred to as an identification point of time. That is to say, if there are contents determined by the content identification section 152 at the identification point of time as contents to be stored in the portable reproduction apparatus 20, the contents stored in the portable reproduction apparatus 20 to be identified by the content identification section 152 are defined as contents including the contents already stored in the portable reproduction apparatus 20 and the contents determined by the content identification section 152 at the identification point of time as contents to be stored in the portable reproduction apparatus 20. If there are contents determined by the content identification section 152 at the identification point of time as contents to be deleted from the portable reproduction apparatus 20, on the other hand, the contents stored in the portable reproduction apparatus 20 to be identified by the content identification section 152 are defined as all the contents already stored in the portable reproduction apparatus 20 except the contents determined by the content identification section 152 at the identification point of time as contents to be deleted from the portable reproduction apparatus 20.

The content identification section 152 typically makes an access to the portable reproduction apparatus 20 connected to the information-processing apparatus 10 to acquire attributes of each content stored in the portable reproduction apparatus 20. The attributes of a content include the ID and title of the content. Thus, on the basis of the acquired attributes, the content identification section 152 is capable of identifying each content stored in the portable reproduction apparatus 20.

In addition, when the content-updating section 150 has added contents to the portable reproduction apparatus 20 or deleted contents from the portable reproduction apparatus 20, or has determined contents to be added to the portable reproduction apparatus 20 or contents to be deleted from the portable reproduction apparatus 20, the content identification section 152 acquires information representing the contents already added or determined to be added by the content-updating section 150 or the contents already deleted or determined to be deleted by the content-updating section 150. Typical information representing such a content is the ID of the content. Thus, on the basis of the acquired information, the content identification section 152 is capable of identifying the contents already added or determined to be added by the content-updating section 150 or the contents already deleted or determined to be deleted by the content-updating section 150. As a result, the content identification section 152 is capable of identifying each content stored in the portable reproduction apparatus 20.

As described above, the content identification section 152 typically makes an access to the portable reproduction apparatus 20 connected to the information-processing apparatus 10 to acquire attributes of each content stored in the portable reproduction apparatus 20. Then, on the basis of the acquired attributes and the substance of an addition/deletion process already carried out or to be carried out by the content-updating section 150, the content identification section 152 is capable of identifying a plurality of contents stored in the portable reproduction apparatus 20.

The attribute extraction section 154 is a unit for extracting attributes of a content identified by the content identification section 152 from the host database 170. Assume that the content identification section 152 has identified 1,000 contents stored in the portable reproduction apparatus 20. In this case, the attribute extraction section 154 searches the host database 170 for the attributes of each of the 1,000 contents and extracts the attributes found in the search process from the host database 170. Then, the attribute extraction section 154 supplies the attributes found in the search process to the table creation section 156.

The table creation section 156 is a unit for creating a plurality of content-title search/display tables 15 with different types on the basis of content attributes extracted by the attribute extraction section 154. The content-title search/display tables 15 provided with different types are each put in a layer structure including the titles of the identified contents as a lowest-level layer and the name of a group including the identified contents as a highest-level layer on the basis of the extracted attributes. Typically, the title of a content representing a piece of music is the title of the piece of music whereas the name of a group is an attribute such as the name of an album serving as a collection including the content, the name of an artist associated with the content, the genre of the piece of music, the release year of the content or the evaluation value of the content.

The table creation section 156 creates at least two content-title search/display tables 15, i.e., first and second content-title search/display tables, by determining at least two different types of group on basis of predetermined consideration as group types each to include attributes selected from the content attributes received from the attribute extraction section 154 and arranging (or sorting) content titles in each group in accordance with at least two different sorting rules.

For example, the table creation section 156 creates an initial-classified all-content search/display table to serve as a typical first search/display table showing the titles of the identified contents sorted in a content-title pronunciation order or a content-title character-string order. The process to arrange titles in the content-title pronunciation order or the content-title character-string order are each also referred to as an initial-sorting process to be described in detail later. In addition, the table creation section 156 also determines the album, which is a collection of some of the identified contents, as a typical first group type and arranges the titles of the contents in an order of increasing track numbers for each album name in order to create an album-classified search/display table 15a shown in FIG. 4A to serve as a typical second search/display table. On top of that, the table creation section 156 also determines the artist, which is a person associated with the identified contents, as a typical second group type and arranges the titles of the contents in a content-title pronunciation order or a content-title character-string order for each artist name in order to create an artist-classified all-content search/display table to serve as a typical third search/display table.

As described above, the attribute extraction section 154 and the table creation section 156 use the name of a group as a search key to make a query about the number of attributes stored in the host database 170 in a process to create a plurality of content-title search/display tables 15 with different types. It is to be noted that the initial-sorting function of the table creation section 156 to arrange a plurality of titles in the content-title pronunciation order or the content-title character-string order will be described later.

The transfer section 158 is a unit functioning as a table transferring section for transferring content-title search/display tables 15 created by the table creation section 156 as tables with different types to the portable reproduction apparatus 20 by way of the communication unit 132.

The transfer section 158 is also a unit functioning as a section for transferring a computed evaluation value created by the evaluation-value computation section 142 to the portable reproduction apparatus 20 by way of the communication unit 132. In this case, after transferring a computed evaluation value to the portable reproduction apparatus 20, the transfer section 158 may request the portable reproduction apparatus 20 to delete an event log used as a basis for finding the computed evaluation value from the portable reproduction apparatus 20. In this way, an event log no longer required can be deleted from the portable reproduction apparatus 20. In addition, the transfer section 158 may also transmit computed and input evaluation values stored in the host storage section 146 as evaluation values for the portable reproduction apparatus 20 to the portable reproduction apparatus 20.

The transfer section 158 is also a unit functioning as a content transferring section for transferring one, two or more contents stored in the content storage section 120 to the portable reproduction apparatus 20 by way of the communication unit 132. In this case, the transfer section 158 may select some of contents selectively out of the plurality contents to be transferred to the portable reproduction apparatus 20, on the basis of the computed and input evaluation values of the contents. For example, the transfer section 158 gives priority of transmission to contents each having a high computed or input evaluation value or selects only contents each having a high computed or input evaluation value exceeding a predetermined value such as 4.0 as contents to be transmitted to the portable reproduction apparatus 20. In this way, the transfer section 158 is capable of transferring contents each serving as a favorite with the user by letting the favorite contents take precedence of contents not serving as a favorite with the user.

If the content to be transferred to the portable reproduction apparatus 20 is a subscribed content or, in other words, if the content to be transferred to the portable reproduction apparatus 20 is a content usable only during a predetermined season, prior to the transmission of the content, the transfer section 158 produces a result of determination as to whether or not the predetermined season has ended on the basis of a utilization right given to the content. If the result of the determination indicates that the predetermined season has not ended, the transfer section 158 transmits the content to the portable reproduction apparatus 20. If the result of the determination indicates that the predetermined season has ended, on the other hand, the transfer section 158 does not transmit the content to the portable reproduction apparatus 20. Instead, the information-processing apparatus 10 transmits an error message or the like to the portable reproduction apparatus 20.

If the transfer section 158 transmits all or some of contents stored in the content storage section 120 to the portable reproduction apparatus 20 and the content storage section 220 employed in the portable reproduction apparatus 20 will be exhausted by the contents received from the information-processing apparatus 10, some contents already stored in the content storage section 220 may be automatically deleted in a selective manner on the basis of the computed or input evaluation values of the contents. For example, the contents may be deleted from the content storage section 220 in a deletion order starting with a content having a lowest evaluation value.

Then, after the content-updating section 150 automatically deletes contents from the content storage section 220, the transfer section 158 transmits all or some of contents stored in the content storage section 120 to the portable reproduction apparatus 20. Thus, in this configuration, if the size of a free storage area used for storing received contents in the portable reproduction apparatus 20 becomes insufficient, contents are deleted automatically from the content storage section 220 of the portable reproduction apparatus 20 in order to provide a free storage area large enough for storing contents received from the information-processing apparatus 10. As a result, it is possible to allocate a free storage area in the content storage section 220 employed in the portable reproduction apparatus 20 as a sufficiently large area used for storing contents received from the information-processing apparatus 10. In addition, by selectively deleting contents from the content storage section 220 in a deletion order starting with a content having a lowest computed or input evaluation value, unnecessary contents each not serving as a favorite with the user are deleted first to leave only necessary contents each serving as a favorite with the user in the content storage section 220. Thus, contents stored in the content storage section 220 employed in the portable reproduction apparatus 20 as a storage section with a limited storage capacity can be subjected to automatic readjustment according to the need of the user.

If a new ripped content obtained from a removable storage medium 7 by the ripping section 162 employed in the information-processing apparatus 10 or received from another information-processing apparatus 10 is to be stored in the content storage section 220 employed in the portable reproduction apparatus 20 and the content storage section 220 will be exhausted by the new ripped content, the content-updating section 150 does not delete a ripped content already stored in the content storage section 220. Instead, the content-updating section 150 first deletes a distributed content received from the content distribution server 30 from the content storage section 220. In this way, it is possible to prevent a ripped content that may be required again by the user from being deleted automatically without consent of the user. On the other hand, a distributed content may be difficult to obtain again from the content distribution server 30 in some cases. In this case, the information-processing apparatus 10 may delete a ripped content first before deleting a distributed content.

The transfer section 158 also functions as a playlist transferring section capable of transferring a playlist generated by the playlist generation section 148 to the portable reproduction apparatus 20. It is to be noted that the recipient of the playlist transferred by the playlist transferring section can be a portable reproduction apparatus 20 providing the information-processing apparatus 10 with a log of events or a content reproduction apparatus having no function to generate a log of events. By transferring a playlist to such a content reproduction apparatus, a playlist provided by the embodiment as a playlist reflecting reproduction operations carried out by the user can be reproduced in an ordinary content reproduction apparatus.

The distribution-service utilization section 160 is a unit for carrying out processing relevant to a content distribution service rendered in conjunction with the content distribution server 30. To put it concretely, for example, the distribution-service utilization section 160 exchanges various kinds of information with the content distribution server 30 and supports operations to input and output the information. The information exchanged with the content distribution server 30 includes user authentication information required for utilizing the content distribution service, the fee of using a content and a request for distribution of a content. Examples of the user authentication information are a user ID and a password.

In addition, the distribution-service utilization section 160 receives a distributed content and the license of the distributed content, which are transmitted by the content distribution server 30 by way of the network 5, from the communication unit 115. That is to say, when the user of the information-processing apparatus 10 purchases a content by making use of the content distribution service, the distribution-service utilization section 160 downloads the content and a license determining a condition for utilization of the content from the content distribution server 30.

On top of that, when a content is transmitted from the content distribution server 30 to the information-processing apparatus 10, the distribution-service utilization section 160 also receives attributes of the distributed content from the content distribution server 30. The attributes of the distributed content includes the title of the distributed content, the name of an artist associated with the distributed content, the name of an album serving as a collection including the distributed content, the genre of the distributed content, the reproduction duration of the distributed content, the ID of the distributed content, the distribution date/time of the distributed content, the size of the data of the distributed content, the format of the data of the distributed content and the type of a copyright management method applied to the distributed content.

The distribution-service utilization section 160 described above is typically implemented by software installed in the information-processing apparatus 10 as a content distribution service program to be executed for to utilize the content distribution service. It is to be noted that the distribution-service utilization section 160 can be provided for each of a plurality of content distribution services utilized by the user.

The ripping section 162 is a unit for ripping a content from a recording medium 7a such as either of a CD and a DVD, which are used for recording audio and/or video contents. To put it concretely, the ripping section 162 typically controls the drive 112 in accordance with an input, which is entered by the user to the information-processing apparatus 10, to read out audio and/or video data from the recording medium 7a and creates a content by converting the audio and/or video data into data with a format that can be processed by the information-processing apparatus 10. An example of the format that can be processed by the information-processing apparatus 10 is the ATRAC3 format.

The display control section 164 is a unit for controlling processes to display various kinds of information on the display section 166. To put it in detail, the display control section 164 sequentially displays a variety of content-title search screens on the display section 166 in accordance with substances of select operations carried out by the user during typically a process carried out by the reproduction operation section 122 to search for a content. To put it concretely, the display control section 164 sequentially displays a variety of content-title search screens on the display section 166 in accordance with substances of select operations carried out by the user, that is, typically in accordance with a content-title search/display table 15, which is a search list created by the table creation section 156. In this way, the titles of a plurality of contents stored in the content storage section 120 can be displayed for each album, each artist or each genre in an order of decreasing/ascending evaluation values, an order of decreasing/ascending reproduction counts or an order of reproduction dates/times starting with the latest one. Thus, by viewing the displayed data, the user is capable of detecting a content serving as a favorite with the user with ease and in a short period of time and selecting the detected content. As a result, the information-processing apparatus 10 is convenient for the user. It is to be noted that the display section 166 is typically implemented by the output unit 110 or the like.

In addition, the display control section 164 reads out a computed or input evaluation value from the host storage section 146 and displays the input evaluation value on the display section 166 by letting the input evaluation value take precedence of the computed evaluation value. On top of that, if the evaluation-value input section 144 sets an input evaluation value of a specific content with the computed evaluation value already displayed for the specific content, the display control section 164 displays the set input evaluation value on the display section 166 to replace the computed evaluation value displayed so far. In addition, the display control section 164 is also capable of displaying a playlist stored in the host storage section 146 or the like on the display section 166.

The functional configuration of each of the elements employed in the information-processing apparatus 10 according to the embodiment have been described above. Let us keep in mind, however, that it is possible to provide the information-processing apparatus 10 with a typical configuration in which some specific ones of the elements are implemented by hardware having the functions of the specific elements. As an alternative, it is also possible to provide the information-processing apparatus 10 with another configuration in which the functions of the specific elements are implemented by programs installed in the information-processing apparatus 10 as programs to be executed by a computer. The specific elements include elements such as the reproduction operation section 122, the content reproduction section 124, the date/time generation section 126, the reproduction-history generation section 128, the connection detection section 134, the information acquisition section 136, the reproduction-history analysis section 138, the evaluation-value computation section 142, the evaluation-value input section 144, the playlist generation section 148, the content-updating section 150, the content identification section 152, the attribute extraction section 154, the table creation section 156, the transfer section 158, the distribution-service utilization section 160, the ripping section 162 and the display control section 164.

<Function to Sort Initials>

Next, by referring to FIGS. 19 to 27, the following description explains a function executed by the information-processing apparatus 10 according to the embodiment to sort the initials of content attributes.

A process to sort initials is a process to arrange attributes of contents in the attribute content-title pronunciation order or the attribute content-title character-string order. The attribute of a content can be information such as the title of the content, the name of an album serving as a collection including the content or the name of an artist associated with the content. It is to be noted that the attribute pronunciation order or the attribute character-string order is an order of characters composing a character string expressing the attribute. In the following description, the attribute pronunciation order or the attribute character-string order is referred to simply as a reading order for the sake of convenience.

(Outline of Generation of Sort Texts)

Figure 19:
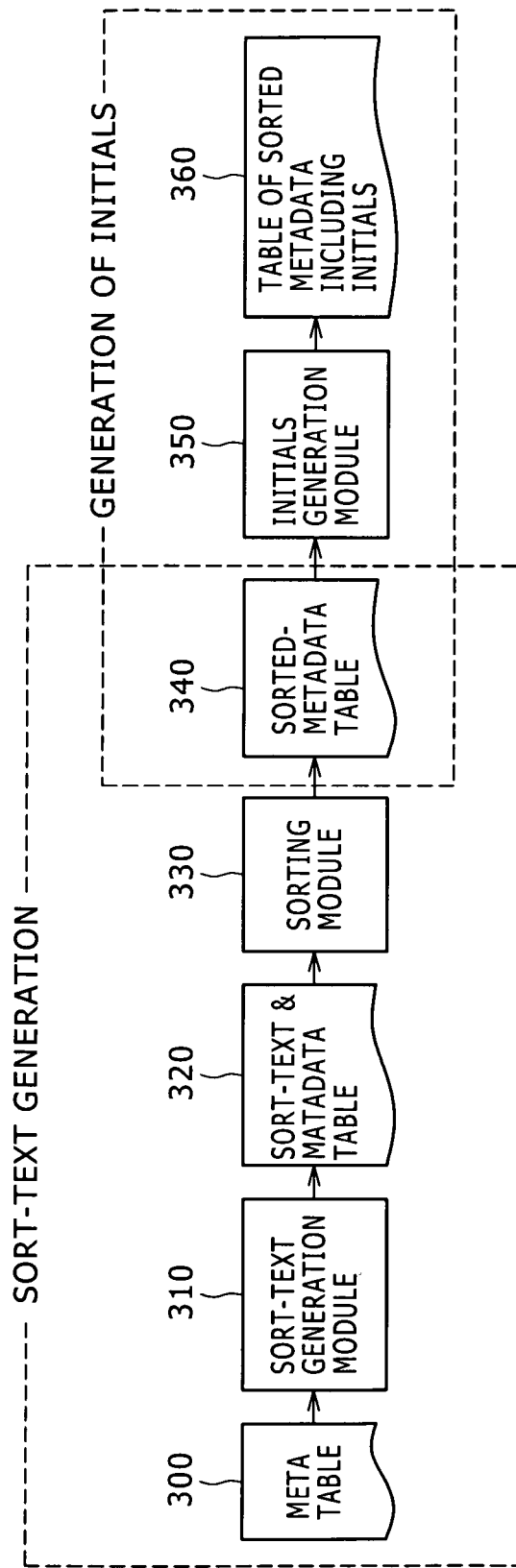
FIG. 19 is a diagram showing an outline of processes to generate a source text and generate initials in accordance with the embodiment.

As shown in FIG. 19, the information-processing apparatus 10 automatically sets a sort-text generation module 310. The information-processing apparatus 10 uses the set sort-text generation module 310 to generate a sort text for every piece of metadata included in a metadata table 300 and append the generated sort texts to their respective pieces of metadata in order to generate a sort-text & metadata table 320 showing the pieces of metadata and their respective sort texts. Then, the information-processing apparatus 10 uses a sort module 330 to sort pieces of metadata in the sort-text & metadata table 320 by arranging the sort texts of the pieces of metadata in a predetermined sorting order to generate a sorted-metadata table 340.

(Outline of Generation of Initials)

Subsequently, the information-processing apparatus 10 generates the initial (or the first character) of every piece of metadata included in the sorted-metadata table 340 on the basis of an initials generation module 350 and then generates a sorted-metadata & initials table 360 by adding the generated initials to their corresponding pieces of metadata included in the sorted-metadata table 340 showing pieces of metadata each including an initial. The sorted-metadata & initials table 360 is a table showing pieces of metadata each including an initial appended thereto.

The information-processing apparatus 10 then transmits the sorted-metadata & initials table 360 generated as described above to the portable reproduction apparatus 20 along with contents associated with the sorted-metadata & initials table 360. The table creation section 156 employed in the information-processing apparatus 10 sorts initials of attributes of the contents on the basis of the sorted-metadata & initials table 360 in order to generate a content-title search/display table 15.

(Functions of the Information-Processing Apparatus 10)

Next, functions of the information-processing apparatus 10 are explained by referring to FIG. 20 showing functional blocks of the information-processing apparatus 10. As shown in the figure, the information-processing apparatus 10 includes a content acquisition section 172, an information acquisition section 174, a module storage section 180, a sort-text generation section 182, a sorting-execution section 184, an initials generation section 186, an information output section 188 and a display section 190.

The content acquisition section 172 is a unit corresponding typically to the distribution-service utilization section 160 and/or the ripping section 162. The content acquisition section 172 acquires a content from the content distribution server 30 or a removable storage medium 7. The information acquisition section 174 is a unit for acquiring attributes added to the content acquired by the content acquisition section 172 as metadata, which includes the name of an artist associated with the content, the name of an album serving as a collection including the content and the title of the content (or the title of a piece of music serving as the content).

The module storage section 180 is a unit used for storing a plurality of modules each prescribing a rule. Some of the modules are selected to form the sort-text generation module 310 shown in FIGS. 19 and 21. Typical ones of the modules include a definite-article omission module 180a, a 'ザ' omission module 180b, a reversed-conversion module 180c, an alphabetic-character conversion module 180d, a nickname conversion module 180e, a symbol-pronunciation conversion module 180f a difficult-to-pronounce-name conversion module 180g, a number-pronunciation conversion module 180h, a first-name last-name reversal module 180i, a character-type classification module 180j, a sorting module 330a and a character-type-based sorting module 330b.

The definite-article omission module 180a is a module prescribing a rule to delete a definite article from metadata for each language such as English, French, Italian, German or Spanish. This rule is used in a process to generate a sort text from metadata. For example, the definite-article omission module 18a generates a sort text of 'Beat' from metadata of 'The Beat'. The definite-article omission module 18a can be applied to any metadata without regard to the language in which the metadata is written.

The 'ザ' omission module 180b is a module prescribing a rule to delete a definite article written in the Japanese language from metadata. Examples of the definite article written in the Japanese language are 'ザ・' and 'ザ <space>'. This rule is used in a process to generate a sort text from metadata. For example, the 'ザ' omission module 180b generates a sort text of 'ビート' from metadata of 'ザ　ビート''. The 'Za' omission module 180b can be applied to only metadata written in the Japanese language.

The reversed-conversion module 180c is a module prescribing a rule to input a kanji character and output the pronunciation of the kanji character by using a function similar to a reversed-conversion function of the IME (Input Method Editor), which is the generic name of software for inputting a Japanese sentence. The main function of the IME is a function to convert hiragana/katakana characters into a kanji character. This rule is used in a process to generate a sort text from metadata. The reversed-conversion module 180c is applied in a process to convert metadata written in the Japanese, Chinese or a Korean language into a pronunciation serving as a sort text.

Assume for example that an artist name serving as metadata is '砂原良一'and a sort text is to be generated in hiragana or katakana. In this case, the reversed-conversion module 180c generates a hiragana sort text of 'すなはらりょういち' or a katakana sort text of 'スナハラリョウイチ' from the metadata '砂原良一'. As another example, an artist name serving as metadata is '青山典子'. In this case, the reversed-conversion module 180c generates a hiragana sort text of 'あおやまのりこ' or a katakana sort text of 'アオヤマノリコ'from the metadata '青山典子'.

If the sort text is to be generated in the Chinese language, for example, the reversed-conversion module 180c generates a pin-yin sort text of 'QING （青）S HAN（山） DIAN （典）ZI （子）'from the metadata '青山典子'.

If the sort text is to be generated in the Korean language, for example, the reversed-conversion module 130c generates hangul sort texts of '아오야마노리코(phonetically expression)' and '청산전자 (Chinese character expression)' from the metadata '青山典子'.

The reversed-conversion module 180c can be one of two types, i.e., an artist-name reversed-conversion module for converting the name of an artist into a hiragana or katakana pronunciation and a song-title reversed-conversion module (or a general reversed-conversion module) for converting the title of a musical content (or general name) into a hiragana or katakana pronunciation. Metadata includes various kinds of information such as the name of an artist, the title of a musical content and the name of a musical album. Thus, by applying a proper reversed-conversion module to a piece of metadata, the accuracy of the conversion process can be enhanced. For example, the artist-name reversed-conversion module is applied to the name of an artist whereas the song-title reversed-conversion module (or the general reversed-conversion module) is applied to the title of a musical content or a general name. Accordingly, by applying a proper reversed-conversion module to a piece of metadata, an artist name of '杏子' is converted correctly into a katakana sort text of 'キョウコ' while a musical-content title of '杏子'is converted correctly into a katakana sort text of 'アンズ'. In this way, the accuracy of a process to convert the name of an artist into a sort text can be enhanced substantially.

In order to cope with a situation in which a title or a name cannot be converted correctly into a sort text, it is possible to provide a configuration allowing the user itself to register a user-defined display, a user-defined pronunciation and a user-defined part of speech in the reversed-conversion module. In this case, the part of speech includes an ordinary noun, a verb, a (full) name, a last name, a first name and the name of a group. Thus, when a musical content of an artist, the name of which could not be converted before, is again ripped, the name of the artist can be correctly converted into a sort text this time. In addition, data registered in the reversed-conversion module can be uploaded to a server to be included in a revised dictionary used in the server.

Provided with a dictionary used for storing pronunciations of alphabetic characters, the alphabetic-character conversion module 180d is a module prescribing a rule to obtain a pronunciation from alphabetic-character metadata on the basis of the dictionary. This rule is used in a process to generate a pronunciation sort text from metadata. The alphabetic-character conversion module 180d is applied to a process to convert alphabetic-character metadata into a Japanese, Chinese or Korean pronunciation. When alphabetic-character metadata of 'PUFFO' is converted into a Japanese pronunciation, for example, the alphabetic-character conversion module 180d is applied to convert the alphabetic-character metadata 'PUFFO' into a hiragana sort text of 'ぱふぉー' or a katakana sort text of 'パフォー' on the basis of the dictionary used for storing pronunciations of alphabetic characters.

Provided with a dictionary used for storing a nickname for each person name, the nickname conversion module 180e is a module prescribing a rule to obtain a nickname from metadata representing the name of a person on the basis of the dictionary. This rule is used in a process to generate a nickname sort text from person-name metadata. The nickname conversion module 180e is applied to a process to convert metadata representing the name of a person into the nickname for the name of the person. For example, the nickname conversion module 180e generates a nickname sort text of 'はまちゃん' from a person name of '浜光一' on the basis of the dictionary used for storing a nickname for each person name.

Provided with a dictionary used for storing the pronunciation of each symbol (or each special character) such as the '☆', the symbol-pronunciation conversion module 180f is a module prescribing a rule to obtain the pronunciation of a symbol (or a special character) on the basis of the dictionary. For example, the symbol-pronunciation conversion module 180f generates a sort string of 'star' or the like from metadata of '☆' on the basis of the dictionary used for storing the pronunciation of each symbol (or each special character). Thus, from metadata of '涙目がキラリ☆' a sort string of '涙目がキラリstar' is generated.

Provided with a dictionary used for storing the pronunciation of each difficult-to-pronounce name, the difficult-to-pronounce-name conversion module 180g is a module prescribing a rule to obtain the pronunciation of a difficult-to-pronounce name on the basis of the dictionary. The rule is applied to a process to convert metadata representing a difficult-to-pronounce name into the pronunciation of the difficult-to-pronounce name. For example, the difficult-to-pronounce-name conversion module 180g generates a sort text of 'いみごらいだー' representing a pronunciation from metadata of '135R' representing a difficult-to-pronounce name on the basis of the dictionary used for storing the pronunciation of the difficult-to-pronounce name.

The number-pronunciation conversion module 180h is a module prescribing a rule to append a pronunciation to a number. For example, the difficult-to-pronounce-name generates a sort text of '僕の瞳はひゃくまんボルト' from metadata of '僕の瞳は１００万ボルト'.

The first-name last-name reversal module 180i is a module prescribing a rule to change an order of a last name, a comma and a first name or an order of a last name, a space and a first name to an order of a first name, a space and a last name. For example, the first-name last-name reversal module 180i generates a sort string of 'Jeff Back' from metadata of 'Back, Jeff' or 'Back Jeff'.

The character-type classification module 180j is a module for splitting metadata including characters of two or more different types into pieces of metadata each including only characters of one of the character types. Assume for example that the metadata includes characters of two types, i.e., alphabetic characters and kanji characters. In this case, the character-type classification module 180j splits the metadata into metadata including only the alphabetic characters and metadata including only the kanji characters.

The sorting module 330a is a module for sorting pieces of metadata on the basis of sort texts, which have been generated for the respective pieces of metadata, in order to generate sorted pieces of metadata. The character-type-based sorting module 330b is a module for carrying out a sorting process on pieces of metadata, which is output by the character-type classification module 180j as a result of a splitting process based on types of character, in order to generate pieces of metadata obtained as a result of the sorting process based on the types of character.

The module storage section 180 is a unit for storing the modules described above by associating each of the modules with a priority level at which the rule prescribed by the module is to be applied. That is to say, a rule is applied on a priority basis, starting with a rule associated with a module having a high priority level, in order to generate a sort text.

The sort-text generation section 182 is a unit for automatically generating a sort text on the basis of one or more modules selected from the modules stored in the module storage section 180 as one or more modules each prescribing a rule conforming to a predetermined condition. The selected modules form the sort-text generation module 310 shown in FIG. 21. An example of the predetermined condition is a condition specified by the user or a condition regarding an environment related the language used by the user (that is, in the case of a Japanese user, for example, an environment related to the Japanese language) in addition to an initial condition determined in advance.

If the definite-article omission module 180a and the reversed-conversion module 180c are selected as the sort-text generation module 310 shown in FIG. 21 from the modules stored in the module storage section 180 on the basis of the predetermined condition, for example, the sort-text generation section 182 generates sort texts 320a shown in the sort-text & metadata table 320 from respectively pieces of metadata 300a included in the metadata table 300 in accordance with the rules prescribed by both the definite-article omission module 18a and the reversed-conversion module 180c.

The sorting-execution section 184 is a unit for generating a sorted-metadata table 340 including a plurality of sorted pieces of metadata 300b associated with respectively a plurality of sorted texts 320b obtained as a result of sorting the sort texts 320a generated by the sort-text generation section 182 for the pieces of metadata 300a respectively.

The initials generation section 186 is a unit for recognizing the initial of each piece of metadata 300b and adding the recognized initial to the corresponding sorted piece of metadata 300b in order to create sorted pieces of metadata each having an initial added thereto.

For example, the initials generation section 186 uses the initials generation module 350 to generate initials 320c by recognizing the initial of each piece of metadata 300b included in the sorted-metadata table 340 and generate a sorted-metadata & initials table 360 by sorting the initials 320c and adding the sorted initials to the corresponding pieces of metadata 300b as shown in FIG. 22.

As an example, the initials generation section 186 recognizes an initial of 'ザ' for metadata of '坂本龍三' and adds the recognized initial 'ザ' to the corresponding sorted piece of metadata 300b in order to create sorted pieces of metadata 360 each having an initial added thereto. It is to be noted that, in addition to the first character, the initial to be added to the corresponding sorted piece of metadata 300b may include other characters following the first character. In the case of the metadata '坂本龍三'for example, the initial can be 'サカ' or 'サカモ'.

As a matter of fact, the initial does not have to be the first character. For example, the total number of characters included in a sorted piece of metadata or a specific character included in a sorted piece of metadata string can be used as the initial for the sorted piece of metadata. If the total number of characters included in a sorted piece of metadata is used as the initial for the sorted piece of metadata, the number 4 is used as the initial for the sorted piece of metadata '坂本太郎'.

If a specific character included in a sorted piece of metadata string is used as the initial for the sorted piece of metadata, the specific character string '太郎' can be used as the initial for the sorted piece of metadata '坂本太郎'. However, the specific character string '太郎' is also the initial for any sorted piece of metadata including the specific character string '太郎' at any position not limited to the head position. With a specific character in a sorted piece of metadata string used as the initial for the sorted piece of metadata, a content (or a piece of music) with the title (the song title) including a character string of 'クリスマス', '恋', '恋' or the like can be accessed in a short period of time.

It is to be noted that an initial can be generated as an initial satisfying one of the conditions for generating an initial as described above or as an initial satisfying a plurality of aforementioned conditions. If an initial is be generated as an initial satisfying the condition of being the first character, the condition of being the total character count and the condition of being a specific string characters, for example, the initial generated for the sorted piece of metadata '涙目がキラリ'will include the first character of '青山典子', the total character count of 4 and the specific character string of '太郎'.

The information output section 188 is a unit for displaying pieces of data generated in this way as the sorted pieces of metadata 360 each having an initial added thereto in an external apparatus such as the portable reproduction apparatus 20. As an alternative, the display section 190 displays the sorted pieces of metadata 360 each having an initial added thereto.

As described above, the information-processing apparatus 10 executes the functions of the functional blocks to sort pieces of metadata of contents on the basis of modules each prescribing a rule determined in advance and further adds an initial to each sorted piece of metadata corresponding to the initial.

It is to be noted that the information-processing apparatus 10 includes a CPU, a ROM, a RAM and an interface, which are not shown in FIGS. 19 to 22. The ROM the user and the nickname conversion module 180*e* conforming to the 'Attach pronunciations of nicknames' condition set by the user as the sort-text generation modules 310 shown in FIG. 24.

However, the sort-text generation section 182 follows rules for generating sort texts in conformity with the conditions set by the user in a rule order starting with a rule prescribed by the module stored in the module storage section 180 as a module with the highest priority level. Assume for example that, among the modules stored in the module storage section 180, the nickname conversion module 180*e* has a priority level higher than the reversed-conversion module 180*c*. In this case, the sort-text generation section 182 generates 'まりん' as a sort text from the '砂原良一' metadata in the metadata table 300 in accordance with a rule prescribed by the nickname conversion module 180*e* instead of generating 'すなはらりょういち' as a sort text in accordance with a rule prescribed by the reversed-conversion module 180*c*. By generating a sort text from each piece of metadata 300*a* in the metadata table 300 in accordance with a rule prescribed by a module with the highest priority level in this way, the sort-text generation section 182 is capable of creating a sort-text & metadata is a memory used for storing programs to be executed by the CPU for carrying out the functions of the functional blocks. That is to say, the CPU executes the programs stored in the ROM in order to carry out the functions of the functional blocks.

Examples of Changing the Order of Sorting Initials

The following description explains examples of dynamically changing the order of sorted texts and sorted initials in accordance with a condition set by the user as a condition regarding the function carried out by the information-processing apparatus 10 to sort initials.

In the information-processing apparatus 10 implementing the examples of dynamically changing the order of sorted texts and sorted initials, the user sets a condition for automatically generating sort texts and the sorting order of initials of the pieces of metadata in advance. In an environment where the user uses the Japanese language, the user sets a condition for automatically generating sort texts by selecting items shown a Japanese-version screen shown in FIG. 23 as a screen for setting a condition for automatically generating sort texts, and sets a sorting order of initials of the pieces of metadata by selecting an item from those shown on the Japanese-version screen also used for setting a sorting order of initials.

(Sort-Text Dynamic Generation According to User Setting)

First of all, the user sets a condition for automatically generating sort texts. In the case of an example shown in FIG. 23, the user 'Attach hiragana pronunciations', 'Attach pronunciations of nicknames', 'Omit definite articles of English' and 'Omit hiragana definite articles (or the '青山典子'articles)' as conditions for automatic generation of sort texts.

Figure 24:
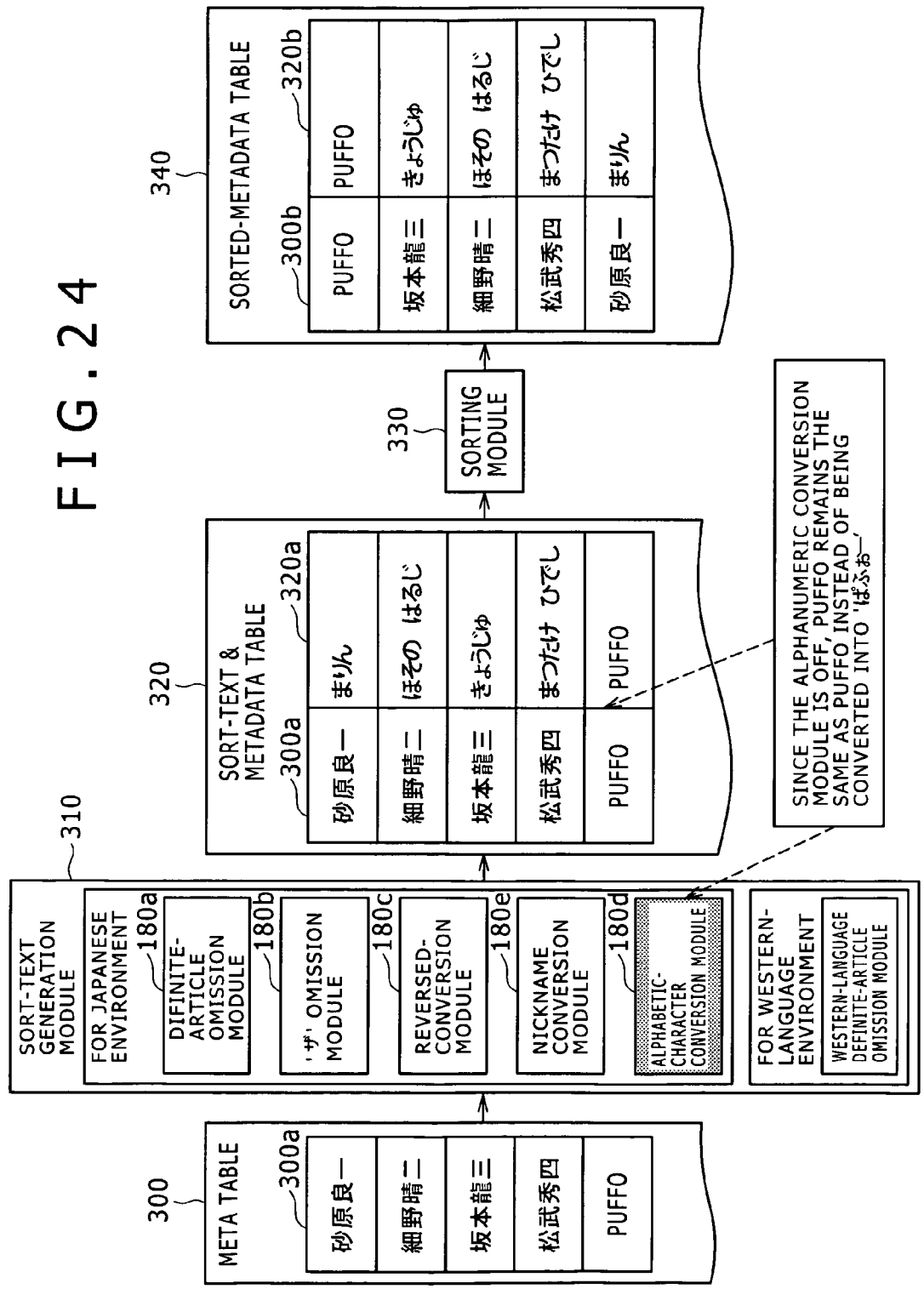
FIG. 24 is an explanatory diagram referred to in description of operations to dynamically generate a source text in accordance with user setting according to the embodiment.

Accepting the conditions set by the user, the sort-text generation section 182 selects one or more modules from a plurality of modules stored in the module storage section 180 as one or more modules each prescribing a rule conforming to the conditions specified by the user. FIG. 24 is an explanatory diagram referred to in description of a process to dynamically sort texts in accordance with conditions set by the user. The sort-text generation section 182 selects the definite-article omission module 180*a* conforming to the 'Omit definite articles of English' condition set by the user, the '青山典子' omission module 180*b* conforming to the 'Omit hiragana definite articles (or the '青山典子'articles)' condition set by the user, the reversed-conversion module 180*c* conforming to the 'Attach hiragana pronunciations' condition set by table 320 showing sort texts 320*a*.

It is to be noted that, in the example, the alphabetic-character conversion module 180*d* is not selected. As a result, metadata of 'PUFFO' is not converted into hiragana characters, but remains as it is and is output as a sorted text of 'PUFFO'.

Let us refer back to FIG. 23 showing the Japanese-version screen for setting conditions and a sorting order of initials in the following description explaining a method adopted for the user to select a sorting order of initials in pieces of metadata. The user sets a sorting order of initials in pieces of metadata by selecting an item displayed on the screen for setting a sorting order of initials. In this example, for users of western music, initials in pieces of metadata can be sorted in an 'ABC - - - /numbers/「あ to ん」 and others' order in order to rearrange the pieces of metadata. For users of domestic music, on the other hand, initials in pieces of metadata can be sorted in an 'あrow, か row, - - - , numbers, [A to Z] and others' order in order to rearrange the pieces of metadata.

Let us assume that the user selects the sorting order provided for users of western music. In this case, as shown in FIG. 24, the sorting-execution section 184 sort pieces of metadata in the sort-text & metadata table 320 in accordance with 'ABC - - - /numbers/「あto ん」 and others' order conforming to the rule prescribed by the sort module 330 for users of western music in order to generate a sorted-metadata table 340 showing sorted pieces of metadata. As a result, the sorted-metadata table 340 shows pieces of metadata 300b sorted in the order of 'あいうえお' following a first alphabetic-character string of 'PUFFO'.

FIG. 25 is a diagram showing that initials-sorting orders can be set for different character types used in a variety of language environments used by the user. In accordance with the table shown in the figure, in the case of a Japanese-language environment or in a Japanese-language mode, the types of characters that can be sorted in an initials-sorting order include numbers & symbols, alphabetic characters, Japanese (pronunciation) characters and others. In the case of a Korean-language environment or in a Korean-language mode, the types of characters that can be sorted in an initials-sorting order include Hangul characters, Korean kanji characters (pronunciations), numbers & symbols, alphabetic characters and others. In the case of a Chinese-language environment or in a Chinese-language mode, the types of characters that can be sorted in an initials-sorting order include numbers & symbols, alphabetic characters & kantai & hantai (pronunciations) and others. In the case of an English/French/German/Italian/Spanish language environment or in an alphabetic-character mode, the types of characters that can be sorted in an initials-sorting order include numbers & symbols, alphabetic characters and others. In the case of a Russian-language environment or in a Russian-language mode, the types of characters that can be sorted in an initials-sorting order include numbers & symbols, alphabetic characters, Cyrillic letters and others.

The user may set an initials-sorting order at an initial setting time or dynamically at any arbitrary time. In addition, the user may further change a default initials-sorting order automatically determined for the language environment of the user.

Figure 26:
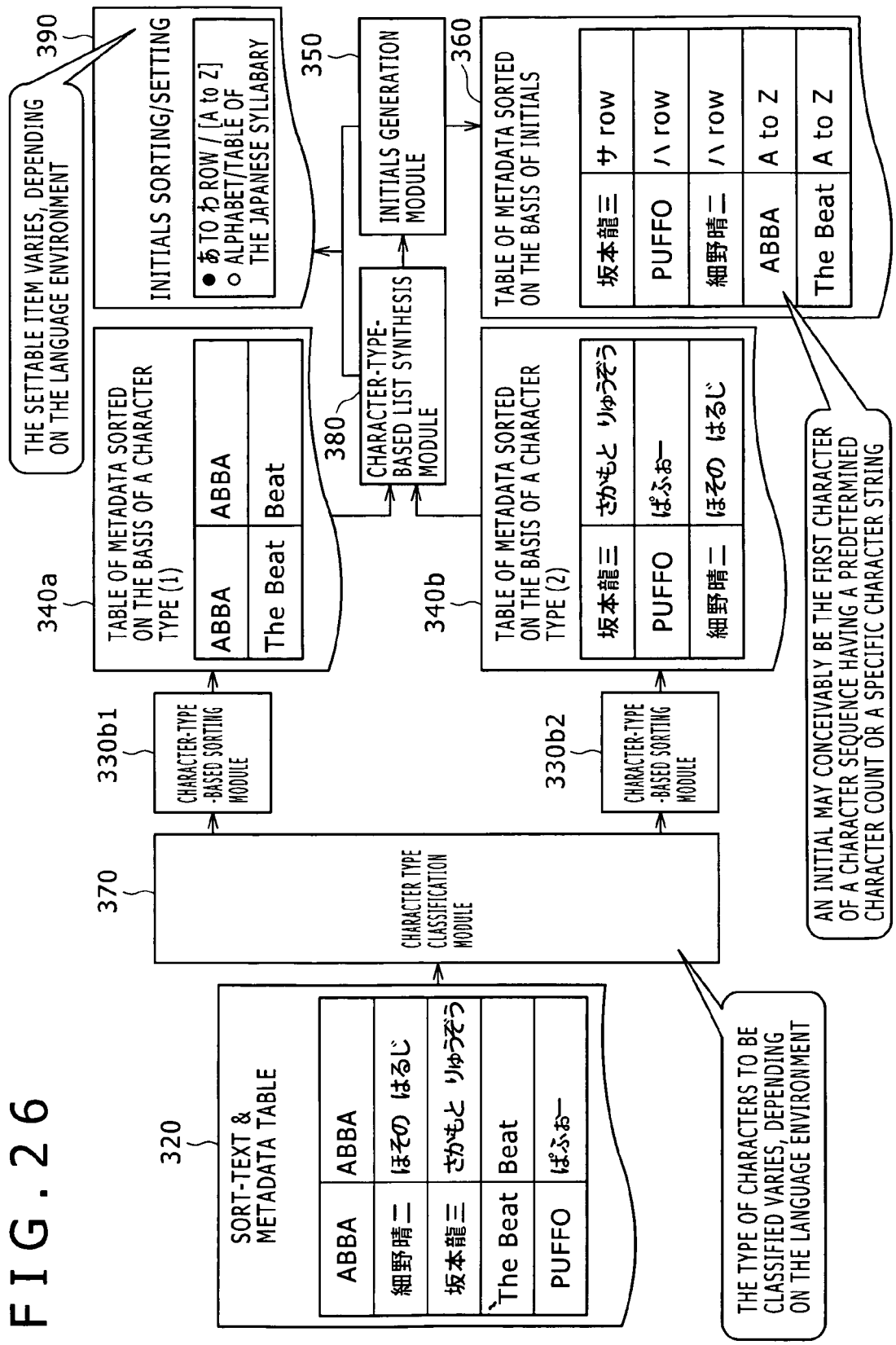
FIG. 26 is an explanatory diagram referred to in description of operations to dynamically sort initials in accordance with user setting according to the embodiment.

It is to be noted that, if metadata is composed of characters of two or more different types as shown in FIG. 26, the sorting-execution section 184 uses a character-type classification module 180j to split the metadata into as many groups of pieces of meta data as the different character types. In an example shown in the figure, the different character types are the Japanese characters and the alphabetic characters. Thus, the metadata is split into a first group of the alphabetic-character type and a second group of the Japanese-character type. Then, the sorting-execution section 184 uses a character-type-based sorting module 330b1 for sorting the pieces of metadata pertaining to the first group and a character-type-based sorting module 330b2 for sorting the pieces of metadata pertaining to the second group to generate respectively character-type-specific sorted metadata 340a composed of sorted pieces of metadata of the alphabetic characters and character-type-specific sorted metadata 340b composed of sorted pieces of metadata of the Japanese characters. Later on, the sorting-execution section 184 uses a character-type-based list synthesizing module 380 to synthesize the character-type-specific sorted metadata 340a with the character-type-specific sorted metadata 340b.

(Dynamically Setting an Initials-Sorting Order in Accordance with a User Input)

Next, a method of setting an initials-sorting order in accordance with a user input for different types of character is explained. FIG. 27 is a diagram showing initials sorting orders that can be set for different character types provided by the embodiment. As shown in the figure, an initials sorting order that can be set as a basic sorting rule varies in accordance with the language environment and/or the character type used in the environment. If the type of character is the alphabetic characters, for example, the user can set an alphabetical sorting order or an 'upper-case character lower-case character' sorting order as a basic rule for sorting the alphabetic-character initials A, B, C, - - - and Z.

If the type of character is numbers & symbols, the user is allowed to set a 'numbers (sorted in a character-code sorting order)→symbols (sorted in character-code sorting order)' sorting order as a basic rule for sorting numbers such as 5 and symbols such as #.

If the type of character is the Hangul characters, the user is allowed to set a dictionary sorting order (=a character-code sorting order) as a basic rule for sorting the Hangul-consonant initials and the Korean kanji initials.

If the type of character is the Japanese characters, the user is allowed to set a Japanese syllabary sorting order, a hiragana→katakana sorting order, a normal→syllabic nasal voiced consonant→p-sound in the syllabary sorting order or a character-code sorting order as a basic rule for sorting initials pertaining to the あrow, かrow, - - - and kanji characters.

If the type of character is the alphabetic characters & kantai & hantai (alphabetic characters pronunciations), the user is allowed to set an alphabetic character A, Chinese A, alphabetic character B, Chinese B, - - - alphabetic character Z, Chinese Z sorting order, a sorting order serving as the same rule as the alphabetic-character character type or a character-code sorting order as a basic rule for sorting initials of A, B, C, Z, kantai characters and hantai characters.

If the type of character is the Cyrillic letters, the user is allowed to set a Cyrillic-character sorting order, an upper-case character→lower-case character order or a character-code sorting order as a basic rule for sorting Cyrillic-character initials.

It is to be noted that if the type of character is other than the character types described above, the user is allowed to set a character-code sorting order as a basic rule for sorting initials of the others type of character.

On the basis of a basic sorting rule set in accordance with a character type used in a language environment as described above, an item in initial-sorting setting 390 shown in FIG. 26 is dynamically selected. Then, on the basis of the selected item of the initial-sorting setting 390, the sorting-execution section 184 arranges synthesized sorted pieces of metadata in order to generate sorted pieces of metadata.

Subsequently, the initials generation section 186 uses the initials generation module 350 in order to generate an initial of every piece of metadata included in the sorted pieces of metadata. Then, the initials generation section 186 adds the generated initials to their respective sorted pieces of metadata in order to generate sorted pieces of metadata 360 each having an initial added thereto.

In an example shown in FIG. 26, the user selects the あ to わ rows and A to Z sorting order of the initial-sorting setting 390 as a sorting rule. In this case, on the basis of the sorting rule selected by the user, the initials generation section 186, first of all, sorts the initials of the synthesized sorted pieces of metadata in the あto わrows sorting order and then arranges remaining initials in the A to Z sorting order in order to generate the sorted pieces of metadata 360 each having an initial added thereto.

The functions executed by the information-processing apparatus 10 to sort initials have been described so far by referring to FIGS. 19 to 27. Let us keep in mind that it is also possible to provide a configuration wherein other apparatus such as the portable reproduction apparatus 20 has some or all of the functions to sort initials as well.

<Types of Content-Title Search/Display Table>

Next, typical concrete content-title search/display tables 15 according to the embodiment are explained by referring to FIGS. 28A to 28M.

A plurality of content-title search/display tables 15 are tables each having a layer structure of content attributes and corresponding to a plurality of display screens, which are to be displayed sequentially on the display section 250 during a process to search for contents in the portable reproduction apparatus 20, on a one-to-one basis. There are as many content-title search/display tables 15 as methods of searching for a content in the portable reproduction apparatus 20. Typical methods of searching for a content, which is typically a piece of music, include a method using the name of an artist associated with the piece of music as a search key and a method using the genre of the piece of music as a search key. The following description explains the structure of each of the content-title search/display tables 15 and data shown in the tables 15.

It is to be noted that, in the following description, the artist associated with a content, which is typically a piece of music, represents the singer of the piece of music, the performer of the piece of music, the song creator of the piece of music, the libretto writer of the piece of music, an arranger of the piece of music and a producer of the piece of music. An album of a specific content is a collection of contents including the specific contents. The title of a musical content is a title assigned to the content. The track of a content is a technical term used to refer to the content in an album. A track number of a content in an album is a sequence number assigned to a track, which is the content. The genre of a musical content is a musical field to which the content pertains.

(A. Album-Classified Search/Display Table)

Figure 28A:
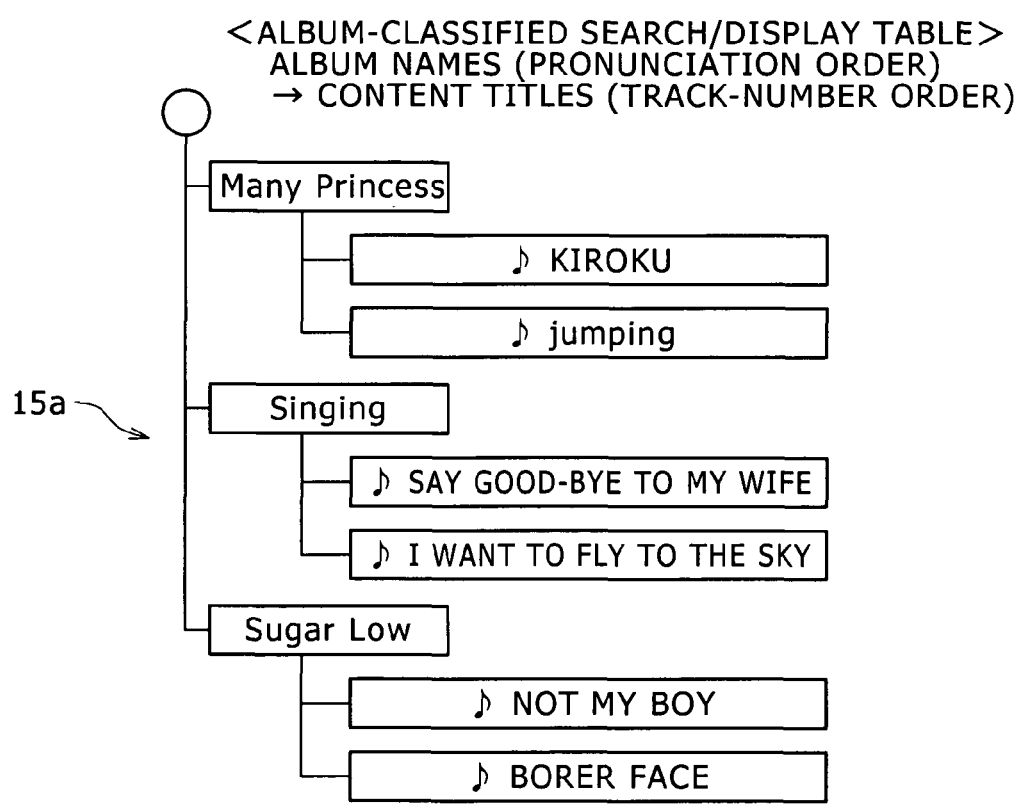
FIG. 28A is an explanatory diagram showing the data structure of an album-classified search/display table according to the embodiment.

FIG. 28A is an explanatory diagram showing the data structure of an album-classified search/display table 15a according to the embodiment. Content attributes shown in the album-classified search/display table 15a are album titles each serving as a group name representing the name of an album used as a collection of contents and content titles each serving as the title of a content.

The album-classified search/display table 15a has a two-layer structure including an album layer serving as a high-level layer and a content layer serving as a low-level layer. On the album layer, album names are arranged in a pronunciation order in a process to sort initials. In the case of an example shown in the figure, album names of 'Many Princess', 'Singing' and 'Sugar Low' are sorted in the alphabetical order of the initials of character strings each composing one of the album names to result in a sequence of 'Many Princess'→'Singing'→'Sugar Low'. In this case, the alphabetical order of initials starts with the alphabetically earliest initial among the initials. The first character in a first string of characters may be the same as the first character in a second string of characters. In this case, the character strings are sorted on the basis of their next characters, which are the second characters following the first characters. For example, the first character of the album name 'Singing' and the first character of the album name 'Sugar Low' are both the character S. In this case, the album name 'Singing' and the album name 'Sugar Low' are sorted on the basis of their second characters, which are the characters i and u respectively. Since the character i is alphabetically earlier than the character u (i<u), in a sequence obtained as a result of the sorting process, the album name 'Singing' precedes the album name 'Sugar Low'. On the content layer, for each of the album names, content titles pertaining to an album identified by the album name are arranged in a track-number order.

As described above, on the content layer, for each of the album names, the titles of contents pertaining to an album identified by the album name are arranged in a track-number order (or in a process to sort the initials of the content titles). For example, the titles of contents pertaining to an album identified by the name of 'Many Princess' are sorted to result in a sequence of content titles of 'キロク'→'jumping' in a process to short the titles of the contents in a track-number order set in the album.

The album-classified search/display table 15a having the data structure described above is used in an endeavor to search for a content (or a piece of music) by using the album name as a search key. In this case, since the names of albums are displayed in an order of the pronunciations of the album names, the user enjoys convenience of easiness of an endeavor to search for a desired album. In addition, since the titles of contents pertaining to each album are displayed in a track-number order set in the album, the display offers convenience to a user taking the album as a search key.

(B. Artist-Classified Search/Display Table)

Figure 28B:
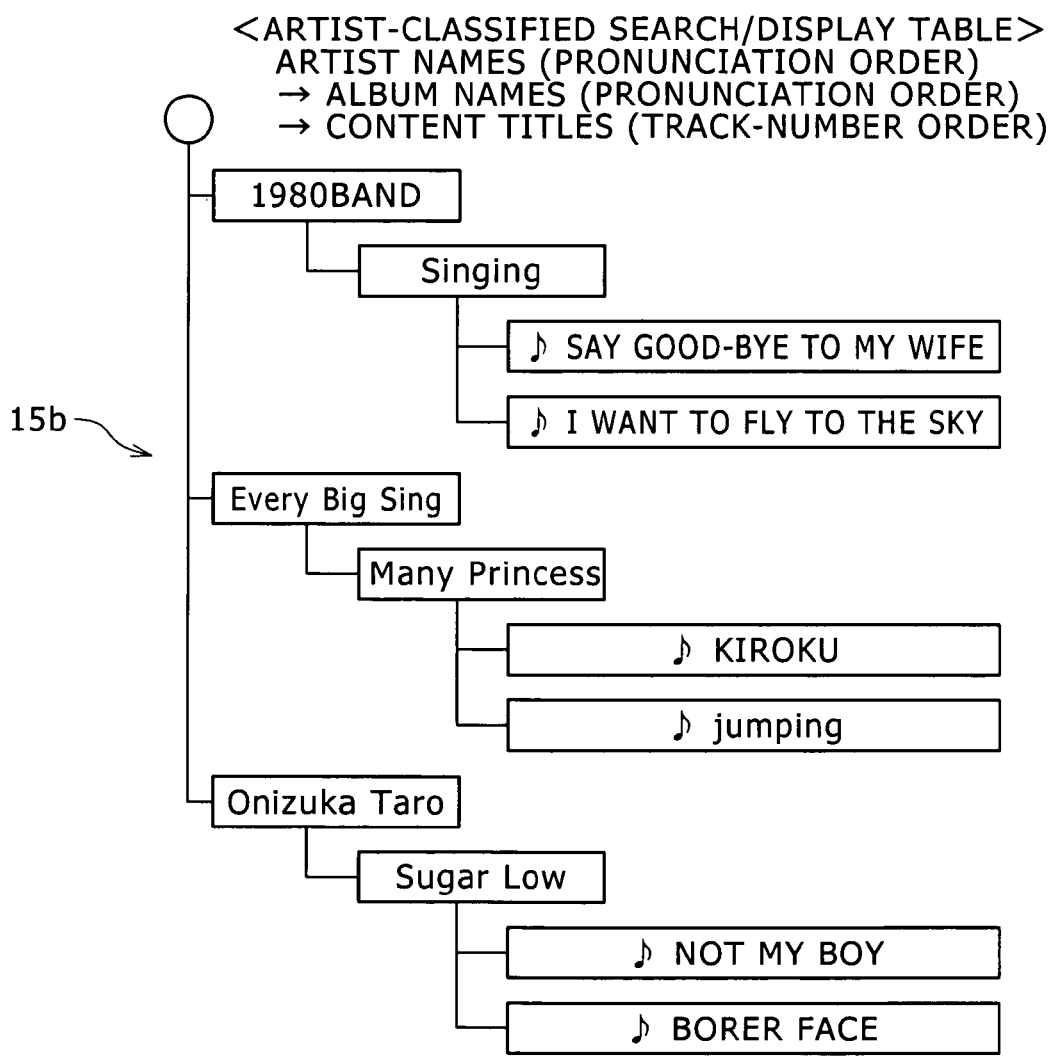
FIG. 28B is an explanatory diagram showing the data structure of an artist-classified search/display table according to the embodiment.

FIG. 28B is an explanatory diagram showing the data structure of an artist-classified search/display table 15b according to the embodiment. Content attributes shown in the artist-classified search/display table 15b are artist names each serving as a group name representing the name of an artist associated with a content, album names each serving as a group name representing the name of an album used as a collection of contents and content titles each serving as the title of a content.

The artist-classified search/display table 15b has a three-layer structure including an artist layer serving as a highest-level layer, an album layer serving as a middle-level layer and a content layer serving as a lowest-level layer.

On the artist layer, artist names are arranged in a pronunciation order in a process to sort initials. In the case of an example shown in the figure, artist names of '1980 BAND', 'Every Big Sing' and '鬼塚太郎'are sorted in the pronunciation order to result in a sequence of '1980 BAND'→'Every Big Sing'→'鬼塚太郎'.

On the album layer, for each of the artist-name groups, album names pertaining to the artist-name group are arranged in a pronunciation order in a process to sort the initials of the album names. On the content layer, for each of the album names, the titles of contents pertaining to an album identified by the album name are arranged in a track-number order.

The artist-classified search/display table 15b having the data structure described above is used in a first endeavor to search for the name of an album by using the artist name as a search key and a second endeavor to further search for the title of a content (or a piece of music) by using the album name found in the first endeavor as a search key. In this case, since the names of artists are displayed in an order of the pronunciations of the artist names and the names of albums are displayed in an order of the pronunciations of the album names, the user enjoys convenience of easiness of endeavors to search for a desired artist and a desired album.

(C. Genre-Classified Search/Display Table)

Figure 28C:
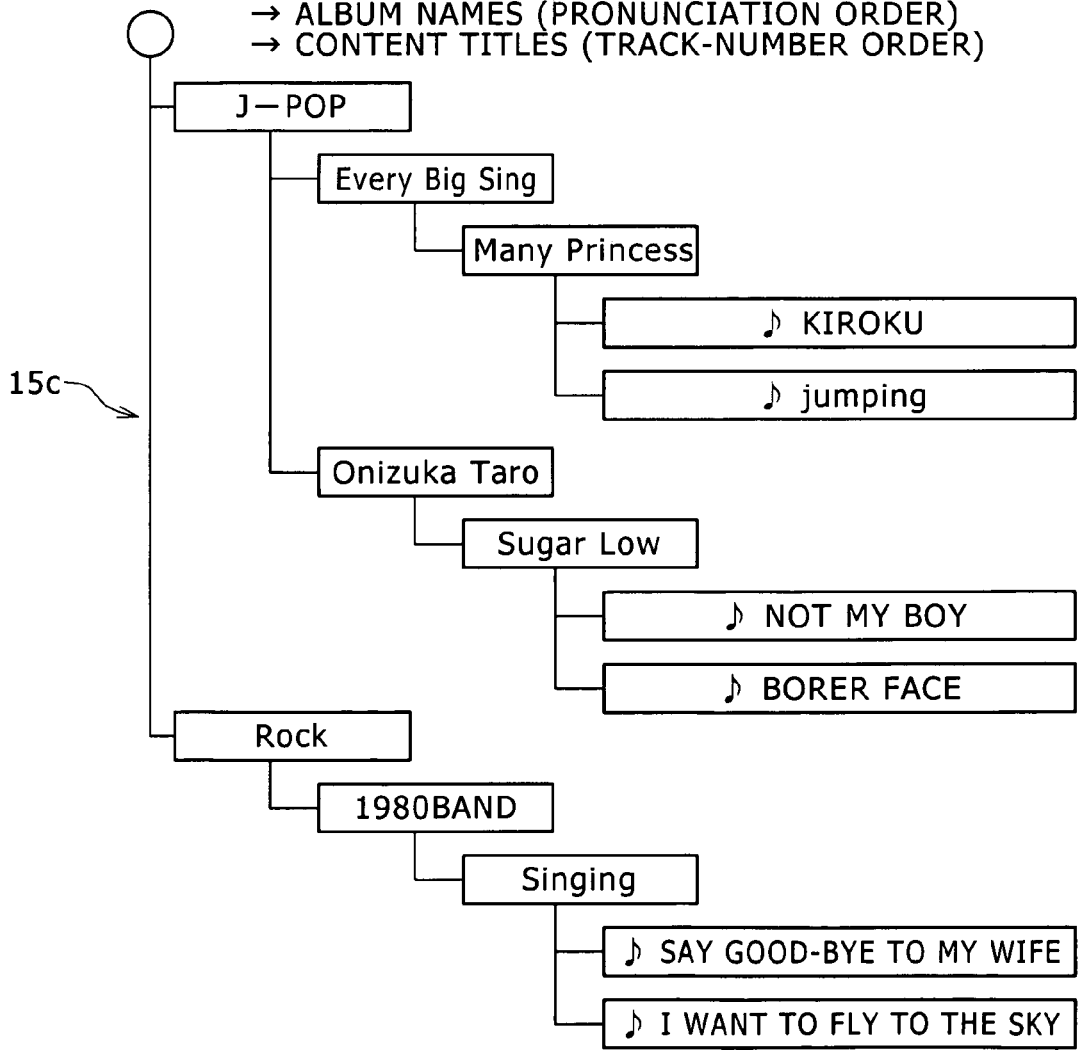
FIG. 28C is an explanatory diagram showing the data structure of a genre-classified search/display table according to the embodiment.

FIG. 28C is an explanatory diagram showing the data structure of a genre-classified search/display table 15c according to the embodiment. Content attributes shown in the genre-classified search/display table 15c are genre names each serving as a group name representing the genre of contents, artist names each serving as a group name representing the name of an artist associated with a content, album names each serving as a group name representing the name of an album used as a collection of contents and content titles each serving as the title of a content.

The genre-classified search/display table 15c has a four-layer structure including a genre layer serving as the highest-level layer, an artist layer serving as a second high-level layer, an album layer serving as a third high-level layer and a content layer serving as the lowest-level layer.

On the genre layer, musical genres of J-POP, Rock and Jazz are sorted in a character-code order. In an example shown in the figure, genres are sorted in a character-code order to result in a sequence of J-POP ☐ Rock. On the artist layer, for each of the genre groups, artist names pertaining to the genre group are arranged in a pronunciation order in a process to sort the initials of the artist names. On the album layer, for each of the artist-name groups, album names pertaining to the artist-name group are arranged in a pronunciation order in a process to sort the initials of the album names. On the content layer, for each of the album names, the titles of contents pertaining to an album identified by the album name are arranged in a track-number order.

The genre-classified search/display table 15c having the data structure described above is used in a first endeavor to search for the name of an artist by using the genre as a search key, a second endeavor to further search for the name of an album by using the artist name found in the first endeavor as a search key and a third endeavor to further search for the title of a content (or a piece of music) by using the album name found in the second endeavor as a search key. In this case, since the names of artists are displayed in an order of the pronunciations of the artist names and the names of albums are displayed in an order of the pronunciations of the album names, the user enjoys convenience of easiness of endeavors to search for a desired artist and a desired album. In addition, since the number of genres is small, the process to sort genres in the order of their initials is not required. Thus, in the above example, musical genres are sorted in a character-code order. However, the scope of the present invention is by no means limited to this embodiment. That is to say, musical genres can also be sorted in the order of their initials.

As a modified version of the genre-classified search/display table 15c, the artist layer, the album layer or both the layers can be eliminated to generate a content-title search/display table 15 of another type.

For example, it is possible to create a genre-classified all-contents (all musical contents) search/display table including only the genre layer serving as the high-level layer and the content layer serving as the low-level layer. On the content layer of the genre-classified all-contents (all musical contents) search/display table, for each genre group, the titles of contents are sorted typically in the pronunciation order of the titles of the contents in the genre group, an order of decreasing evaluation values of the contents in the genre group, a chronological order of dates/times of addition of the contents in the genre group to the portable reproduction apparatus 20, an order defined by the user, a reproduced order of the contents, an order of character codes of in the genre group or another order. Applications of the genre-classified all-contents (all musical contents) search/display table are by no means limited to an endeavor to search for a desired content. For example, the genre-classified all-contents (all musical contents) search/display table can also be applied to a process to create a playlist including only contents pertaining to a genre group.

(D. Initial-Classified All-Content Search/Display Table)

Figure 28D:
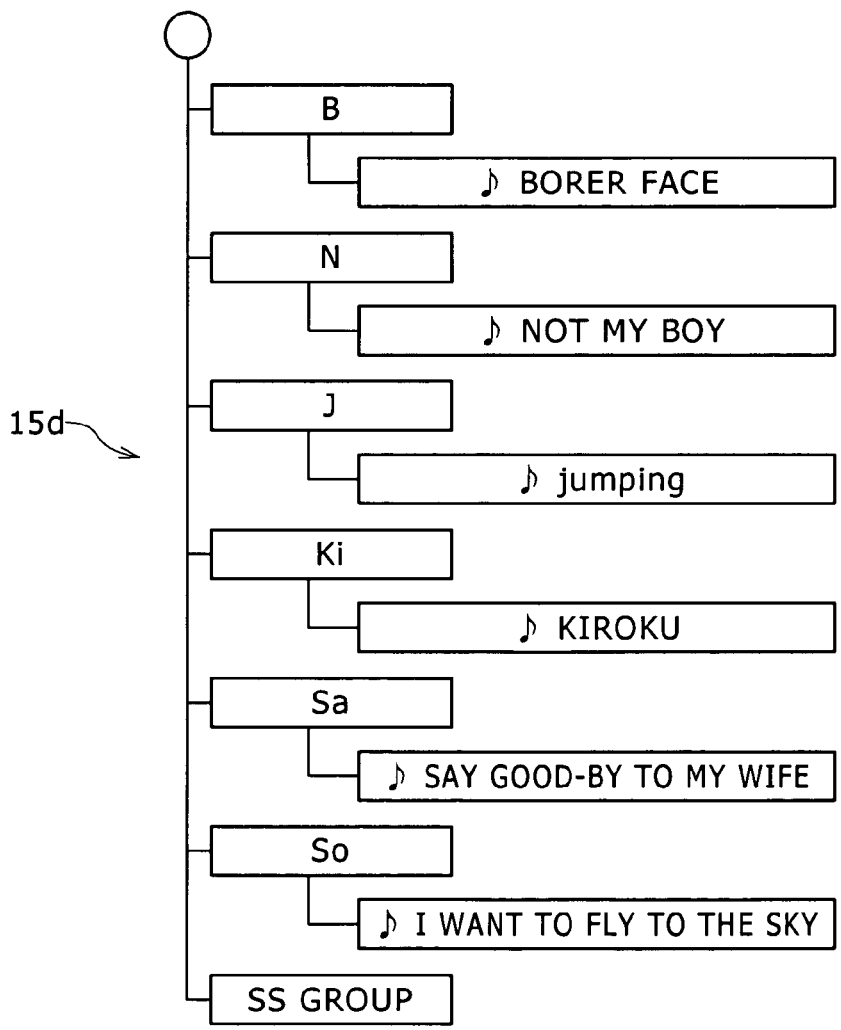
FIG. 28D is an explanatory diagram showing the data structure of an initial-classified all-content search/display table according to the embodiment.

FIG. 28D is an explanatory diagram showing the data structure of an initial-classified all-content search/display table 15d according to the embodiment. Content attributes shown in the initial-classified all-content search/display table 15d are initials each serving as a group name and content titles each serving as the title of a content. It is to be noted that, in this case, an initial is the first character of the title of a content. For more information on initials, the reader is suggested to refer to FIG. 22.

The initial-classified all-content search/display table 15d has a two-layer structure including an initial layer serving as a high-level layer and a content layer serving as a low-level layer. On the initial layer, initials of content titles are arranged in the order of initials. In an example shown in the figure, initials of content titles are sorted in the alphabetical order and the syllabary order to result in a sequence of B, N, J, K, キ, サ and ソ. On the content layer, for each of the initials, content titles each having the initial as the first character are sorted in the pronunciation order in a process to sort the initials of the content titles.

The initial-classified all-content search/display table 15d having the data structure described above is used in an endeavor to search for a content (or a piece of music) by using the initial of the title of the content as a search key. In this case, for each of the initials, a plurality of content titles each having the initial as the first character are sorted in the pronunciation order. Thus, the user enjoys convenience of easiness of an endeavor to search for a desired content (or a piece of music). In addition, since the user is capable of directly searching the screen for a desired content (or a piece of music) without using the name of an artist and the name of an album as a search key, the user enjoys convenience of the simplicity of the endeavor to search for a content (or a piece of music). On top of that, if the title of a desired content (or a piece of music) is known, the content can be searched for in a short period of time.

(E. Artist-Initial-Classified Search/Display Table)

Figure 28E:
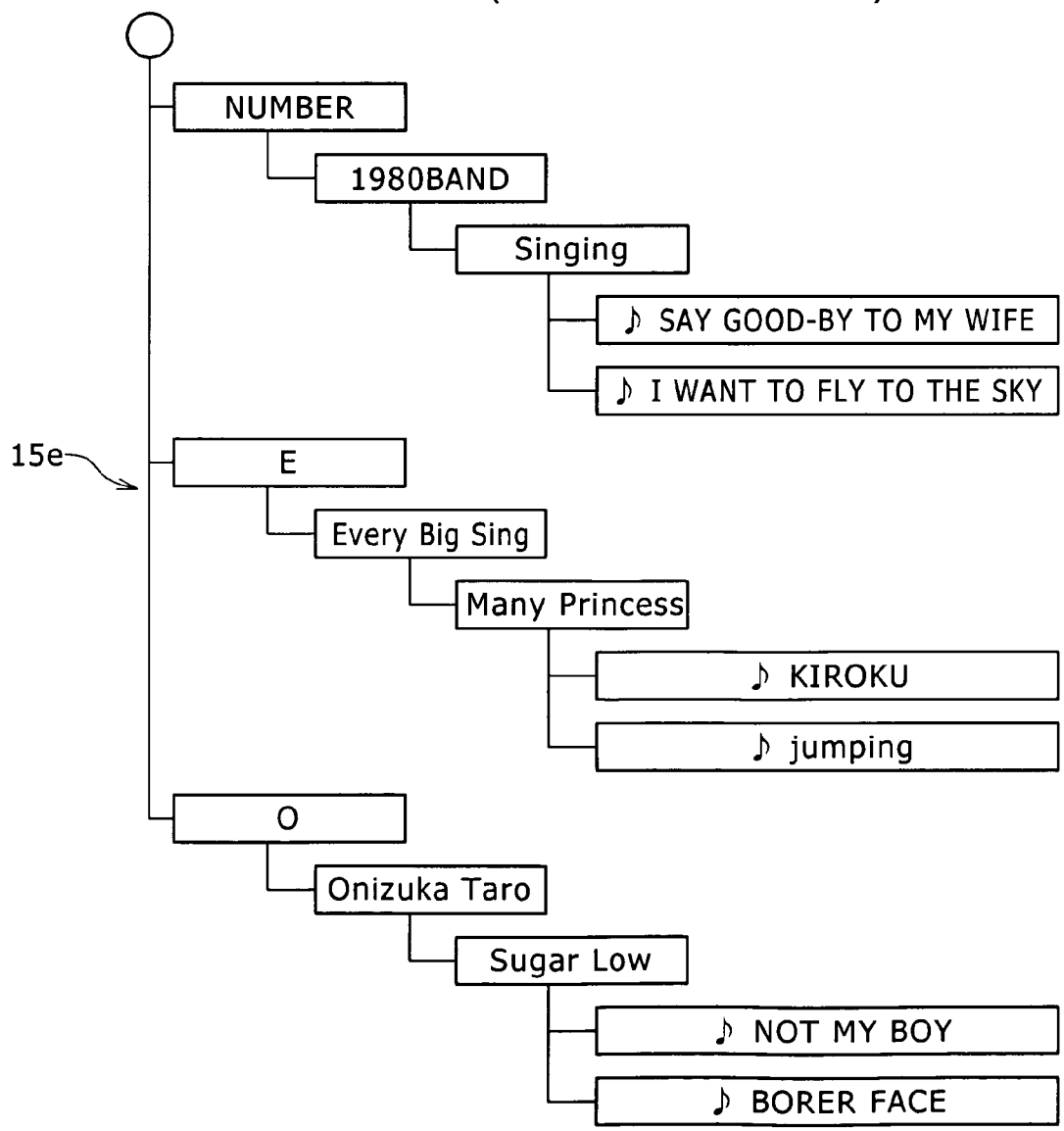
FIG. 28E is an explanatory diagram showing the data structure of an artist-initial-classified search/display table according to the embodiment.

FIG. 28E is an explanatory diagram showing the data structure of an artist-initial-classified search/display table according to the embodiment. Content attributes shown in the artist-initial-classified search/display table 15e are artist-name initials each serving as a group name, artist names each serving as a group name, album names each serving as a group name and content titles each serving as the title of a content.

The artist-initial-classified search/display table 15e has a four-layer structure including an artist-name-initial layer serving as the highest-level layer, an artist layer serving as a second high-level layer, an album layer serving as a third high-level layer and a content layer serving as the lowest-level layer.

On the artist-name-initial layer, the first characters of artist names are sorted in an order of initials. On the artist layer, for each of the artist-name initials, artist names each having the initial as its first character are arranged in a pronunciation order in a process to sort the initials of the artist names. On the album layer, for each of the artist-name groups, album names pertaining to the artist-name group are arranged in a pronunciation order in a process to sort the initials of the album names. On the content layer, for each of the album names, the titles of contents pertaining to an album identified by the album name are arranged in a track-number order.

The artist-initial-classified search/display table 15e having the data structure described above is used in a first endeavor to search for the name of an artist by using the initial of the artist name as a search key, a second endeavor to further search for the name of an album by using the artist name found in the first endeavor as a search key and a third endeavor to further search for the title of a content (or a piece of music) by using the album name found in the second endeavor as a search key. In this case, by merely entering the initial of an artist name, only artist names each having the initial as its first character are displayed, providing convenience to the user. Thereafter, since the names of artists are displayed in an order of the pronunciations of the artist names and the names of albums are displayed in an order of the pronunciations of the album names, the user enjoys convenience of easiness of endeavors to search for a desired artist and a desired album.

(F. Album-Initial-Classified Search/Display Table)

Figure 28F:
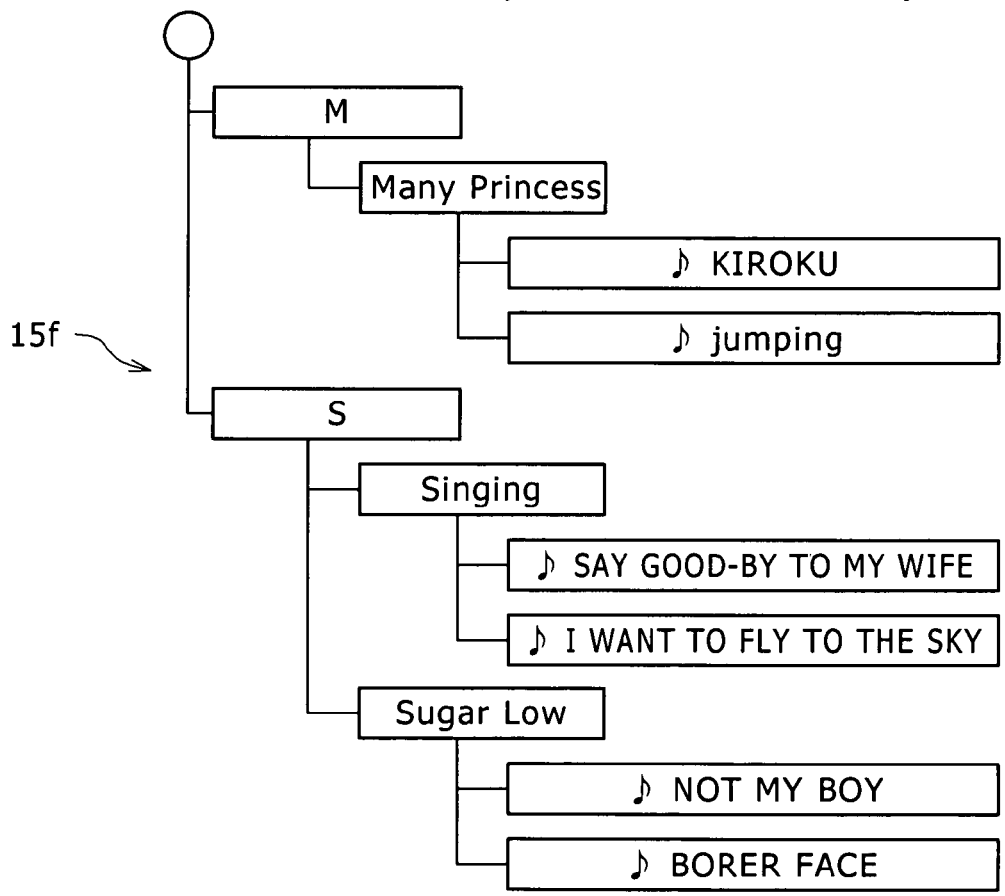
FIG. 28F is an explanatory diagram showing the data structure of an album-initial-classified search/display table according to the embodiment.

FIG. 28F is an explanatory diagram showing the data structure of an album-initial-classified search/display table according to the embodiment. Content attributes shown in the album-initial-classified search/display table 15f are initials each serving as a group name, album names each serving as a group name and content titles each serving as the title of a content.

The album-initial-classified search/display table 15f has a three-layer structure including an album-name initial layer serving as the highest-level layer, an album layer serving as a middle-level layer and a content layer serving as the lowest-level layer.

On the album-name initial layer, the characters are sorted in alphabetic order. On the album layer, for each of the album-name initials, album names each having the initial as its first character are arranged in a pronunciation order in a process to sort the initials of the album names. On the content layer, for each of the album names, the titles of contents pertaining to an album identified by the album name are arranged in a track-number order.

The album-initial-classified search/display table 15f having the data structure described above is used in a first endeavor to search for the name of an album by using the initial of the album name as a search key and a second endeavor to further search for the title of a content (or a piece of music) by using the album name found in the first endeavor as a search key. In this case, by merely entering the initial of an album name, only album titles each having the initial as its first character are displayed, providing convenience to the user. Thereafter, since the names of albums are displayed in an order of the pronunciations of the album names, the user enjoys convenience of easiness of an endeavor to search for a desired album.

(G. Rating-Classified Search/Display Table)

Figure 28G:
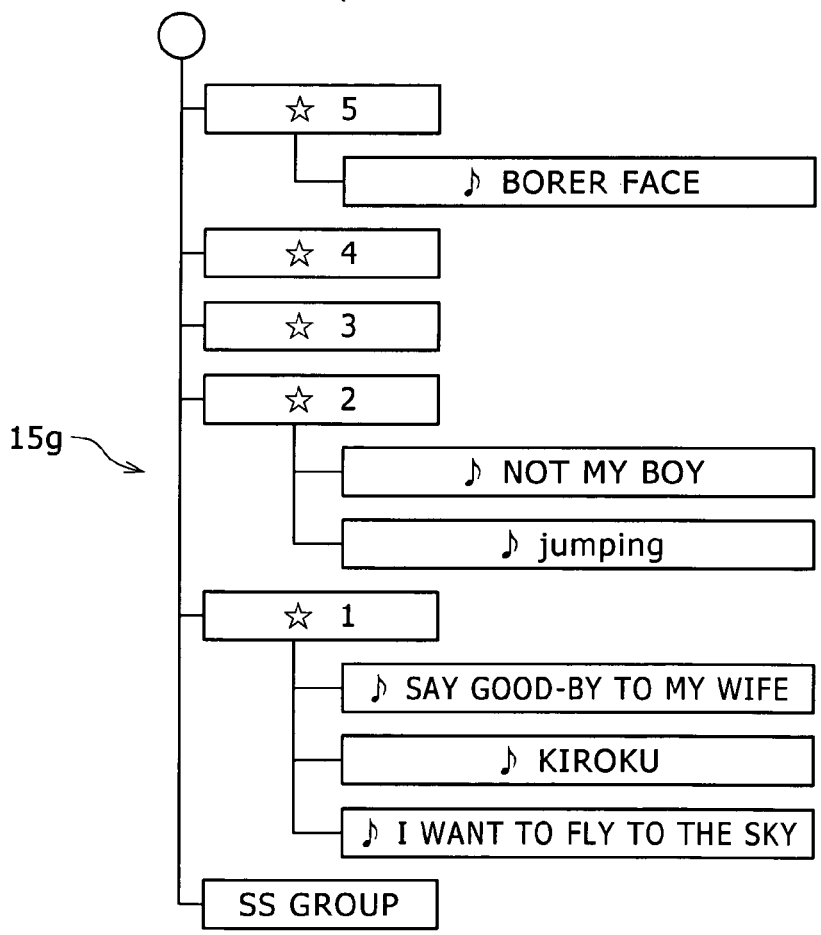
FIG. 28G is an explanatory diagram showing the data structure of a rating-classified search/display table according to the embodiment.

FIG. 28G is an explanatory diagram showing the data structure of a rating-classified search/display table 15g according to the embodiment. Content attributes shown in the rating-classified search/display table 15g are evaluation value levels each serving as a group name and content titles each serving as the title of a content. It is to be noted that the evaluation value levels each represent one of the following five grades of evaluation values P, where notation P denotes the evaluation value:

Evaluation value level of 1 represents P≦1
Evaluation value level of 2 represents 1<P≦2
Evaluation value level of 3 represents 2<P≦3
Evaluation value level of 4 represents 3<P≦4
Evaluation value level of 5 represents 4<P≦5

It is to be noted that the evaluation value can be the computed evaluation value, the input evaluation value or the average of the computed and input evaluation values.

The rating-classified search/display table 15g has a two-layer structure including an evaluation-value-level layer serving as the high-level layer and a content layer serving as the low-level layer. On the evaluation-value-level layer, the evaluation-value levels are sorted in an order of decreasing evaluation-value levels. On the content layer, for each of the evaluation-value levels, the titles of contents each having an evaluation value including in a grade represented by the evaluation-value level are arranged in an order of decreasing reproduction counts of the contents or an order of decreasing evaluation values given to the contents. It is to be noted that the number of reproductions for a content can be determined on the basis of a result of analyzing event logs of the content or reproduction histories of the content.

The rating-classified search/display table 15g having the data structure described above is used in an endeavor to search for the title of a content by using the evaluation value level as a search key. In this case, since the titles of contents are displayed in an order of decreasing reproduction counts of the contents or an order of decreasing evaluation values given to the contents, the user can enjoy the convenience of easiness and high speed of an endeavor to search for a desired content, which can be typically a content listened to frequently or a content recommended by a provider of the content distribution service, that is, a content having a high evaluation value given thereto in advance.

(H. Release-Year-Classified Title Search/Display Table)

FIG. 28H is an explanatory diagram showing the data structure of a release-rear-classified search/display table 15h according to the embodiment. Content attributes shown in the release-year-classified search/display table 15h are release years each serving as a group name, artist names each serving as a group name and content titles each serving as the title of a content. It is to be noted that, even though the release years are each a period of a year, a year of release can be expressed in terms of decade units, half-year units, month units or other time-period units.

The release-year-classified search/display table 15h has a three-layer structure including a release-year layer serving as the highest-level layer, an artist-name layer serving as a middle-level layer and a content layer serving as the lowest-level layer.

On the release-year layer, years of release are sorted in the chronological order starting with the earliest year. On the artist layer, for each of the years of release, the names of artists each having musical contents released in the year of release are arranged in a pronunciation order in a process to sort the initials of the artist names. On the content layer, for each of the artist names, the titles of musical contents associated with an artist identified by the artist name are arranged in a pronunciation order in a process to sort the initials of the content titles.

The release-year-classified search/display table 15h having the data structure described above is used in a first endeavor to search for the name of an artist by using the year of release as a search key and a second endeavor to search for the title of a content (or a piece of music) by using the artist name found in the first endeavor as a search key. In this case, since the titles of contents are displayed in a table of content titles classified by artist name and artist names are classified by year of release, the user can enjoy the convenience of easiness and high speed of endeavors to search for a popular content for every year of release.

(I. Transfer-Period-Classified Search/Display Table)

Figure 28I:
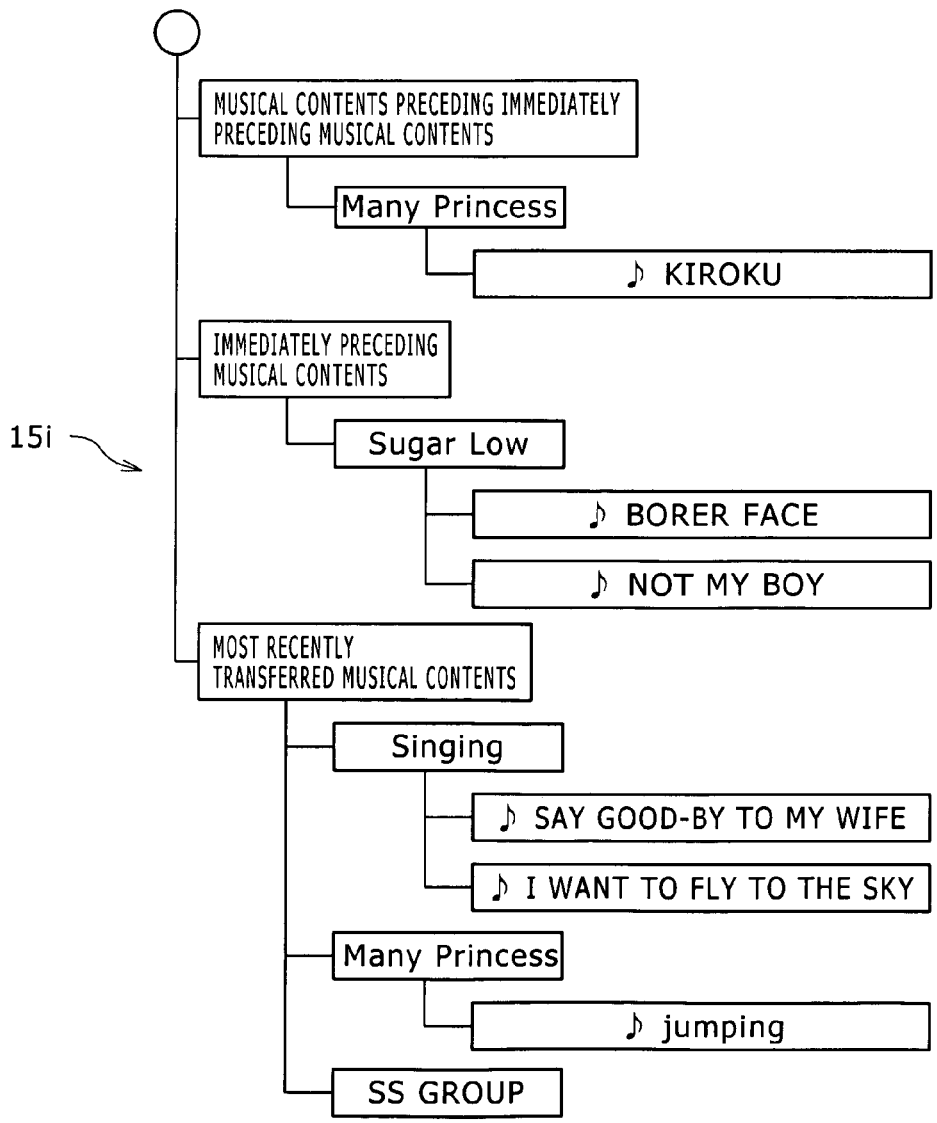
FIG. 28I is an explanatory diagram showing the data structure of a transfer-period-classified search/display table according to the embodiment.

FIG. 28I is an explanatory diagram showing the data structure of a transfer-period-classified search/display table 15i according to the embodiment. The transfer-period-classified search/display table 15i is a typical table of contents classified by transfer period. Content attributes shown in the transfer-period-classified search/display table 15i are transfer periods each serving as a group name, album names each serving as a group name and content titles each serving as the title of a content. The transfer period of a content is a period in which the content was transferred from an information-processing apparatus 10 to a portable reproduction apparatus 20.

The transfer-period-classified search/display table 15i has a three-layer structure including a transfer-period layer serving as the highest-level layer, an album-title layer serving as a middle-level layer and a content layer serving as the lowest-level layer. On the transfer-period layer, three transfer periods are sorted in the chronological order starting with the earliest transfer period. In an example shown in the figure, the transfer periods are sorted to result in a sequence of 'Musical contents preceding immediately preceding musical contents', Immediately preceding musical contents' and 'Most recently transferred musical contents'. On the album layer, for each of the transfer periods, the names of albums each transferred during the transfer period are arranged in a chronological order the albums were recorded in the portable reproduction apparatus 20. On the content layer, for each of the album names, the titles of contents pertaining to an album identified by the album name are arranged in a chronological order the contents were added to the album.

The transfer-period-classified search/display table 15i having the data structure described above is used in a first endeavor to search for the name of an album by using the transfer period of as a key and a second endeavor to search for the title of a content (or a piece of music) by using the album name found in the first endeavor as a search key. In this case, since the names of albums transferred during each transfer period are sorted in a recording chronological order and the titles of contents pertaining to each album are arranged in a chronological order the contents were added to the album, the user can enjoy the convenience of easiness of endeavors to search for a desired content transferred during a specific transfer period. An example of such a desired content is a content transferred recently.

It is to be noted that the transfer-period-classified search/display table 15i is a content-title search/display table 15 showing the titles of contents classified by transfer period, which is defined as a period in which a content is transferred from the information-processing apparatus 10 to the portable reproduction apparatus 20. However, a table similar to the transfer-period-classified search/display table 15i can also be created as a table showing the titles of contents classified by transfer period, which is defined as a period in which a content is transferred from the content distribution server 30 to the information-processing apparatus 10.

(J. Artist-Classified All Musical-Contents Search/Display Table)

Figure 28J:
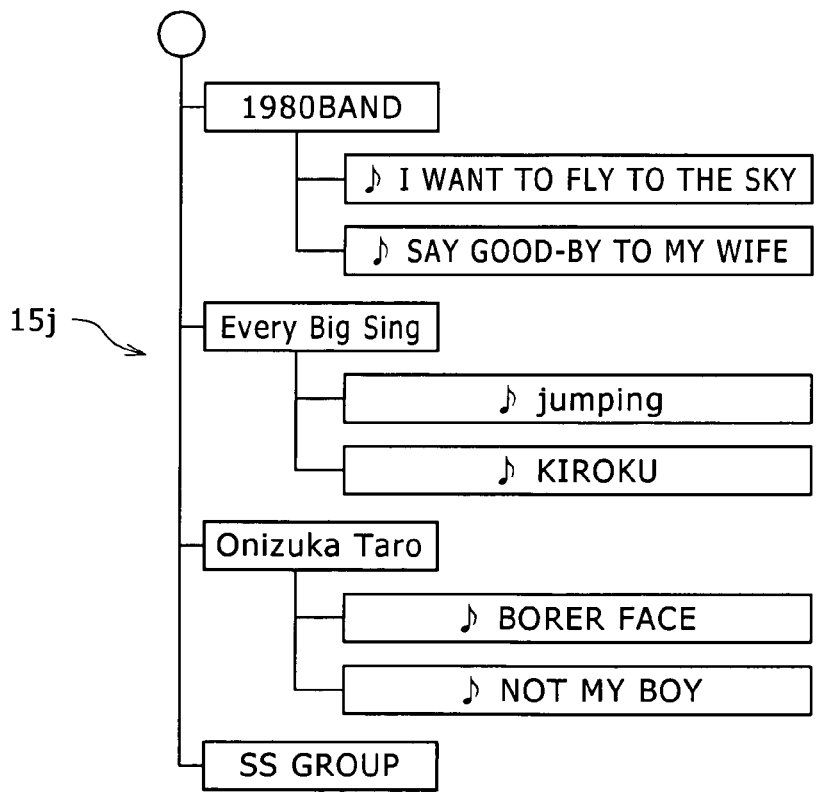
FIG. 28J is an explanatory diagram showing the data structure of an artist-classified all-contents search/display table according to the embodiment.

FIG. 28j is an explanatory diagram showing the data structure of an artist-classified all musical-content search/display table 15j according to the embodiment. Content attributes shown in the artist-classified all musical-content search/display table 15j are artist names each serving as a group name and content titles each serving as the title of a content.

The artist-classified all musical-content search/display table 15j has a two-layer structure including an artist layer serving as the high-level layer and a content layer serving as the low-level layer. On the artist layer, artist names each serving as a group name are sorted in the pronunciation order in a process to arrange the initials of the artist names. On the content layer, for each of the artist-name groups, the titles of all contents pertaining to the artist-name group are sorted in the pronunciation order in a process to arrange the initials of the content titles.

The artist-classified all musical-content search/display table 15j having the data structure described above is used in an endeavor to search for the title of a content (or a piece of music) by using the artist name of as a search key. In this case, for each of the artist-name groups, the titles of all contents (or all pieces of music) pertaining to the artist-name group are displayed in the pronunciation order. Thus, the user can enjoy the convenience of easiness of an endeavor to search for a content (or a piece of music) associated with a desired artist. In addition, the user can also enjoy the convenience of a process to directly search for a content (or a piece of music) associated with a desired artist without specifying the name of an album. On top of that, applications of the artist-classified all musical-content search/display table 15j are by no means limited to an endeavor to search for a desired content. For example, the artist-classified all musical-content search/display table 15j can also be applied to a process to create a playlist including only contents associated with every artist.

(K. User-Playlist-Classified Search/Display Table)

Figure 28K:
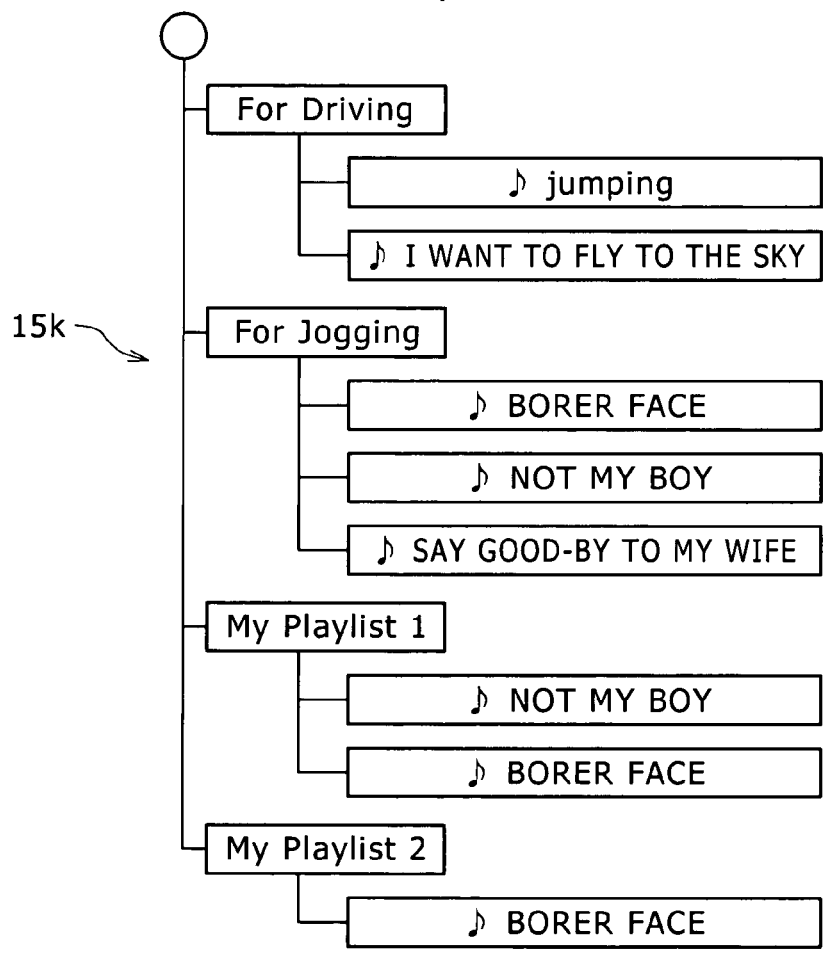
FIG. 28K is an explanatory diagram showing the data structure of a user-playlist-classified search/display table according to the embodiment.

FIG. 28K is an explanatory diagram showing the data structure of a user-playlist-classified search/display table 15k according to the embodiment. Content attributes shown in the user-playlist-classified search/display table 15k are playlist names each serving as a group name and content titles each serving as the title of a content. A playlist can be created with a high degree of freedom on the basis of inputs entered by the user. In an example shown in the figure, playlists named For Driving, For Jogging, My Playlist 1 and My Playlist 2 have each been created as a collection of contents desired by the user.

The user-playlist-classified search/display table 15k has a two-layer structure including a playlist layer serving as the high-level layer and a content layer serving as the low-level layer. On the playlist layer, playlist names each serving as a group name are sorted in the character-code order. On the content layer, for each of the playlist names, the titles of contents (or pieces of music) pertaining to a playlist identified by the playlist name are sorted in an order defined by the user.

The user-playlist-classified search/display table 15k having the data structure described above is used in an endeavor to search for the title of a content (or a piece of music) by using the playist name of as a search key. In this case, for each of the playlist names, the titles of contents pertaining to a playlist identified by the playlist name are displayed in an order defined by the user. Thus, the user can enjoy the convenience of easiness of an endeavor to search for a content (or a piece of music) pertaining to a desired playlist.

(L. Reproduction-History-Classified Search/Display Table)

Figure 28L:
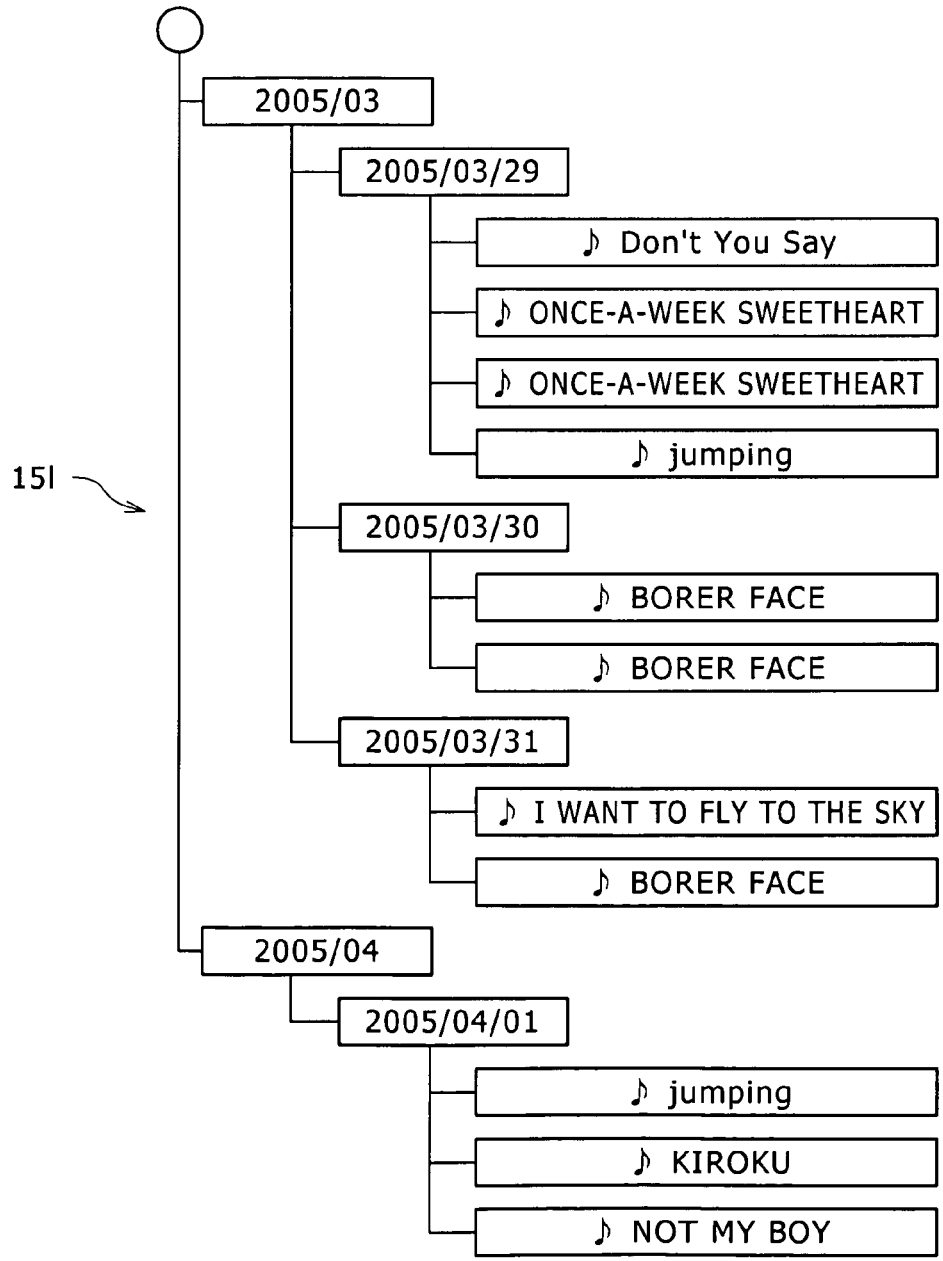
FIG. 28L is an explanatory diagram showing the data structure of a reproduction-history-classified search/display table according to the embodiment.

FIG. 28L is an explanatory diagram showing the data structure of a reproduction-history-classified search/display table 15*l* according to the embodiment. Content attributes shown in the reproduction-history-classified search/display table 15*l* are reproduction year/month dates each serving as a group name, reproduction year/month/day dates each also serving as a group name and content titles each serving as the title of a content.

The reproduction-history-classified search/display table 15*l* has a three-layer structure including a reproduction year/month layer serving as the highest-level layer, a reproduction year/month/day layer serving as the middle-level layer and a content layer serving as the lowest-level layer.

On the reproduction year/month layer, reproduction year/month dates are sorted in a chronological order. On the reproduction year/month/day layer, for every reproduction year/month date, reproduction year/month/day dates in the reproduction year/month group are sorted in a chronological order. In the reproduction year/month group of 2005/03, reproduction year/month/day dates of 2005/03/29, 2005/03/30 and 2003/03/31 are sorted in a chronological order. On the content layer, for every reproduction year/month/day date, the titles of contents (or pieces of musical contents) reproduced on the reproduction year/month/day date are sorted in a chronological order as well.

The reproduction-history-classified search/display table 15*l* having the data structure described above is used in a first endeavor to search for a reproduction year/month/day date by using the reproduction year/month date as a search key and a second endeavor to search for the title of a content (or a piece of music) by using the reproduction year/month/day date found in the first endeavor as a search key. In this case, since tracks (or musical contents) are displayed in a chronological order of reproduction, the user can enjoy the convenience of easiness of an endeavor to search for a desired content (or a desired piece of music) such as a piece of music listened to during a predetermined era in the past. On top of that, applications of the reproduction-history-classified search/display table 15*l* are by no means limited to an endeavor to search for a desired content. For example, the reproduction-history-classified search/display table 15*l* can also be applied to a process to create a playlist including only contents well listened to in an era for every era of reproduction.

(M. Auto-Playlist Search/Display Table)

Figure 28M:
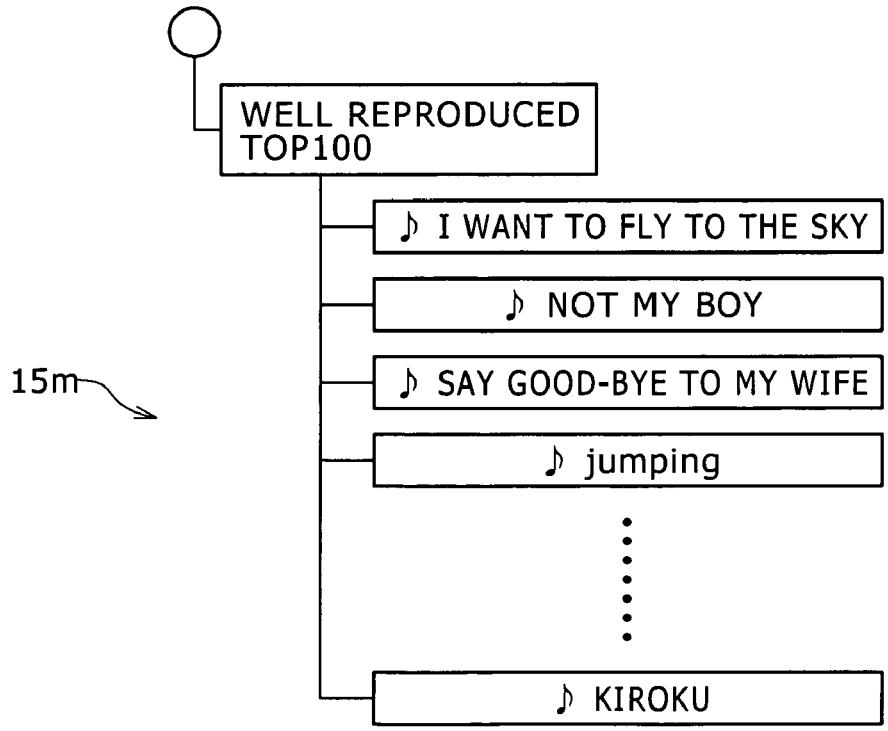
FIG. 28M is an explanatory diagram showing the data structure of an auto-playlist search/display table according to the embodiment.

FIG. 28M is an explanatory diagram showing the data structure of an auto-playlist search/display table 15*m* according to the embodiment. Content attributes shown in the auto-playlist search/display table 15*m* are playlist names each serving as a group name and content titles each serving as the title of a content. An auto playlist is a playlist automatically created by the information-processing apparatus 10 on the basis of results of analyzing event logs each serving as a reproduction history. In an example shown in the figure, the auto playlist is given the name of 'Well Reproduced Top 100'. This typical auto playlist has been created by selecting 100 most frequently reproduced contents on the basis of results of analyzing event logs each serving as a reproduction history and sorting the selected contents, for example, in a reproduction order such as an order of decreasing reproduction counts. However, playlists of other types different from this typical auto playlist can also be created automatically on the basis of the reproduction frequency.

The auto-playlist search/display table 15*m* has a two-layer structure including a playlist layer serving as the high-level layer and a content layer serving as the low-level layer. On the playlist layer, the auto playlist is provided. On the content layer, the titles of contents (or pieces of musical contents) included on the auto playlist are sorted in an order of decreasing reproduction counts.

The auto-playlist search/display table 15*m* having the data structure described above is used in an endeavor to search for the title of a content (or a piece of music) included on the auto playlist. In this case, since the titles of contents (or pieces of musical contents) included on the auto playlist are sorted in an order of decreasing reproduction counts, the user can enjoy the convenience of easiness of an endeavor to search for a desired content (or a desired piece of music) such as a frequently reproduced piece of music.

So far, typical content-title search/display tables 15 have been described. However, content-title search/display tables other than the typical content-title search/display tables 15 described above can also be created. In addition, even though the information-processing apparatus 10 creates the typical content-title search/display tables 15 in accordance with the embodiment, the scope of the present invention is by no means limited to the embodiment. For example, a portable reproduction apparatus 20 may also create a simple portion of a typical content-title search/display table 15. As an alternative, the information-processing apparatus 10 creates some layers such as the artist layer, the album layer and the content layer whereas the portable reproduction apparatus 20 creates remaining layers such as a layer of initials.

<Sequence of Operations>

Figure 29:
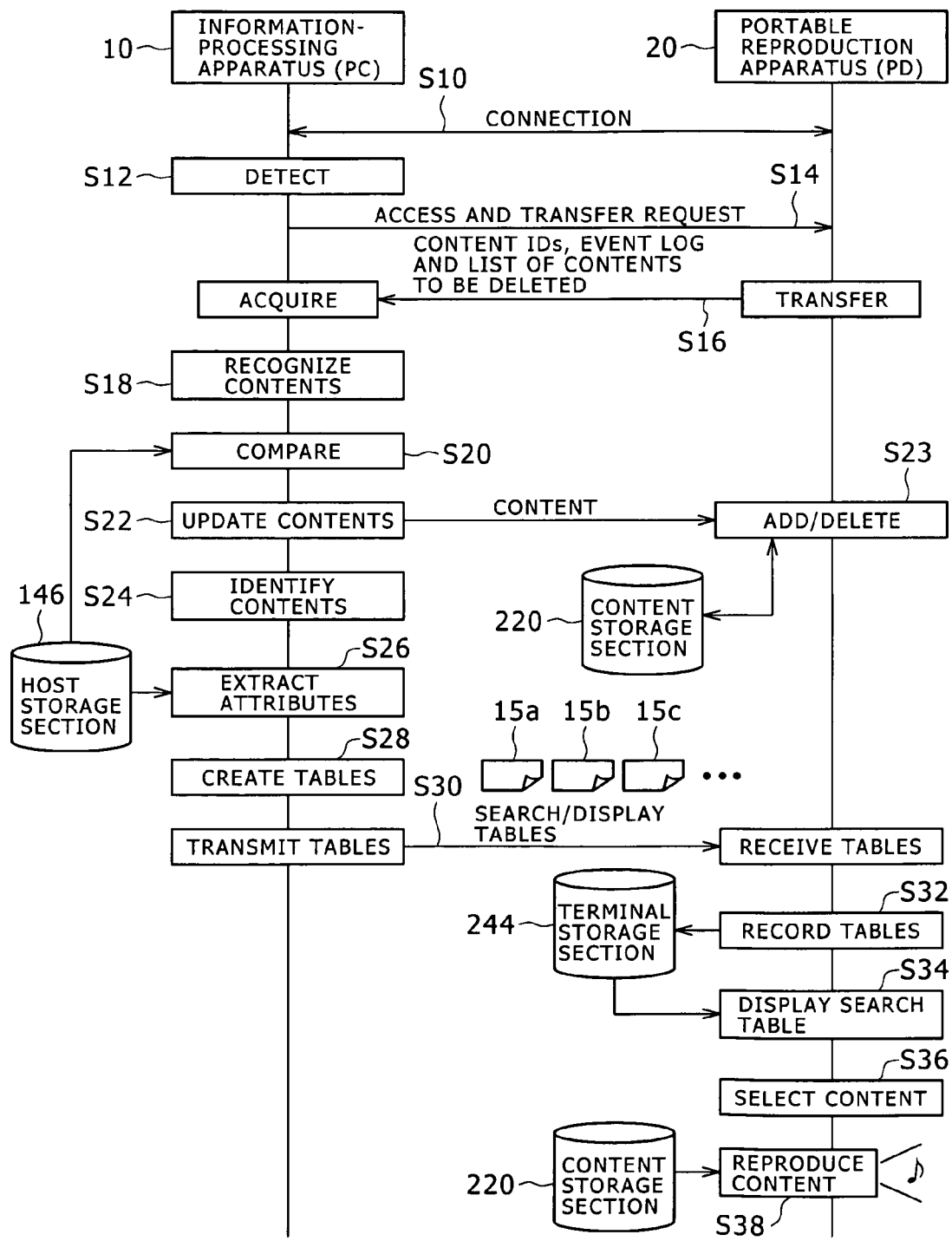
FIG. 29 is a sequence diagram showing a sequence of operations carried out by the information-processing apparatus and the portable reproduction apparatus in accordance with the embodiment.

By referring to FIG. 29, the following description explains a sequence of operations carried out by the information-processing apparatus 10 and the portable reproduction apparatus 20, which are provided in accordance with the embodiment, in conformity with respectively a communication method adopted by the information-processing apparatus 10 and a reproduction method adopted by the portable reproduction apparatus 20. FIG. 29 is a sequence diagram showing a series of operations carried out by the information-processing apparatus 10 and the portable reproduction apparatus 20 in accordance with the embodiment.

In an initial state of the sequence, a plurality of contents and a plurality of content-title search/display tables 15 for the contents have been transferred from the information-processing apparatus 10 to the portable reproduction apparatus 20 connected to the information-processing apparatus 10 and stored in the portable reproduction apparatus 20. Then, after the connection is discontinued, the portable reproduction apparatus 20 has reproduced all or some of the contents, created event logs of the contents and generated a list of contents to be deleted. In addition, the information-processing apparatus 10 has received new contents downloaded from the content distribution server 30.

In this state, as the information-processing apparatus 10 and the portable reproduction apparatus 20 are again connected to each other by a local line 9 at a step S10 (or a connection step) of the operation sequence shown in FIG. 29, the information-processing apparatus 10 detects the connection at the next step S12 (or a connection detection step).

Then, at the next step S14 (or an access step), the information-processing apparatus 10 makes an access to the portable reproduction apparatus 20 through the local line 9 to request the portable reproduction apparatus 20 that the portable reproduction apparatus 20 transmit necessary information to the portable reproduction apparatus 20. At this request, the portable reproduction apparatus 20 transmits information to the information-processing apparatus 10 and the information-processing apparatus 10 receives the information at the next step S16 (or a transfer step or an acquisition step). The information transmitted from the portable reproduction apparatus 20 to the information-processing apparatus 10 includes the IDs of a plurality of contents stored in the portable reproduction apparatus 20, event logs for the contents and a list of contents to be deleted. It is to be noted that, in place of the content IDs, information usable for identifying all the contents stored in the portable reproduction apparatus 20 can also be transmitted from the portable reproduction apparatus 20 to the information-processing apparatus 10. An example of such information used for identifying all the contents is all or some of the content-title search/display tables 15 already stored in the portable reproduction apparatus 20.

Then, at the next step S18 (or a content recognition step), the information-processing apparatus 10 recognizes all the contents stored in the portable reproduction apparatus 20 on the basis of the content IDs received in the operation carried out at the preceding step. Subsequently, at the next step S20 (or a comparison step), the information-processing apparatus 10 recognizes a difference between contents stored in the information-processing apparatus 10 and the contents stored in the portable reproduction apparatus 20. In this case, since the information-processing apparatus 10 received distributed contents from the content distribution server 30 as described above and the portable reproduction apparatus 20 does not have these new contents, these new contents are a difference between contents stored in the information-processing apparatus 10 and the contents stored in the portable reproduction apparatus 20.

Then, at the next step S22 (or a content updating step), the information-processing apparatus 10 updates the contents stored in the portable reproduction apparatus 20. To put it in detail, for example, the information-processing apparatus 10 controls a process to delete contents identified by content IDs put on the acquired list of contents to be deleted from the content storage section 220 employed in the portable reproduction apparatus 20. In addition, if the user has entered an input to the portable reproduction apparatus 20 as a request to obtain some of the distributed contents from the information-processing apparatus 10, the information-processing apparatus 10 automatically controls a process to add the requested contents to the content storage section 220 employed in the portable reproduction apparatus 20. Moreover, if a content synchronization function and/or a content automatic transfer function have been set in the information-processing apparatus 10, the information-processing apparatus 10 automatically controls a process to add the contents to the content storage section 220 employed in the portable reproduction apparatus 20. As described earlier, the content synchronization function of the information-processing apparatus 10 is a function to have contents of the portable reproduction apparatus 20 kept up with contents stored in the information-processing apparatus 10.

As a result, at a step S23 (or a content addition/deletion step), contents are added to and deleted from the content storage section 220 employed in the portable reproduction apparatus 20.

As a result of such a content updating operation, contents stored in the portable reproduction apparatus 20 become different from the contents stored previously. Thus, since different contents are now stored in the portable reproduction apparatus 20, new content-title search/display tables 15 for the present contents are required.

Then, at the next step S24 (or a content identification step), the information-processing apparatus 10 recognizes all contents stored in the content storage section 220 employed in the portable reproduction apparatus 20. To put it concretely, the information-processing apparatus 10 identifies the contents stored in the content storage section 220 of the portable reproduction apparatus 20 at the present point of time on the basis of the content IDs received in the operation carried out at the step S16 and the result of the content updating operation carried out at the step S22/S23.

It is to be noted that the process of the step S24 can be carried out before the step S22. In this case, if the process to update contents stored in the portable reproduction apparatus 20 is carried out at the step S22/S23, the information-processing apparatus 10 inevitably identify all the contents to be stored in the content storage section 220 of the portable reproduction apparatus 20.

Then, at the next step S26 (or an information extraction step), the information-processing apparatus 10 extracts the attributes of the contents identified in the operation carried out at the preceding step from the host database 170 stored in the host storage section 146.

Subsequently, at the next step S28 (or a table creation step), the information-processing apparatus 10 creates a plurality of aforementioned content-title search/display tables 15 having different types on the basis of the extracted attributes of the contents. To put it concretely, first of all, the information-processing apparatus 10 creates at least two content-title search/display tables 15, i.e., first and second content-title search/display tables, by determining at least two different types of group on basis of predetermined consideration as group types each to include attributes selected from the content attributes extracted in the operation carried out at the preceding step and arranging (or sorting) content titles in each group in accordance with at least two different sorting rules.

Then, at the next step S30 (or a table transfer step or a table acquisition step), the information-processing apparatus 10 transmits at least two content-title search/display tables 15 mentioned above to the portable reproduction apparatus 20 and the portable reproduction apparatus 20 receives the tables 15. Subsequently, at the next step S32 (or a table recording step), the portable reproduction apparatus 20 records the content-title search/display tables 15 in the terminal storage section 244.

Then, at the next step S34 (or a display control step), the portable reproduction apparatus 20 sequentially displays search screens based on the content-title search/display tables 15. To put it in detail, the portable reproduction apparatus 20 reads out the album-classified search/display table 15a conforming to a search technique selected in accordance with an input entered by the user from the terminal storage section 244 and displays all layers of the retrieved album-classified search/display table 15a as they are on the display section 250 in order to show content titles sorted in accordance with a first sorting rule such as a rule setting the track-number order on a layer of the album-classified search/display table 15a to the user. If the user enters an input specifying another search technique, on the other hand, the portable reproduction apparatus 20 reads out the initial-classified all-content search/display table 15d conforming to the other search technique from the terminal storage section 244 and displays all layers of the retrieved initial-classified all-content search/display table 15d as they are on the display section 250 in order to show content titles sorted in accordance with a second sorting rule such as a rule setting the pronunciation order on a layer of the album-classified search/display table 15d to the user.

Then, at the next step S36 (or a content selection step), the portable reproduction apparatus 20 selects the title of a content from a plurality of sorted content titles displayed in the operation carried out at the step S34 in accordance with an input entered by the user.

Subsequently, at the next step S38 (or a content reproduction step), the portable reproduction apparatus 20 reproduces a content identified by the content title, which has been selected by the user in the operation carried out at the step S36, from the content storage section 220 employed in the portable reproduction apparatus 20.

The above description has explained a sequence of operations carried out by the information-processing apparatus 10 and the portable reproduction apparatus 20, which are provided in accordance with the embodiment. As described above, the content-title search/display tables 15 are created by the table creation section 156 employed in the information-processing apparatus 10 on the basis of the host database 170 and transmitted to the portable reproduction apparatus 20 to be stored in the terminal storage section 244 employed in the portable reproduction apparatus 20. Then, in an operation to display contents and search for a desired one, the portable reproduction apparatus 20 needs merely to select a content-title search/display table 15 conforming to a search technique specified by the user among the content-title search/display tables 15 stored in the terminal storage section 244, retrieve the selected table 15 and display the retrieved table 15 as it is. In addition, if contents stored in the portable reproduction apparatus 20 are replaced by other contents received from the information-processing apparatus 10, the information-processing apparatus 10 detecting the change in contents and reconstructs all the content-title search/display tables 15 in order to keep up with the change and reflect the change in the updated content-title search/display tables 15, storing the updated content-title search/display tables 15 in the portable reproduction apparatus 20 again.

Thus, since the portable reproduction apparatus 20 does not need to create the content-title search/display tables 15 by itself, the processing load borne by the portable reproduction apparatus 20 in a process to display contents and search for a desired one can be reduced. As a result, even a portable reproduction apparatus 20 having low processing performance is capable of improving the speed of the process to display contents and decreasing the consumption of electrical power generated by the battery.

In addition, since the portable reproduction apparatus 20 holds a plurality of content-title search/display tables 15 provided with different table types and each created in one of two or more layer structures each having a unique group type (or unique group types) and showing content titles sorted in accordance with one of two or more unique sorting rules, the portable reproduction apparatus 20 is capable of displaying any one of a number of search screens at a high speed in accordance with one of a plurality of search techniques.

<Typical Display Screens>

Next, by referring to FIGS. 30 to 34, the following description explains typical display screens appearing on the display section 250 employed in the portable reproduction apparatus 20. FIGS. 30 to 34 are each an explanatory diagram showing transitions of a display screen appearing on the display section 250 employed in the portable reproduction apparatus 20.

(List Search)

Figure 30:
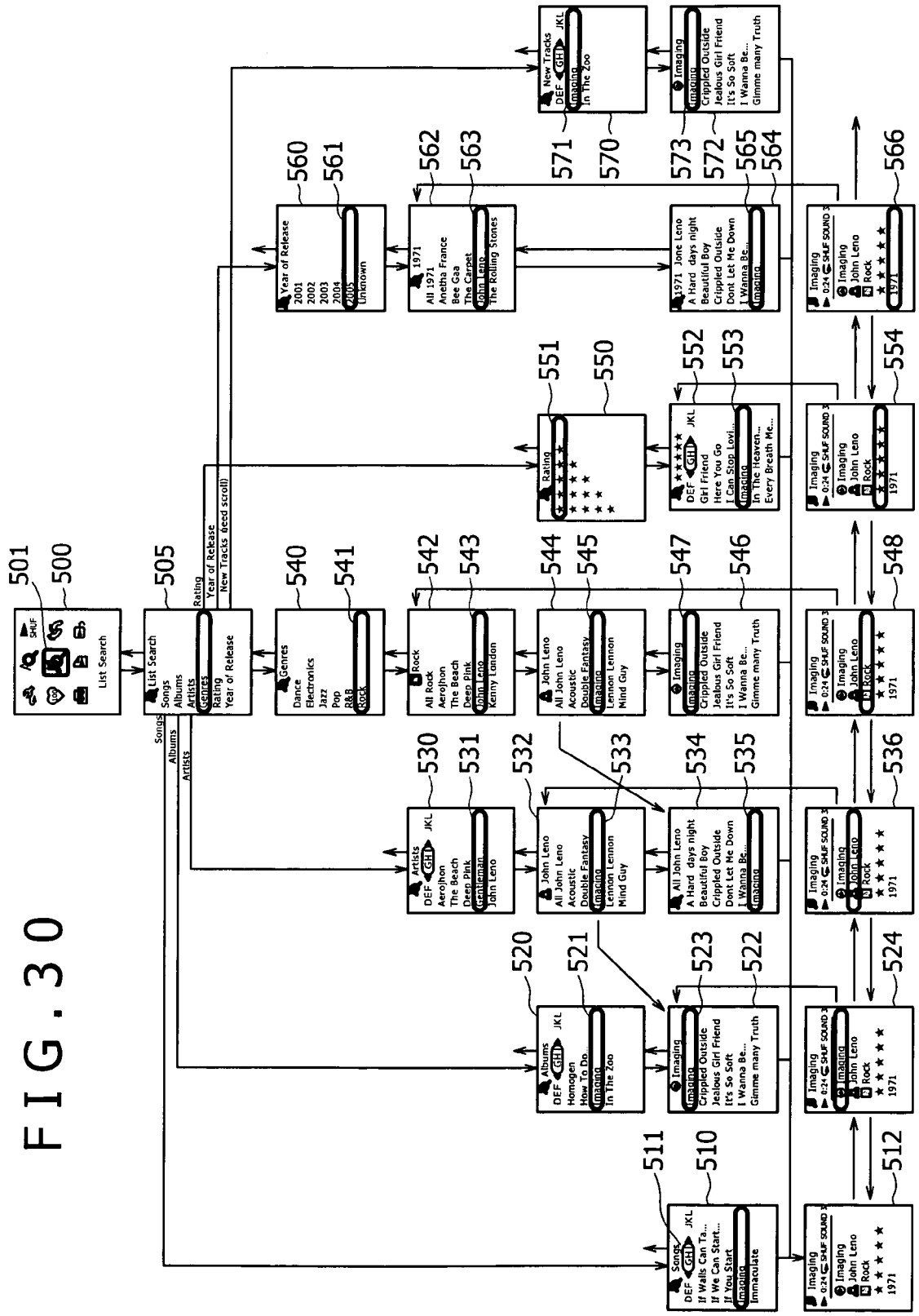
FIG. 30 is an explanatory diagram showing display-screen transitions occurring during a process to search for a list in the portable reproduction apparatus according to the embodiment.

FIG. 30 is an explanatory diagram showing display-screen transitions occurring during an endeavor to search for a list of contents each serving as a favorite with the user in the portable reproduction apparatus 20 by using the content-title search/display tables 15.

As shown in FIG. 30, first of all, when the user selects an icon 501 appearing on an operation select screen 500 as an icon representing an endeavor to search for a list of contents, a search-key selection screen 505 appears to show a plurality of search keys. In the following description, the search keys typically include a song key meaning a search key used for displaying all pieces of music classified by song initial, an album key, an artist key, a genre key, a rating key, a year-of-release key and a new-track key. Search screens each displayed on the basis of one of the search keys are explained as follows.

(1. Initial-Classified All Musical Content Search Screen)

When the user selects a Songs item displayed on the search-key selection screen 505 as a search key representing a screen displaying all musical contents classified by content-title initial, a content selection screen 510 is displayed. If the user further selects desired initials 511 displayed on the content selection screen 510, the portable reproduction apparatus 20 displays all contents (or all pieces of music) with titles of 'If Walls Can - - - ', If We Can - - - ', If You Start - - - ', 'Imaging' and so on, which are sorted in the pronunciation/character-string order. If the user further selects the title of a desired musical content from the content titles displayed on the content selection screen 510 in order to specify a to-be-reproduced content with the title 'Imaging', a process to reproduce the content is started. At that time, detailed information on the selected content is displayed on a content-information display screen 512.

As shown in the figure, the content-information display screen 512 shows the detailed information including the following:

Content title: Imaging
Reproduction duration: 0:24
Album name: Imaging
Artist name: John Leno
Genre: Rock
Rating: ★★★★★
Year of release: 1971

Thus, while listening to the desired musical content being reproduced, the user is capable of viewing the information displayed on the content-information display screen 512 as the information on the content and verifying the attributes or the content.

The initial-classified all musical content search screen is displayed on the basis of the initial-classified all-content search/display table 15d and, since the portable reproduction apparatus 20 needs merely to output the layers of the initial-classified all-content search/display table 15d as they are, the processing load borne by the portable reproduction apparatus 20 is small.

(2. Album-Classified Content Search Screen)

When the user selects an Album item displayed on the search-key selection screen 505 as a search key representing a screen displaying musical contents classified by album, an album selection screen 520 is displayed to show album names sorted in the pronunciation/character-string order. When the user further selects an album name 521 appearing on the album selection screen 520 as the name of a desired album, the titles of contents (or pieces of music) included in the desired album are displayed on a content selection screen 522, being sorted in the track-number order. When the user further selects a content title 523 appearing on the content selection screen 522 as the title of a desired content to be reproduced, a process to reproduce the content is started. At that time, detailed information on the selected content is displayed on a content-information display screen 524.

The album-classified musical content search screen is displayed on the basis of the album-classified search/display table 15a and, since the portable reproduction apparatus 20 needs merely to output the layers of the album-classified search/display table 15a as they are, the processing load borne by the portable reproduction apparatus 20 is small.

(3. Artist-Classified Content Search Screen)

When the user selects an Artist item displayed on the search-key selection screen 505 as a search key representing a screen displaying contents (or pieces of music) classified by artist, a artist selection screen 530 is displayed to show artist names sorted in the pronunciation/character-string order. When the user further selects an artist name 531 appearing on the artist selection screen 530 as the name of a desired artist, the names of albums associated with the desired artist are displayed on an album selection screen 532, being sorted in the pronunciation/character-string order. When the user further selects an album name 533 appearing on the album selection screen 532 as the name of a desired album, the titles of contents (or pieces of music) included in the desired album are displayed on a content selection screen 534, being sorted in a track-number order. When the user further selects a content title 535 appearing on the content selection screen 534 as the title of a desired content to be reproduced, a process to reproduce the content is started. At that time, detailed information on the selected content is displayed on a content-information display screen 536.

In particular, if the user selects an artist's all contents (or pieces of music) special item of 'All John Leno' appearing on the album selection screen 532, the titles of all contents (or all pieces of music) associated with the artist John Leno are displayed on an all-content screen, being sorted in the pronunciation/character-string order. In this way, the titles of all contents (or all pieces of music) associated with an artist can be displayed directly without specifying the name of an album associated with the artist. Thus, the user can enjoy more convenience. In addition, since the all-content screen shows the titles of all contents (or all pieces of music) associated with the artist John Leno, the user can select a content (or a piece of music) from a selection range wider than a range provided for a specific album of the artist.

The artist-classified musical content search screen is displayed on the basis of the artist-classified search/display table 15b and, since the portable reproduction apparatus 20 needs merely to output the layers of the artist-classified search/display table 15b as they are, the processing load borne by the portable reproduction apparatus 20 is small.

(4. Genre-Classified Content Search Screen)

When the user selects a Genre item displayed on the search-key selection screen 505 as a search key representing a screen displaying contents (or pieces of music) classified by genre, a genre selection screen 540 is displayed to show genres sorted in the character-code order. When the user further selects a desired genre 541 appearing on the genre selection screen 540, the names of artists associated with the genre 541 are displayed on an artist selection screen 542, being sorted in the pronunciation/character-string order. When the user further selects an artist name 543 appearing on the artist selection screen 542 as the name of a desired artist, the names of albums associated with the desired artist are displayed on an album selection screen 544, being sorted in the pronunciation/character-string order. When the user further selects an album name 545 appearing on the album selection screen 544 as the name of a desired album, the titles of contents (or pieces of music) included in the desired album are displayed on a content selection screen 546, being sorted in a track-number order. When the user further selects a content title 547 appearing on the content selection screen 546 as the title of a desired content to be reproduced, a process to reproduce the content is started. At that time, detailed information on the selected content is displayed on a content-information display screen 548.

In particular, if the user selects a genre's all contents (or pieces of music) special item of 'All Rock' appearing on the artist selection screen 542, the titles of all contents (or all pieces of music) pertaining to the rock genre are displayed on an all-content screen for the genre, being sorted in the pronunciation/character-string order. By the same token, if the user selects an artist's all contents (or pieces of music) special item of 'All John Leno' appearing on the album selection screen 544, the titles of all contents (or all pieces of music) associated with the artist John Leno are displayed on an all-content screen for the artist, being sorted in the pronunciation/character-string order. In this way, the titles of all contents (or all pieces of music) pertaining to a genre can be displayed directly without specifying the name of an artist associated with the contents (or the pieces of music) pertaining to the genre and without specifying the name of an album associated with the artist. By the same token, the titles of all contents (or all pieces of music) associated with an artist as contents (or pieces of music) pertaining to a genre can be displayed directly without specifying the name of an album associated with the artist. Thus, the user can enjoy more convenience. In addition, since the all-content screen for a genre shows the titles of all contents (or all pieces of music) pertaining to the genre, the user can select a content (or a piece of music) from a selection range wider than a range provided for a specific artist. By the same token, since the all-content screen for a specific artist shows the titles of all contents (or all pieces of music) associated with the artist, the user can select a content (or a piece of music) from a selection range wider than a range provided for a particular album of the artist.

The genre-classified musical content search screen is displayed on the basis of the genre-classified search/display table 15c and, since the portable reproduction apparatus 20 needs merely to output the layers of the genre-classified search/display table 15c as they are, the processing load borne by the portable reproduction apparatus 20 is small.

(5. Rating-Classified Musical Content Search Screen)

When the user selects a Rating item displayed on the search-key selection screen 505 as a search key representing a screen displaying all contents (or pieces of music) classified by evaluation value, an evaluation-value value selection screen 550 is displayed to show contents (or pieces of music) at five grades of evaluation-value levels. When the user further selects a desired evaluation-value level 551 of ★★★★★ displayed on the evaluation-value selection screen 550, the portable reproduction apparatus 20 displays a content selection screen 552 showing content titles, which are sorted typically in an order of decreasing evaluation values, along with their respective evaluation values at the evaluation-value level. When the user further selects a content title 553 appearing on the content selection screen 552 as the title of a content to be reproduced, a process to reproduce the content is started. At that time, detailed information on the selected content is displayed on a content-information display screen 554.

The rating-classified musical content search screen is displayed on the basis of the rating-classified search/display table 15g and, since the portable reproduction apparatus 20 needs merely to output the layers of the rating-classified search/display table 15g as they are, the processing load borne by the portable reproduction apparatus 20 is small.

(6. Release-Year-Classified Musical Content Search Screen)

When the user selects a 'Year of Release' item displayed on the search-key selection screen 505 as a search key representing a screen displaying all contents (or pieces of music) classified by year of release, a release-year selection screen 560 is displayed to show contents (or pieces of music) classified by year of release. When the user further selects a desired release year 561 displayed on the release-year selection screen 560, the portable reproduction apparatus 20 displays an artist selection screen 562 showing artists sorted in the pronunciation/character-string order. When the user further selects an artist name 563 displayed on the artist selection screen 562 as the name of a desired artist, the portable reproduction apparatus 20 displays a content selection screen 564 showing the titles of contents (pieces of music) associated with the desired artist, being sorted typically in the pronunciation/character-string order. When the user further selects a content title 565 appearing on the content selection screen 564 as the title of a desired content to be reproduced, a process to reproduce the content is started. At that time, detailed information on the selected content is displayed on a content-information display screen 566.

The release-year-classified musical content search screen is displayed on the basis of the release-year-classified search/display table 15h and, since the portable reproduction apparatus 20 needs merely to output the layers of the release-year-classified search/display table 15h as they are, the processing load borne by the portable reproduction apparatus 20 is small.

(7. Transfer-Period-Classified Musical Content Search Screen)

When the user selects a New Tracks item displayed on the search-key selection screen 505 as a search key representing a screen displaying all contents (or pieces of music) classified by transfer period, an album selection screen 570 is displayed to show albums in an order the albums were added to the portable reproduction apparatus 20. When the user further selects an album name 571 displayed on the album selection screen 570 as the name of a desired album, the portable reproduction apparatus 20 displays a content selection screen 572 showing the titles of contents (pieces of music) pertaining to the desired album in an order the contents (pieces of music) were added to the portable reproduction apparatus 20. When the user further selects a title 573 serving as the title of a desired content (or piece of music) to be reproduced from those displayed on the content selection screen 572, a process to reproduce the content is started. At that time, detailed information on the selected content is displayed on the content-information display screen 512.

The release-year-classified musical content search screen is displayed on the basis of the transfer-period-classified search/display table 15i and, since the portable reproduction apparatus 20 needs merely to output the layers of the transfer-period-classified search/display table 15i as they are, the processing load borne by the portable reproduction apparatus 20 is small.

(Search Processing Based on Initials)

Figure 31:
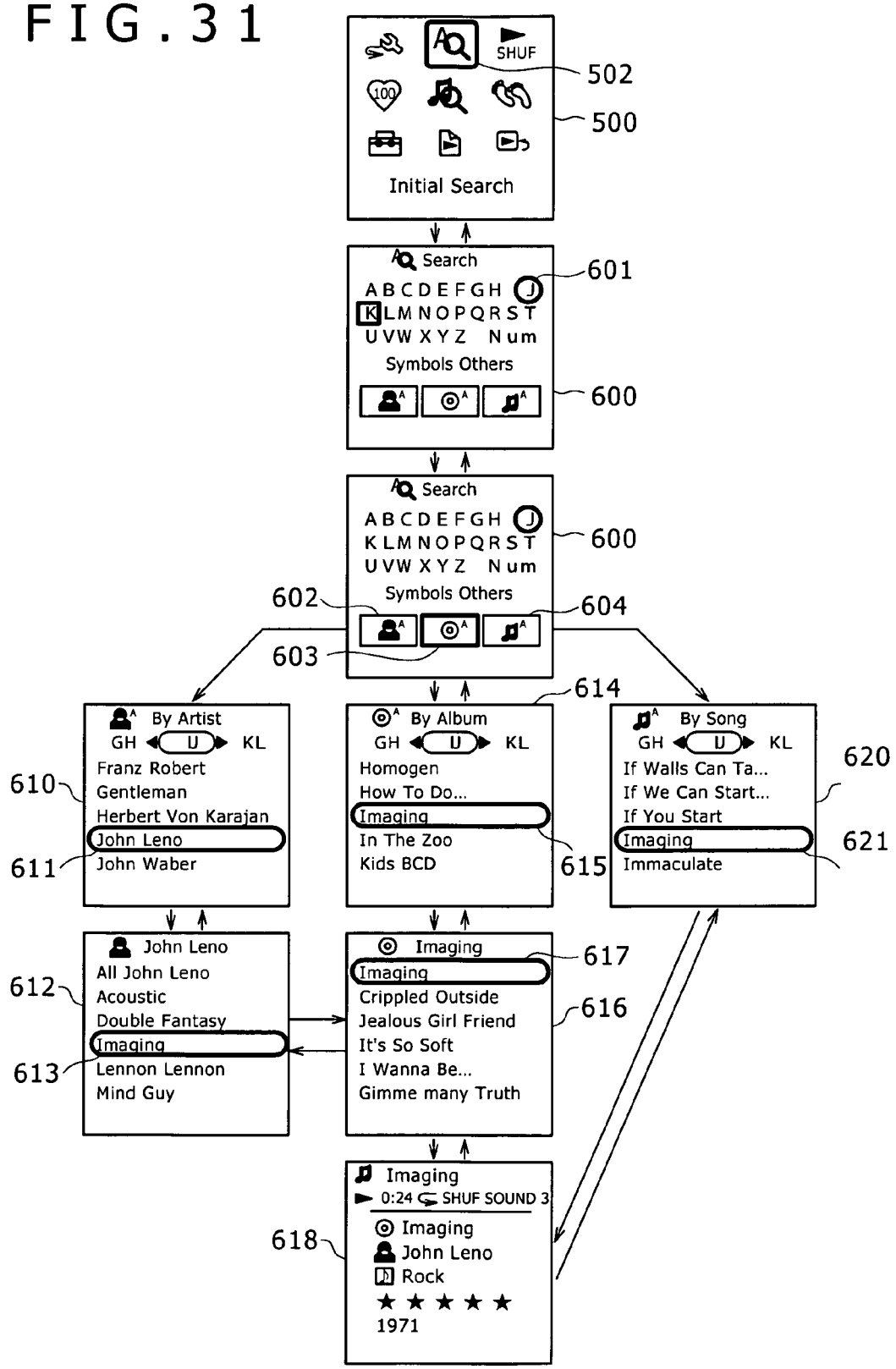
FIG. 31 is an explanatory diagram showing display-screen transitions occurring during a search process based on initials in the portable reproduction apparatus according to the embodiment.

Next, a search process based on initials is explained by referring to FIG. 31. FIG. 31 is an explanatory diagram showing display-screen transitions occurring during a process carried out by using a variety of content-title search/display tables 15 described earlier as a process to search for a content serving as a favorite with the user on the basis of initials in the portable reproduction apparatus.

As shown in FIG. 31, when the user selects an icon 502 displayed on an operation selection screen 500 as an icon representing the search process based on initials, an initial-selecting screen 600 is displayed to show initials sorted in the alphabetical order. Then, the user further selects a desired initial 601 and a search key which appear on the initial-selecting screen 600 for displaying an artist selection screen, an album selection screen, or a content selection screen. In the example shown in the figure, the desired initial 601 is the character J.

When the user further selects an icon 602 displayed on a search-key selection screen 600 as an icon representing a process carried out to search all contents (or all pieces of music) for a desired one on the basis of the initial of the name of an artist, an artist selection screen 610 is displayed to show all artist names sorted in the pronunciation/character-string order. When the user further selects an artist name 611 as the name of a desired artist from the artist names displayed on the artist selection screen 610, an album selection screen 612 is displayed to show album names sorted in the pronunciation/character-string order as the names of albums associated with the desired artist. When the user further selects an album name 613 as the name of a desired album from the album names displayed on the album selection screen 612, a content selection screen 616 is displayed to show musical-content titles sorted in the track-number order as the titles of contents (or pieces of music) pertaining to the desired album. When the user further selects a title 617 as the title of a desired content (or a desired piece of music) from the musical-content titles displayed on the content selection screen 616, a content-information display screen 618 is displayed to show detailed information on the desired content (or a desired piece of music).

The process carried out to search all contents (or all pieces of music) for a desired one on the basis of the initial of the name of an artist is based on the artist-initial-classified search/display table 15e and, since the portable reproduction apparatus 20 needs merely to output the layers of the artist-initial-classified search/display table 15e as they are, the processing load borne by the portable reproduction apparatus 20 is small.

When the user further selects an icon 603 displayed on the search-key selection screen 600 as an icon representing a process carried out to search all contents (or all pieces of music) for a desired one on the basis of the initial of the name of an album, an album selection screen 614 is displayed to show all album names sorted in the pronunciation/character-string order. When the user further selects an album name 615 as the name of a desired album from the album names displayed on the album selection screen 614, the content selection screen 616 is displayed to show musical-content titles sorted in the track-number order as the titles of contents (or pieces of music) pertaining to the desired album 615. When the user further selects a title 617 as the title of a desired content (or a desired piece of music) from the musical-content titles displayed on the content selection screen 616, the content-information display screen 618 is displayed to show detailed information on the desired content (or a desired piece of music).

The process carried out to search all contents (or all pieces of music) for a desired one on the basis of the initial of the name of an album is based on the album-initial-classified search/display table 15f and, since the portable reproduction apparatus 20 needs merely to output the layers of the album-initial-classified search/display table 15f as they are, the processing load borne by the portable reproduction apparatus 20 is small.

When the user further selects an icon 604 displayed on the search-key selection screen 600 as an icon representing a process carried out to search all contents (or all pieces of music) for a desired one on the basis of the initial of a song title serving as the title of a desired content (a desired song or a desired piece of music), a content selection screen 620 is displayed to show all musical-content titles sorted in the pronunciation/character-string order as the titles of contents (or pieces of music). When the user further selects a title 621 serving as the title of a desired content (or a desired piece of music) from the musical-content titles displayed on the content selection screen 620, the content-information display screen 618 is displayed to show detailed information on the desired content (or a desired piece of music).

The process carried out to search all contents (or all pieces of music) for a desired one on the basis of the initial of a song title serving as the title of a desired content (a desired song or a desired piece of music) is based on the initial-classified all-content search/display table 15d and, since the portable reproduction apparatus 20 needs merely to output the layers of the initial-classified all-content search/display table 15d as they are, the processing load borne by the portable reproduction apparatus 20 is small.

(Search Processing Based on Playlists)

Figure 32:
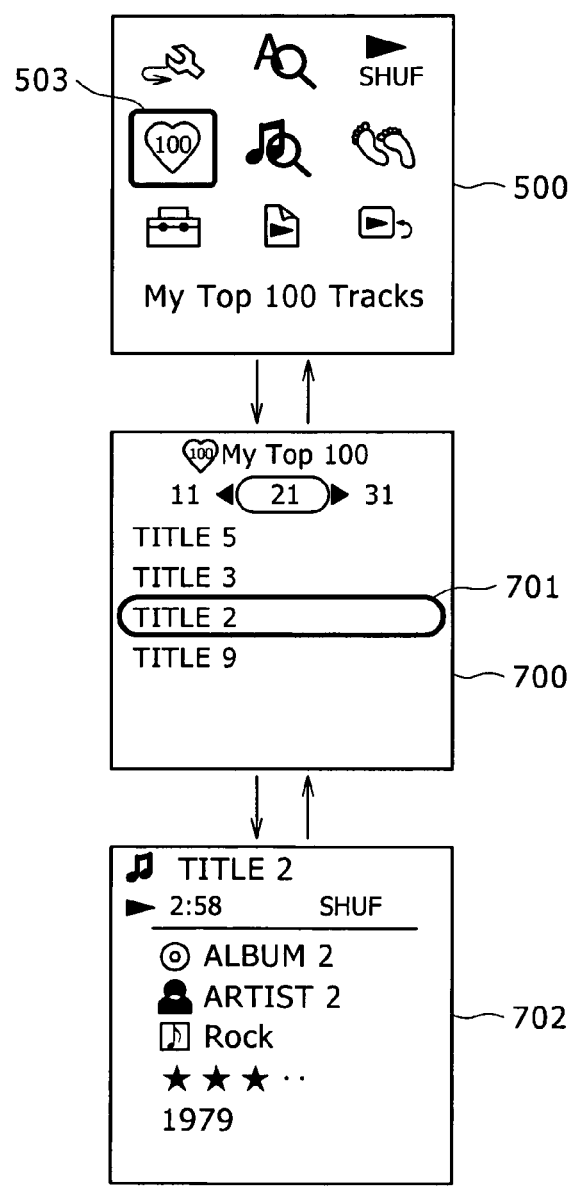
FIG. 32 is an explanatory diagram showing display-screen transitions occurring during a process to search for a desired content included on a playlist in the portable reproduction apparatus according to the embodiment.
Figure 33:
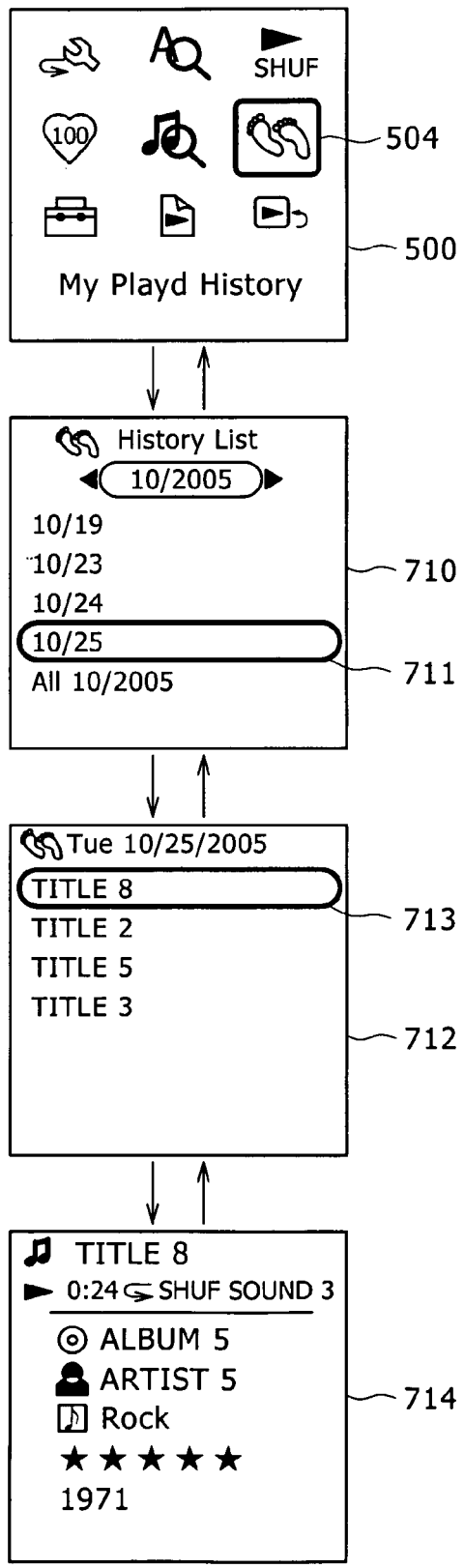
FIG. 33 is an explanatory diagram showing display-screen transitions occurring during a process to search for a desired content included on a playlist in the portable reproduction apparatus according to the embodiment.
Figure 34:
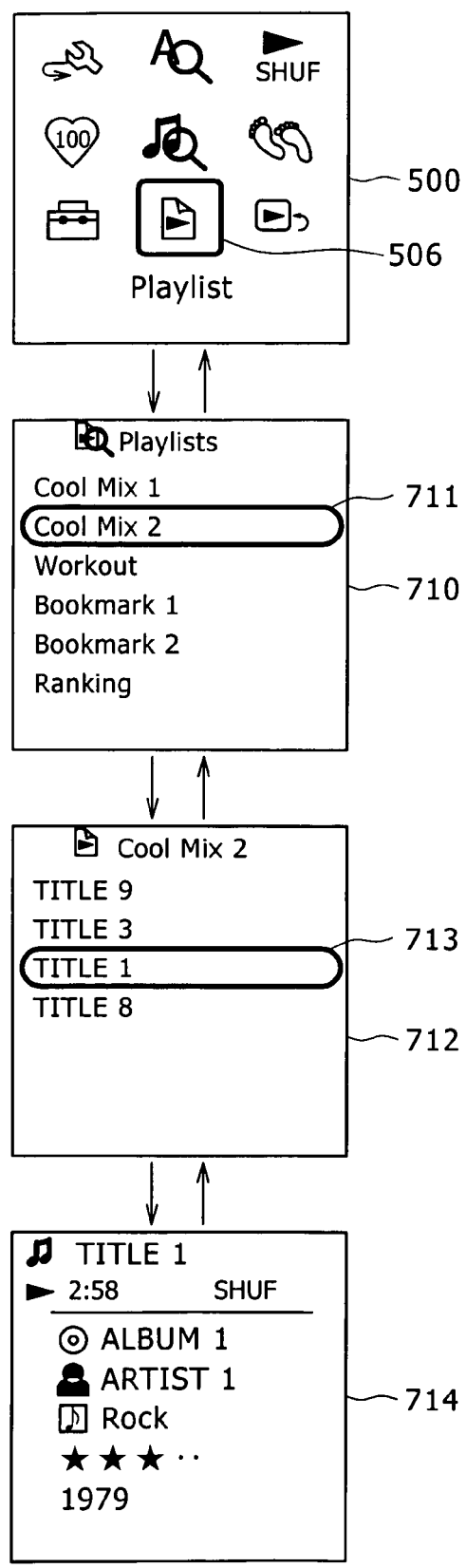
FIG. 34 is an explanatory diagram showing display-screen transitions occurring during a process to search for a desired content included on a playlist in the portable reproduction apparatus according to the embodiment.

FIGS. 32 to 34 are each an explanatory diagram showing display-screen transitions occurring during an endeavor to search for a desired content included on a playlist in the portable reproduction apparatus 20 according to the embodiment.

FIG. 32 is an explanatory diagram showing display-screen transitions occurring on a display unit during an endeavor to search for a desired content included on a playlist serving as a collection of, for example, 100 contents, which each serve as a favorite with the user and are sorted in a user-favorite order. When the user selects an icon 503 displayed on an operation selection screen 500 as an icon representing the endeavor to search for a desired content included on a playlist serving as a collection of contents each serving as a favorite with the user, a content selection screen 700 is displayed to show titles sorted in an order of decreasing reproduction frequencies as the titles of contents (or pieces of music) pertaining to the playlist. When the user further selects a title 701 serving as the title of a desired content (or a desired piece of music) from the musical-content titles displayed on the content selection screen 700, a content-information display screen 702 is displayed to show detailed information on the desired content (or the desired piece of music).

The process carried out to search for a desired content included on a playlist serving as a collection of 100 contents is based on the auto-playlist search/display table 15m and, since the portable reproduction apparatus 20 needs merely to output the layers of the auto-playlist search/display table 15m as they are, the processing load borne by the portable reproduction apparatus 20 is small.

FIG. 33 is an explanatory diagram showing display-screen transitions occurring on a display unit during an endeavor to search for a desired content included on a playlist serving as a collection of contents reproduced during a specific period of reproduction. When the user selects an icon 504 displayed on an operation selection screen 500 as an icon representing the endeavor to search for a desired content included on a playlist serving as a collection of contents reproduced during a specific period of reproduction, a reproduction-period selection screen 710 is displayed to show reproduction periods sorted in a chronological order along with their respective reproduction year/month/day dates. When the user further selects the reproduction year/month/day date 711 of a desired period of reproduction from the dates displayed on the reproduction-period selection screen 710, a content selection screen 712 is displayed to show musical-content titles sorted in a chronological order starting with a content title identifying a content reproduced on the earliest reproduction date as the titles of contents (or pieces of music) reproduced in the desired period of reproduction. When the user further selects a title 713 serving as the title of a desired content (or a desired piece of music) from the musical-content titles displayed on the content selection screen 712, a content-information display screen 714 is displayed to show detailed information on the desired content (or the desired piece of music).

The above description has explained the details of the communication system 100 according to the embodiment as well as the information-processing apparatus 10, the portable reproduction apparatus 20 and the content distribution server 30, which are included in the communication system 100. In accordance with the embodiment, the portable reproduction apparatus 20 is capable of displaying the titles of contents stored in the portable reproduction apparatus 20 as content titles, which have been classified in several ways and sorted in a plurality of sorting orders on the basis of a number of content-title search/display tables 15 with different types, in an operation to search for a desired content. Thus, an advanced endeavor to search for a desired content can be carried out. In addition, in the endeavor to search for a desired content, the portable reproduction apparatus 20 itself does not have to create the content-title search/display tables 15. Instead, the portable reproduction apparatus 20 needs merely to display layers of each content-title search/display table 15 on a search screen without the need to modify the content-title search/display tables 15. Accordingly, the processing load borne by the portable reproduction apparatus 20 and the amount of battery power consumed by the portable reproduction apparatus 20 can be reduced. As a result, even a portable reproduction apparatus 20 having low processing performance and a limited amount of power supplied by the battery is capable of realizing an advanced endeavor to search for a desired content.

The preferred embodiment of the present invention has been explained by referring to diagrams so far. Let us keep in mind, however, that it is needless to say that the scope of the present invention is by no means limited to the preferred embodiment. It is obvious that a person skilled in the art is capable of coming up with a variety of modifications and corrections falling in domains described in claims attached to this specification as modifications and corrections that can be made to the preferred embodiment. Such modifications and corrections should be naturally interpreted as modifications and corrections in the technological range of the present invention.

For example, in the preferred embodiment, the content-title search/display tables 15 to be used in the portable reproduction apparatus 20 are created by the information-processing apparatus 10 and transmitted from the information-processing apparatus 10 to the portable reproduction apparatus 20. However, the present invention is by no means limited to the preferred embodiment. For example, it is also possible to provide the communication system 100 with a configuration in which a server such as the content distribution server 30 identifies contents stored in the information-processing apparatus 10 or the portable reproduction apparatus 20 and creates content-title search/display tables 15 according to the identified contents. Then, the server transmits the created content-title search/display tables 15 to the information-processing apparatus 10 or the portable reproduction apparatus 20 to be stored in the information-processing apparatus 10 or the portable reproduction apparatus 20 respectively. Even with such a configuration, the same effects as the preferred embodiment can be obtained.

In addition, it is also possible to provide an embodiment in which the portable reproduction apparatus 20 and the information-processing apparatus 10 create two files of event logs having types different from each other. To put it in detail, for example, the portable reproduction apparatus 20 and the information-processing apparatus 10 create a file used for storing only event logs for subscription contents and a file used for storing an event logs for all contents including subscription contents.

On top of that, the portable reproduction apparatus 20 and the information-processing apparatus 10 may encrypt the created file used for storing only event logs for subscription contents so that the user is not capable of manipulating the file. Furthermore, the information-processing apparatus 10 may acquire an encrypted event-log file from the portable reproduction apparatus 20 and transmit the encrypted event-log file received from the portable reproduction apparatus 20 to a copyright management server along with an encrypted event-log file held by the information-processing apparatus 10 itself.

In the configuration described above, the copyright management server is capable of utilizing a file used for storing only event logs for subscription contents in distribution of resources to copyright holders.

What is claimed is:

1. A portable reproduction apparatus to connect to an information-processing apparatus, said reproduction apparatus comprising:
   a content storage section configured to store a plurality of contents;
   a table acquisition section configured to acquire a plurality of tables from said information-processing apparatus, each table provided in a layer structure including titles of contents identified by said information-processing apparatus from said content storage section as a lowest-level layer and a name of a group including said identified contents as a high-level layer, on the basis of attributes extracted from a host database of said information-processing apparatus including attributes of contents stored in a content storage section in said information-processing apparatus as the attributes of said identified contents;
   a terminal storage section for storing at least a first table and a second table, said first table is a table included in said plurality of acquired tables arranged by title of said identified contents in accordance with a first rule and said second table is a table included in said acquired tables arranged by title of said identified contents in accordance with a second rule, for the name of every group including some of said identified contents;
   a display control section configured to read out said first table from said terminal storage section in accordance with a first operation and to display said titles arranged in said first table in accordance with said first rule as the titles of said identified contents on a display section, and to read out said second table from said terminal storage section in accordance with a second operation and to display said titles arranged in said second table in accordance with said second rule as the titles of said identified contents on said display section;
   a content-title selection section configured to select one of content titles displayed by said display control section; and
   a content reproduction section configured to select a content identified by a content title selected by said content-title selection section from said contents stored in said content storage section in said portable reproduction apparatus and to reproduce said selected content.

2. The portable reproduction apparatus according to claim 1, wherein
   said first rule and said second rule are rules conforming to mutually different orders selected from a content-title pronunciation order, a content-title character-string order, an order of increasing content/track numbers, an order of decreasing evaluation values given to contents, an order of dates/times of adding contents to said portable reproduction apparatus, an order defined by said user, and an order of reproduction dates/times of contents.

3. The portable reproduction apparatus according to claim 1, wherein
   said attributes include a name of an album serving as a collection of contents as the name of a group including said contents,
   said first table is a table showing content titles arranged in a content-title pronunciation order or a content-title character-string order as the titles of said identified contents, and
   said second table is a table showing content titles arranged in an order of increasing content/track numbers as the titles of said identified contents, for the name of every album serving as a collection of said identified contents.

4. The portable reproduction apparatus according to claim 1, wherein
   said attributes include a name of an artist associated with contents as the name of a group including said contents, and
   said plurality of tables include a third table arranged in a content-title pronunciation order or a content-title character-string order as titles of said identified contents, for the name of every artist associated with some of said identified contents.

5. The portable reproduction apparatus according to claim 1, wherein
   said plurality of tables include content-title search/display tables each forming a layer structure and corresponding to a plurality of display screens which are to be displayed sequentially during a process to search for content in said portable reproduction apparatus, on a one-to-one basis.

6. The portable reproduction apparatus according to claim 5, wherein
   said content-title search/display tables include any of the following:
   an initial-classified all-content search/display table showing titles arranged in a content-title pronunciation order or a content-title character-string order as the titles of said identified contents for every initial used as a group name,
   an album-classified search/display table showing titles arranged in an order of increasing content/track numbers as the titles of said identified contents for every album name used as a group name,
   an artist-classified search/display table showing titles arranged in an order of increasing content/track numbers as the titles of said identified contents for every artist name and every album name, which are each used as a group name,
   a genre-classified search/display table showing titles arranged in an order of increasing content/track numbers as the titles of said identified contents for every artist name, every album name and every genre name, which are each used as a group name, a rating-classified search/display table showing titles arranged in an order of decreasing evaluation values each given to one of said identified contents as the titles of said identified contents for every evaluation-value level used as a group name, a release-year-classified search/display table showing titles arranged in a content-title pronunciation order or a content-title character-string order as the titles of said identified contents for at least every release date/time used as a group name, a transfer-period-classified search/display table showing titles arranged in an order of dates/times of adding contents to said portable reproduction apparatus for every transfer period used as a group name, an artist-classified all-content search/display table showing titles arranged in a content-title pronunciation order or a content-title character-string order as the titles of said identified contents for every artist name used as a group name, a user-playlist-classified search/display table showing titles arranged in a user-defined order as the titles of said identified contents for every playlist used as a group name, a reproduction-history-classified search/display table showing titles arranged in an order of reproduction dates/times of said identified contents as the titles of said identified contents for every reproduction period used as a group name, and an artist-link-classified search/display table showing titles arranged in an order of decreasing evaluation values each given to one of said identified contents as the titles of said identified contents for every artist name used as a group name.

7. A reproduction method of a portable reproduction apparatus to connect to an information-processing apparatus, said reproduction method comprising:

acquiring a plurality of tables from said information-processing apparatus, each table provided in a layer structure including titles of contents identified by said information-processing apparatus from a content storage section employed in said portable reproduction apparatus as a lowest-level layer and a name of a group including said identified contents as a high-level layer, on the basis of attributes extracted from a host database of said information-processing apparatus including attributes of contents stored in a content storage section in said information-processing apparatus as said attributes of said identified contents;

storing at least a first table and a second table into a terminal storage section in said portable reproduction apparatus, said first table is a table included in said plurality of acquired tables arranged by title of said identified contents in accordance with a first rule and said second table is a table included in said plurality of acquired tables arranged by title of said identified contents in accordance with a second rule, for the name of every group including some of said identified contents;

controlling display for reading out said first table from said terminal storage section in accordance with a first operation and displaying said titles arranged in said first table in accordance with said first rule as the titles of said identified contents on a display section, and reading out said second table from said terminal storage section in accordance with a second operation and displaying said titles arranged in said second table in accordance with said second rule as the titles of said identified contents on said display section;

selecting one of content titles displayed at said controlling display step; and reproducing a content identified by a content title selected at said selecting one of content titles step from said contents stored in said content storage section in said portable reproduction apparatus.

8. A computer readable storage medium storing computer readable instructions thereon that, when executed by a processor of a portable reproduction apparatus, direct the processor to perform:

a table acquisition process of acquiring a plurality of tables from said information-processing apparatus, each table provided in a layer structure including titles of contents identified by said information-processing apparatus from a content storage section employed in said portable reproduction apparatus as a lowest-level layer and a name of a group including said identified contents as a high-level layer, on the basis of attributes extracted from a host database of said information processing apparatus including attributes of contents stored in a content storage section in said information-processing apparatus as said attributes of said identified contents;

a terminal storage process of storing at least a first table and a second table into a terminal storage section in said portable reproduction apparatus, said first table is a table included in said plurality of acquired tables arranged by title of said identified contents in accordance with a first rule and said second table is a table included in said plurality of acquired tables arranged by title of said identified contents in accordance with a second rule, for the name of every group including some of said identified contents;

a display control process of reading out said first table from said terminal storage section in accordance with a first operation and displaying said titles arranged in said first table in accordance with said first rule as the titles of said identified contents on a display section, and reading out said second table from said terminal storage section in accordance with a second operation and displaying said titles arranged in said second table in accordance with said second rule as the titles of said identified contents on said display section;

a content-title selection process of selecting one of content titles displayed by said display control process; and a content reproduction process of reproducing a content identified by a content title selected by said content-title selection process from said contents stored in said content storage section in said portable reproduction apparatus.

9. A portable reproduction apparatus comprising:

a terminal database including attributes of each of contents stored in a storage medium in said portable reproduction apparatus;

a terminal-database transfer section configured to transmit said terminal database to an information-processing apparatus connected to said portable reproduction apparatus;

a terminal-database acquisition section configured to acquire a terminal database obtained as a result of processes carried out by said information-processing apparatus to compare a host database of said information-processing apparatus including attributes of contents managed by said information-processing apparatus with said terminal database received by said information-processing apparatus from said portable reproduction apparatus, generate records required for a process to update said terminal database including titles of contents and album names each serving as a name of a group including some of said contents in said process to update said terminal database in accordance with a result of comparing said host database with said terminal database, update a portion of said terminal database on the basis of a result of a process to sort content titles recorded in said generated records as said titles of contents in accordance with a first rule, and update a portion of said terminal database on the basis of a result of a process to sort content titles recorded in said generated records as said titles of contents in accordance with a second rule, for every group name recorded in said records as said name of a group;

an output control section configured to output a result of a process carried out to sort attributes in said terminal database as a sorting process conforming to said first rule in accordance with a first operation and outputting a result of a process carried out to sort attributes in said terminal database as a sorting process conforming to said second rule in accordance with a second operation;

a content selection section configured to select a title of a content from a result output by said output control section; and a content reproduction section configured to reproduce the content identified by the title selected by said content selection section.

* * * * *